US008554896B2

(12) United States Patent (10) Patent No.: US 8,554,896 B2
Sodergren et al. (45) Date of Patent: Oct. 8, 2013

(54) PROTOCOL ADAPTER FOR TRANSFERRING DIAGNOSTIC SIGNALS BETWEEN IN-VEHICLE NETWORKS AND A COMPUTER

(75) Inventors: Jason Sodergren, Detroit, MI (US); Robin Blanton, Grosse Ile, MI (US)

(73) Assignee: Dearborn Group, Inc., Farmington Hills, MI (US)

( * ) Notice: Subject to any disclaimer, the term of this patent is extended or adjusted under 35 U.S.C. 154(b) by 265 days.

(21) Appl. No.: 12/925,310

(22) Filed: Oct. 19, 2010

(65) Prior Publication Data

US 2011/0035461 A1 Feb. 10, 2011

Related U.S. Application Data

(63) Continuation-in-part of application No. 12/586,220, filed on Sep. 18, 2009, now Pat. No. 8,185,647, which is a continuation of application No. 10/970,199, filed on Oct. 21, 2004, now Pat. No. 7,603,471, which is a continuation of application No. 09/785,123, filed on Feb. 16, 2001, now Pat. No. 7,895,342.

(60) Provisional application No. 60/186,533, filed on Mar. 2, 2000.

(51) Int. Cl.
*G06F 15/173* (2006.01)
(52) U.S. Cl.
USPC ........... 709/223; 709/203; 709/205; 709/208; 709/220; 709/230
(58) Field of Classification Search
USPC .............. 701/1; 709/203, 205, 208, 230, 213, 709/220, 223
See application file for complete search history.

(56) References Cited

U.S. PATENT DOCUMENTS

| | | | |
|---|---|---|---|
| 5,530,842 A | 6/1996 | Abraham et al. |
| 5,548,587 A | 8/1996 | Bailey et al. |
| 5,590,313 A | 12/1996 | Reynolds et al. |
| 5,751,827 A | 5/1998 | Takahashi |
| 5,771,232 A | 6/1998 | Sinibaldi et al. |
| 5,832,240 A | 11/1998 | Larsen et al. |
| 5,832,244 A | 11/1998 | Jolley et al. |
| 5,905,885 A | 5/1999 | Richter et al. |
| 5,968,158 A | 10/1999 | Andrews et al. |
| 6,003,097 A | 12/1999 | Richman et al. |
| 6,167,253 A | 12/2000 | Farris et al. |
| 6,189,057 B1 | 2/2001 | Schwanz et al. |
| 6,236,917 B1 | 5/2001 | Liebl et al. |

(Continued)

OTHER PUBLICATIONS

Wikipedia, "Vehicle Bus", accessed online on Sep. 19, 2012, http://en.wikipedia.org/wiki/Vehicle_bus.*

(Continued)

*Primary Examiner* — Ramy M Osman
(74) *Attorney, Agent, or Firm* — Warn Partners, P.C.

(57) ABSTRACT

A protocol adapter for simultaneously communicating with one or more remote computers over any one of a plurality of protocols. The adapter includes a motherboard having an integrated CPU, a plurality of interface modules, a plurality of device drivers and a plurality of daughter-board module slots. The protocol adapter further includes at least one daughter-board interface module mounted in one of the plurality of daughter-board slots. The at least one daughter-board modules expands the number of protocols of the adapter beyond those protocols being run by the motherboard.

21 Claims, 56 Drawing Sheets

(56) References Cited

U.S. PATENT DOCUMENTS

| | | |
|---|---|---|
| 6,298,370 B1 | 10/2001 | Tang et al. |
| 6,321,091 B1 | 11/2001 | Holland |
| 6,396,164 B1 | 5/2002 | Barnea et al. |
| 6,400,996 B1 | 6/2002 | Hoffberg et al. |
| 6,405,049 B2 | 6/2002 | Herrod et al. |
| 6,418,324 B1 | 7/2002 | Doviak et al. |
| 6,526,335 B1 | 2/2003 | Treyz et al. |
| 6,526,340 B1 | 2/2003 | Reul et al. |
| 6,539,027 B1 | 3/2003 | Cambron |
| 6,549,945 B1 | 4/2003 | Sinibaldi et al. |
| 6,691,183 B1 | 2/2004 | Ryan, Jr. |
| 7,209,490 B2 * | 4/2007 | Isaac et al. ............... 370/457 |
| 7,584,029 B2 * | 9/2009 | Legate et al. ............... 703/22 |
| 7,603,471 B2 | 10/2009 | Sodergren |
| 2005/0083965 A1 | 4/2005 | Sodergren |
| 2006/0050735 A1 * | 3/2006 | Isaac et al. ............... 370/469 |
| 2007/0257804 A1 * | 11/2007 | Gunderson et al. ............ 340/576 |
| 2007/0257815 A1 * | 11/2007 | Gunderson et al. ............ 340/903 |
| 2007/0260361 A1 * | 11/2007 | Etcheson ............... 701/1 |
| 2010/0070107 A1 * | 3/2010 | Berkobin et al. ............ 709/203 |
| 2011/0130916 A1 * | 6/2011 | Mayer ............... 701/33 |

OTHER PUBLICATIONS

"Linux", http://en.wikipedia.org/wiki/Linux_operating_system; Wikipeida, the free encyclopedia; 9 pages; Nov. 30, 2006.

"LynxOS"; http://en.wikipedia.org/wiki/LynxOS; Wikipedia, the free encyclopedia; 2 pages; Nov. 30, 2006.

* cited by examiner

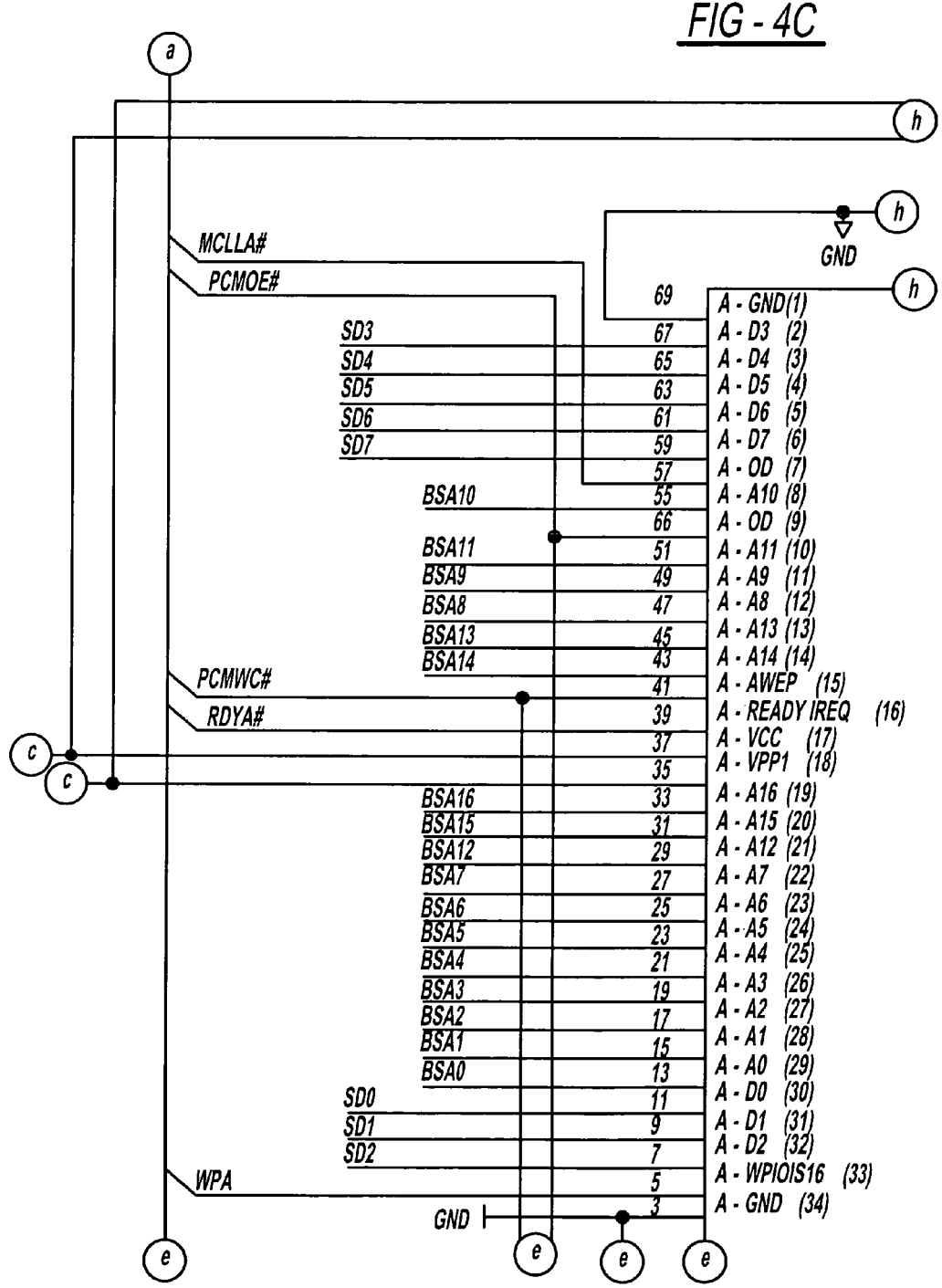

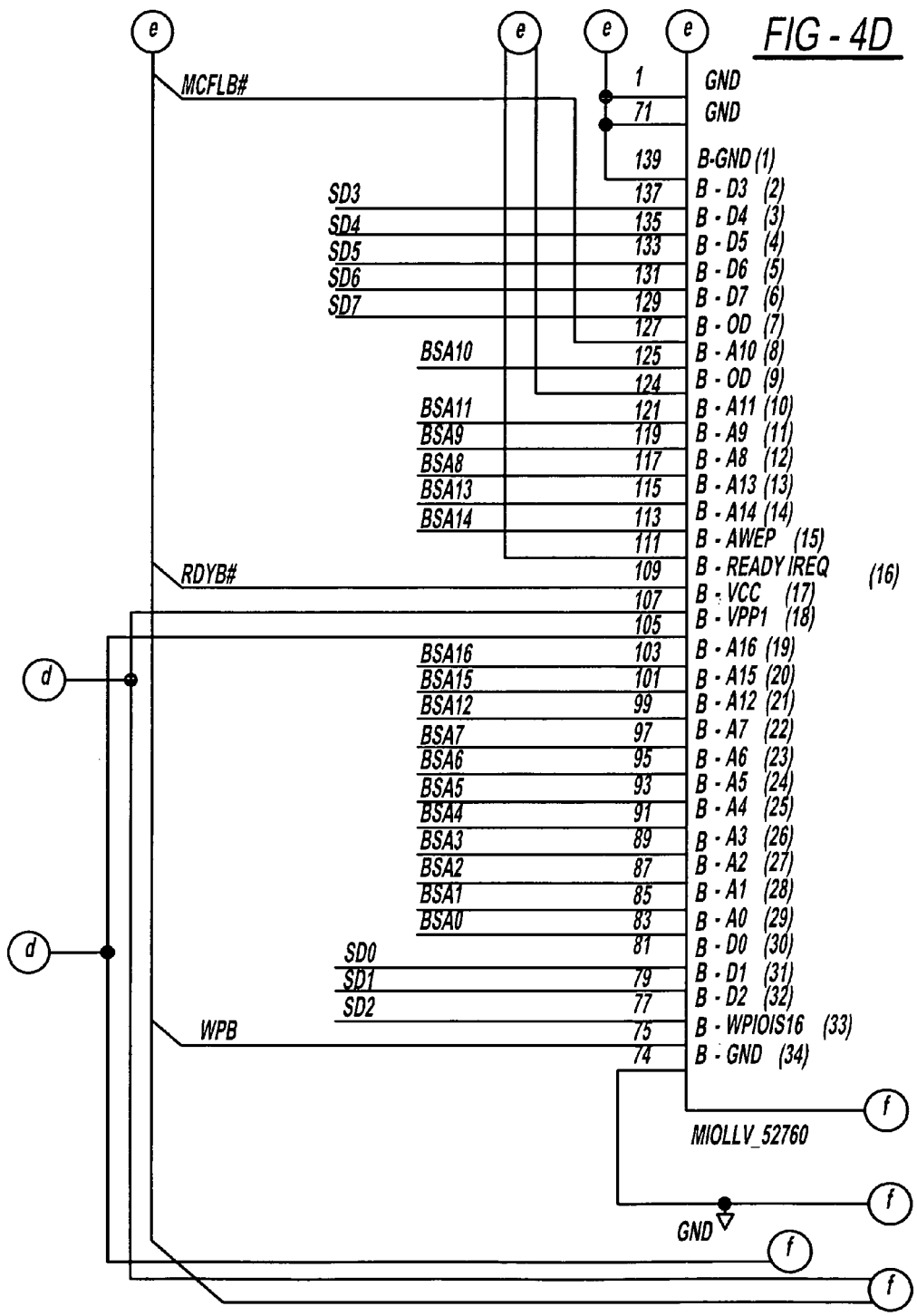

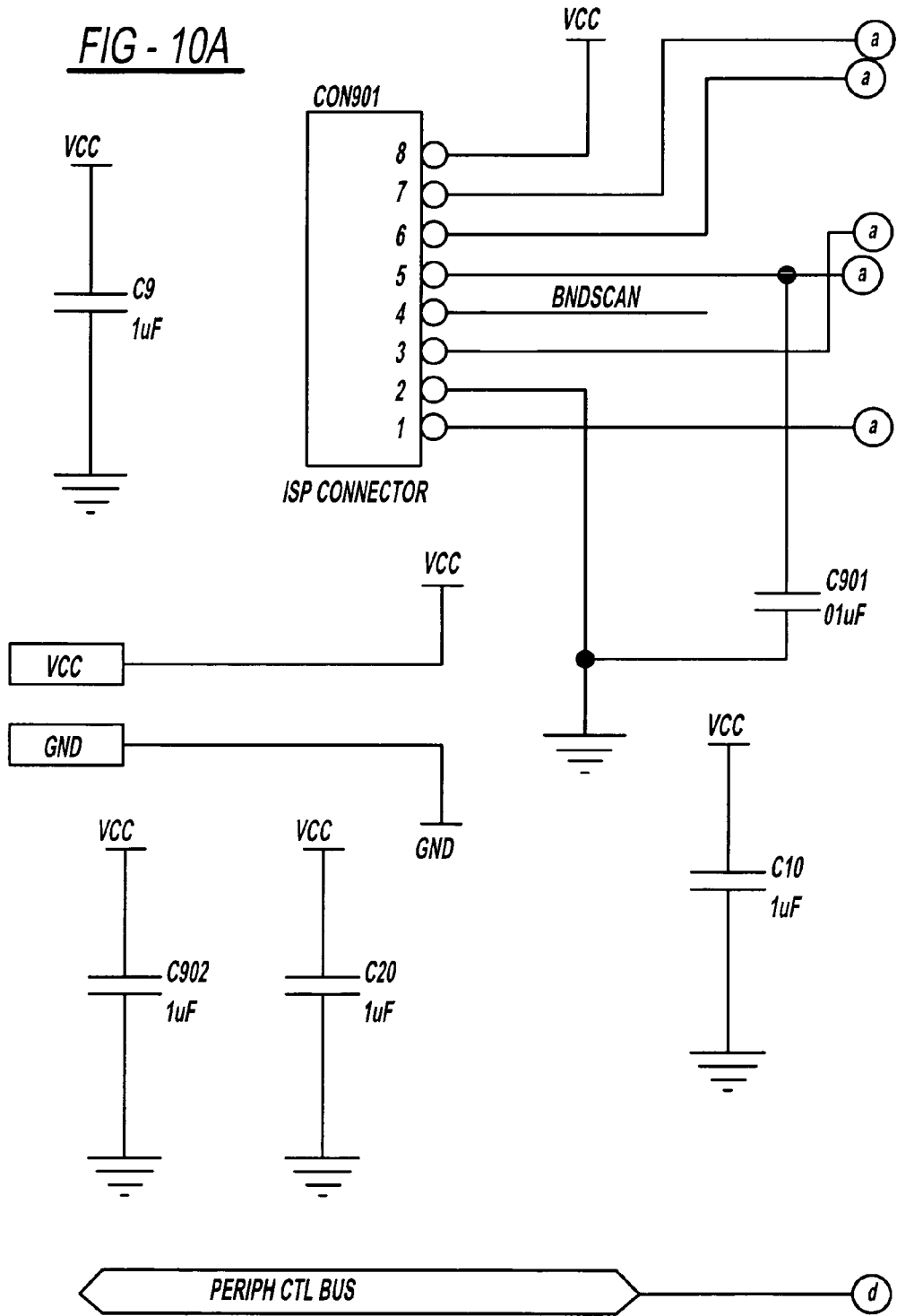

PROTOCOL ADAPTER FOR TRANSFERRING DIAGNOSTIC SIGNALS BETWEEN IN-VEHICLE NETWORKS AND A COMPUTER

CROSS-REFERENCE TO RELATED APPLICATIONS

This is a Continuation-In-Part Application of U.S. patent application Ser. No. 12/586,220, titled Protocol Adapter for Transferring Diagnostic Signals Between In-Vehicle Networks and a Computer, filed on Sep. 18, 2009 which is a Continuation Application of U.S. patent application Ser. No. 10/970,199, titled Protocol Adapter for Transferring Diagnostic Signals Between In-Vehicle Networks and a Computer, filed on Oct. 21, 2004, which is a Continuation Application of U.S. patent application Ser. No. 09/785,123, titled Multi-Protocol Adapter for In-Vehicle and Industrial Communications Networks, filed Feb. 16, 2001, which claims the benefit of the priority date of U.S. Provisional Patent Application Ser. No. 60/186,533, titled Multi-Protocol Adapter for In-Vehicle and Industrial Communications Networks, filed Mar. 2, 2000. The disclosures of the above applications are incorporated herein by reference.

BACKGROUND OF THE INVENTION

The field of the invention pertains to in-vehicle and industrial communications networks for diagnostics, analysis and monitoring. A typical protocol adapter is connected to a motor vehicle such as a car, sport-utility vehicle, or the like, and communicates with the vehicle using a communications protocol. Some vehicles have a network which operates in more than one communications protocol, and it is necessary for the protocol adapter to be able to communicate in more than one network protocol, as well as translate information from the vehicle network to a host computer. Multiplex communication networks are used in automotive and industrial automation application. However, the ability was needed to access, monitor, control and modify/update any and all functions or capabilities of another device utilizing such communication networks.

Additionally, protocol adapters, and host computers which communicate with a vehicle network through the use of protocol adapters, require a certain amount of time prior to being operational after they are initially activated (i.e., the power is turned on). The term typically used to describe this time frame is "boot up" time, or it is also common to say the device is "booting up." During the boot up of a device, such as a computer, a boot sequence is performed, and an initial set of operations are performed by the computer when power is switched on. Because these operations take time, there is a delay from when the power is turned on to when the device is fully operational.

There are applications where it is necessary for a protocol adapter to have circuitry which is able to record data provided by a vehicle network within milliseconds of activation. Also, it is considered undesirable to have to wait for a boot sequence to be performed prior to being able to use a protocol adapter or a computer. However, most protocol adapters and host computers do not have the capability to communicate with a vehicle network, record, or process data upon initial power up because of the boot time required for the protocol adapter or the host computer (or both) to become fully operational.

Accordingly, there exists a need for a protocol adapter to have the ability to record data received from a vehicle network while booting up after the power is initially turned on.

SUMMARY OF THE INVENTION

The invention is a hardware/software system that provides a programmable gateway between many types of automotive/industrial serial multiplex networks and Ethernet-connected computers and networking equipment. The hardware/software system provides user applications with the ability to perform control, transmit, and receive operations on such automotive and industrial multiplex networks.

User applications may reside either on a hardware device itself (in a stand-alone manner) or on remote computers with connectivity to one or more hardware units via the Ethernet and the TCP/IP protocol. Use of TCP/IP protocol and Ethernet ensure compatibility with a wide range of existing networks and computing equipment.

User applications include, but are not limited to, network monitors and analyzers, diagnostic programs, gateway/routers between one or more of the supported networks, multiplex network node and/or vehicle simulators, and general engineering tools.

The hardware/software system supports multiple simultaneous client applications. Duplicate streams of the multiplex network data are sent to all interested client applications.

A predefined set of services are available via a default hardware/software system configuration. These services include multiplex message scheduling functions, message filtering functions, simple message gatewaying and autoresponding functions, and client transmit/receive access to all data frames present on any of the supported multiplex network interfaces.

In one embodiment, the present invention is a circuit board, or an "add-in" card, which is a separate component or device usable with a protocol adapter, that has circuitry with the ability to record data received from a vehicle network while the remaining components of the protocol adapter are booting up. The add-in card is removable, and is usable with other protocol adapters, if desired, and includes the ability to communicate with a vehicle network while the remaining portions of the protocol adapter undergo a boot sequence. The separate circuitry records and stores the data using a memory device, is able to transfer the data to the host computer once the protocol adapter has finished booting up, and if applicable, after the host computer has finished booting up.

These and other advantages and features of novelty which characterize the invention are discussed below for a more complete understanding of the present invention, where reference is made to the following detailed description when read in conjunction with the accompanying drawings, where like reference characters refer to like elements throughout the several views.

DETAILED DESCRIPTION OF THE EMBODIMENTS

Figure 1:
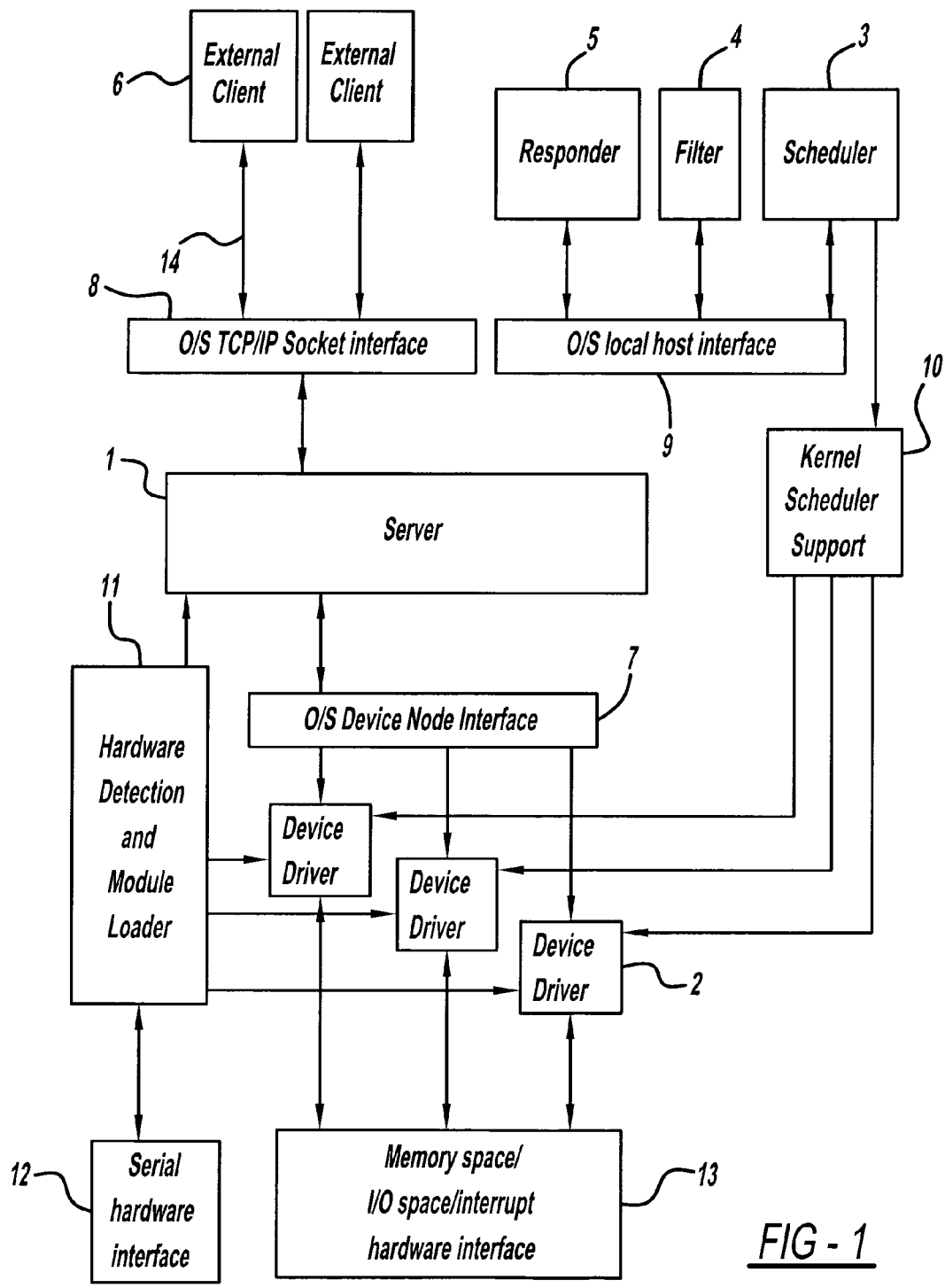
FIG. 1 illustrates device mainboard overview.

The following discussion of the embodiments of the invention directed to a protocol adapter for transferring diagnostic signals between in-vehicle networks in a computer is merely exemplary in nature, and is in no way intended to limit the invention or its applications or uses.

The invention is a device (or adapter or instrument) for providing the user with a remote access point for interaction between the device and one or more target devices running one or more of several communication protocols supported by the device. As described above, automotive and industrial automation application employ such protocols (also known as multiplexed communication networks).

The device of the invention advantageously provides the user with the ability to access, monitor, control and modify/update any and all functions or capabilities of another device utilizing the same communication protocol that the user has selected. The user is able to control these functions as a result of a unique communication dialogue established between the device and the target device.

The device has the capability of simultaneous interaction with multiple devices utilizing multiple protocols. Interactive control capability established with the target device includes, but is not limited to, interrogating, monitoring, retrieving data, downloading data, recording data, revising/updating data, performing diagnostics and revising/updating the operating program of the target device.

Daughtercard interface modules are based on the ISA Interconnect Standard even though they utilize small, space-saving connectors (as opposed to the standard ISA board-edge interconnections). As a result, they occupy a much smaller and more compact area than would otherwise be possible for a standard plug-in module utilizing the ISA format.

Daughtercard interface modules can be plug-in modules to provide support for the following protocols: SAE J1850 (GM, Ford and Chrysler versions), UBP (Ford), CCD (Chrysler), SCI (Chrysler), CAN, SAE J1587, J1939, J2284 (high speed CAN), J2411 (single wire CAN), ISO 11992, ISO 9141-2 and KWP2000.

New communication protocols may be added to the device capabilities at any time by creating a new daughtercard module for supporting the new protocol.

Daughtercard interface modules provide the user with automatic detection capability for all of the designated communication protocols. This allows the user the flexibility of choosing a "mix or match" combination of the various protocols, i.e., three of the same or three different protocols. More daughter cards can be added as necessary to support more channels.

The device is also capable of functioning as a "stand-alone" network interface, without the need for a keyboard, monitor, or host PC. Multi-protocol networks, such as IDB networks or those multi-protocol networks accessed via a universal gateway, may have unique access and/or diagnostic requirements.

The device's ability to simultaneously access and interact with multiple devices/protocols, automatically provides to the device with the compatibility required for an access tool or diagnostic tool for multi-protocol networks. The device uses an Ethernet connection to provide the high-speed communications interface that is necessary for the interaction with the newer, high throughput protocols.

Another capability of the device is its ability to reliably monitor, sample evaluate and manipulate the real-time data usually associated with these high-speed protocols.

The device maximizes flexibility by ensuring compatibility with hardware interfaces and other network tools commonly used in conjunction with these supported network protocols.

Communication between the device server, clients, plug-in applications and protocol stacks occurs by a communication protocol (hereafter referred to as the device communication protocol, or CP). The CP provides a mechanism for the communication of serial multiplex network messages between software entities in such a way that knowledge of the specific format of the messages of a specific type of multiplex network is not required. The serial multiplex networks involved are automotive and/or industrial automation networks, including but not limited to CAN (ISO11898, GM Single-wire, and others), J1850 (GM, Ford and Chrysler variants), Keyword Protocol 200, and various other UART-based protocols.

This generalized representation of the frames of such serial networks allows communication of frames from an arbitrary arrangement of similar or differing networks within a consistently formatted connection between a client and server. Consequently, this generalized representation of the frames of such serial networks also allows for use and interpretation of such multiplex network frames by a client that has no previous knowledge of the types or formats of the multiplex network that it will receive; all relevant format and decoding information is contained within the client/server communication. Moreover, this generalization of differing types of multiplex network traffic facilitates communication between software and a multi-protocol device such as the device hardware.

The CP also incorporates mechanisms to allow control, status and event information communication between the client and server software entities. This inclusion allows for a uniform communication environment between software entities within the device system, regardless of whether these entities are servers, clients, plug-in applications or protocol handlers.

The CP is typically embedded within a TCP/IP connection between two software elements (the server, clients, etc.). Each CP frame consists of various elements discussed below.

A frame header that contains information about the required routing of the frame, where the identity of the source entity and the destination entity are specified. This header also contains an indication of the frame type, as well as the length of the entire frame. A frame-type specific header contains information specific to the frame type specified in the frame header. An optional payload for which the format or presence/absence of a payload depends on the frame type specified in the frame header.

Five frame types are herein defined, although more are easily envisioned. Some frames include the following frames:

Command frames contain commands that are sent by the source entity and received by the destination entity. These commands serve to control behavior or request information or actions of the destination target. The payload portion of the CP command frame is command-specific data. A number of generic system-wide commands are specified, but each software entity may have its own set of recognized and handled commands.

Response frames contain a destination entity's response to a previously-received command frame. This response frame is sent back to the entity that originally sourced the relevant command. The payload portion of the CP response frame is command-specific data.

Data frames contain encapsulated multiplex network frames. CP data frames contain an additional header that contains information about the encapsulated multiplex frame. This information includes a timestamp that applies to the transmit/receive time of the multiplex frame; indications of header/data/other field lengths within the encapsulated multiplex frame; indications of special modes or flags that may apply to the multiplex frame; the remainder of the payload of a CP frame contains the actual multiplex network frame; and CP data frames provide the primary mechanism by which multiplex network frames are gatewayed between the multiplex networks and the device system's application and remote clients.

Event frames contain information about system or software entity events. This data is not sent as a response to a request, but rather as independent event-driven notifications. The payload portion of a CP event frame contains event-specific data.

ASCII message frames contain zero-terminated human readable ASCII messages. There is no frame type specific header for this frame type because the entire remainder of the frame contains the payload, which is the ASCII message.

MISC frames user-defined data. No definitions are made for the format of the remainder of this frame type; it is open to user definition.

The software components of the device hardware/software system implement the device Communication Protocol and facilitate communication between multiplex networks, plug-in applications and protocols, and client applications. The general software architecture of the components of the device software system involved in the handling of the functionality is outlined in this description.

The software that resides on the device hardware platform consists of the following types of components.

The server program that implements the device Communication protocol. The server program handles communication between clients and other parts of the device software. The server acts primarily as a message router, routing GC Protocol frames between source entities and destination entities as specified by the routing information contained within each GC Protocol frame. The server communicates with device drivers by means of standard Unix character device interfaces.

Multiplex network hardware device drivers that are software modules to implement hardware access methods for each supported multiplex network hardware type. A separate loadable device driver module exists for each type of device daughtercard, where each daughtercard may implement one or more multiplex network interfaces. These modules provide a uniform software interface method to non-uniform types of hardware interfaces. Interface to specific hardware is accomplished by a memory of I/O space interfaces and system interrupts.

Plug-in application and protocols programs are loadable software modules that provide additional functionality to the device hardware/software system. One or more of these modules may be configured to load at start-up time and provide services such as message filtering, scheduling and autoresponding capabilities. Additional modules provide high-level protocol encoding and decoding (J1939, GM USDT and DeviceNet protocol modules are examples of supported plug-in protocol modules).

Hardware autodetection and configuration software programs detect the types of multiplex protocol daughtercards installed in the device hardware platform at runtime. These programs are responsible for loading of appropriate device driver modules for support of installed cards, as well as any configuration that is needed for each individual card. Detection of card identity is performed through the reading of serial EEPROMs located on each card by a dedicated serial interface. The EEPROMs contain card type and serial number as well as licensing and security information. All information gathered from installed cards in this manner is made available to the server program.

Plug-in software modules are described above include, but are not limited to, the following.

A message scheduler module provides a user-controllable multiplex network message scheduler. Lists of messages, sublists, iteration counts, and iteration periods are specified by client applications. The message scheduler tracks multiple schedules and notifies client programs via events when schedules complete. Message scheduling is performed by means of a real-time hardware clock and associated services provided by the operating system.

A message responder module provides user-definable message gatewaying functionality. It allows any arbitrary CP frame to be sent on receipt of any other arbitrary CP frame. Received frame matching is determined based on a user-defined filter definition that includes AND, OR, magnitude comparison, and bit mask/match operations.

A message filter module controls filtering of received multiplex network messages. The filter module allows individual client applications to choose the nature of the messages they receive based on a filter specification for each multiplex network channel that includes AND, OR, magnitude comparison, and bit mask/match operations.

A script loader module allows for the controlled download, management and activation of user-defined scripts. These scripts are typically generated by an external front-end editor/compiler software package.

The device hardware platform consists of a motherboard and zero or more multiplex protocol daughtercards. The device motherboard implements a modified PC architecture. The PC architecture includes the following elements and peripheral devices:

Integrated CPU;
Daughtercard interconnect slots;
Alphanumeric LCD and keypad for user input/output;
10-base-T Ethernet interface for client interconnection;
EIA232 serial port for diagnostics and systems maintenance;
Compact Flash socket for storage of system software and application;
(2) PCMCIA slots for connection of industry standard peripherals;
72-pin SODIMM socket for connection of system RAM;

IDE interface for connection of mass-storage devices;

A coin-cell battery for clock and configuration memory backup;

IRDA infrared serial interface; and

Piezoelectric speaker.

The motherboard can include the following components.

A CPU and associated buffering and memory. The board is based on the AMD Elan SC400 integrated CPU. Level shifting buffers provide translation between the 3.3 VDC and 5 VDC portions of the system. A 72-pin small-outline dual inline memory module socket provides interface to a standard memory module, the module is used as the system's RAM.

A flash-ROM provides non-volatile memory space for the system's BIOS and boot routines.

Daughtercard interface slots provide a subset of ISA architecture signals, as well as proprietary signals that provide a card ID interface and predefined slot memory and I/O space decodes.

PCMCIA sockets for attachment of industry-standard PCMCIA devices.

Serial interfaces. One EIA232 interface and one IRDA interface are provided.

LCD and keypad. An alphanumeric LCD interface and a 4-key keypad are provided for user input/output capabilities.

Ethernet interface. A standard 10-base T Ethernet interface is implemented by means of a Crystal Semiconductor CS8900 device. This device provides the primary user communication interface.

Power supply interconnect. This interconnect forms an attachment point for a small DC-DC converter that provides system power supplies.

An ATA interface provides an attachment point for mass storage devices. One Compact Flash and one 44-pin IDE interface is provided.

A programmable logic block (CPLD) provides programmable logic space. This logic provides support for an LCD/keypad interface, daughtercard slot support, buffer control, and address decoding/interrupt routing for other system peripheral.

A power supply card provides three DC-DC converters that provide the device hardware platform's required supply voltages (3.3 VDC, 5 VDC and 12 VDC). The supported input voltage range is between 6 VDC and 35 VDC, where the circuit provides protection against incorrect or reverse-polarity input voltages.

Daughtercards interface to the motherboard by card interface slots on the motherboard. Each slot implements a modified ISA interface. Up to three daughtercards may be installed at a time. The daughtercards include, but are not limited to, implementations of the following interfaces:

CAN (ISO11898)
CAN (ISO11992)
Single-wire CAN
GM J1850
Ford J1850
Chrysler J1850
Chrysler CCD
Ford UBP
Honda UART-based protocol
Keyword Protocol 2000
Optically isolated CAN
Optically isolated single-wire CAN
Optically isolated GM J1850
Optically isolated Keyword Protocol 2000

Each daughtercard includes a connector that mates with the motherboard daughtercard slot connector on one end and a multiplex network connector on the other. The daughtercards are physically mounted in such a way that the multiplex network connector protrudes through the back panel of the hardware unit. Each daughtercard also includes programmable logic that implements the ISA target interface and provides internal registers and other card resources. Each card includes a serial EEPROM that contains the type, serial number, and security and licensing information for that card.

The optically isolated cards provide fiberoptics that carry relevant network signals, where these optical signals are converted back to the desired multiplex network signals by small battery-operated satellite modules specific to the desired multiplex network.

The device protocol structure employs the standard Transmission Control Protocol/Internet Protocol (TCP/IP) services in such a manner to ensure the inter-operability of the device with existing PCs and standard network interfaces.

Another unique feature of the device allows the user to remotely reprogram or revise the device operating software via flash card. The operating software may be upgraded by replacing selected programs, or segments of the software, or replaced in its entirety.

The PC card (PCMCIA) slots provide for a backup by allowing the user to transfer data from the flash card to a "temporary" storage media, thus maintaining the original program integrity while making revisions to the device program.

Also, this same feature allows the user to update the device's resident data base, in the event that such a data base has been created for use as a reference or for some other purpose.

The device incorporates an on-board web server. This allows users to communicate with the device and perform functions via a web browser with HTML.

Other browser technologies that can be supported include XML and WML (for hand-held palm devices or WML enable cell phones).

Another key feature of the device is the ability to perform a remote flash memory update to the device.

Now turning to the drawings, circuits of the protocol adapter of the invention are shown in schematic in FIGS. 1 through 11.

The operating software is depicted in a block diagram in FIG. 10 showing elements of the mainboard schematic. The general software architecture of the components of the device software system is provided by a server program 1 that handles communication between clients 6, 6 through an O/S TCP/IP interface 8 on lines 14 and other parts of the device software 3, 4, 5 through and O/S local host interface 9. The server program 1 acts primarily as a message router, routing GC Protocol frames between source entities and a destination. The server program 1 communicates with the device drivers 2, 2, etc. by standard Unix character device interfaces 7. The device drivers 2 also communicate with a memory/space I/O space/interrupt hardware interface 13.

Hardware autodetection and configuration software 11 detect the types of multiplex protocol daughtercards installed in the device hardware platform at runtime. Thereafter the appropriate device driver modules 2, 2, etc. are loaded for support of installed cards, as well as any configuration that is needed for each individual card. Detection of card identity is performed through the reading of serial EEPROMs located on each card by means of a dedicated serial interface 12. The EEPROMs contain card type and serial number as well as licensing and security information. All information gathered from installed cards in this manner is made available to the server program 1.

Plug-in software module Message scheduler 3 provides a user-controllable multiplex network message scheduler. Lists of messages, sublists, iteration counts, and iteration periods are specified by client applications. The message scheduler 3 tracks multiple schedules and notifies client programs via events when the schedules complete. Message scheduling is performed by means of a real-time hardware clock and associated services 10 provided by the operating system.

A message responder 5 provides user-definable message gatewaying functionality. The message responder 5 allows any arbitrary CP frame to be sent on receipt of any other arbitrary CP frame. Received frame matching is determined based on a user-defined filter definition that includes AND, OR, magnitude comparison, and bit mask/match operations.

The message filter 4 controls filtering of received multiplex network messages. The filter 4 allows individual client applications to choose the nature of the messages they receive based on a filter specification for each multiplex network channel that includes AND, OR, magnitude comparison, and bit mask/match operations.

A script loader (not shown in FIG. 1) allows for the controlled download, management and activation of user-defined scripts. These scripts are typically generated an external front-end editor/compiler software package.

Figure 2A:
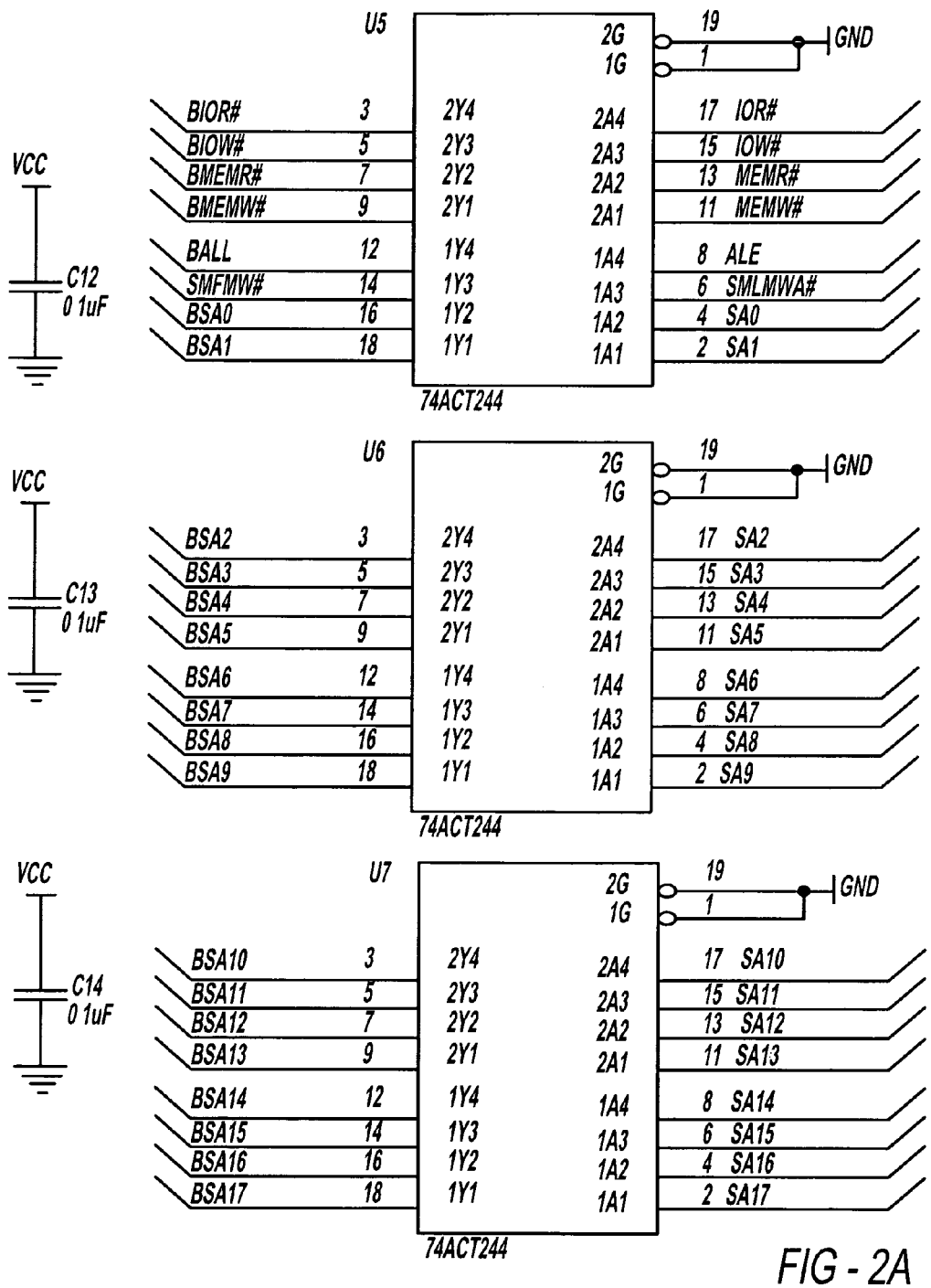
FIG. 2 illustrates device mainboard schematic: CPU, memory, buffers Central Processors, RAM, flash-ROM (for-BIOS)
Figure 2B:
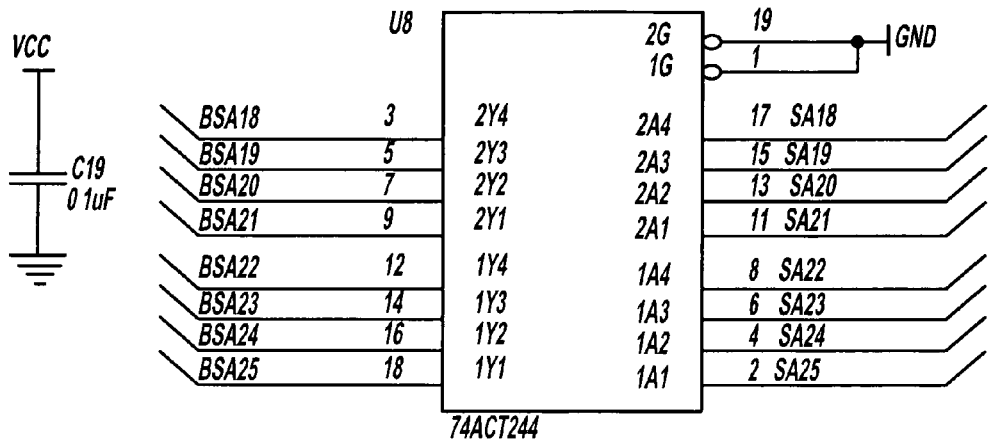
Figure 2B:
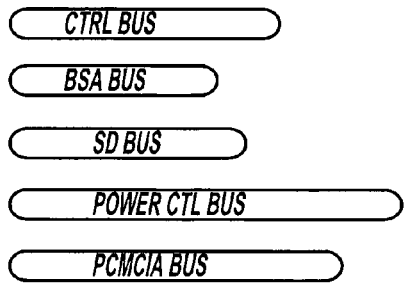
Figure 2B:
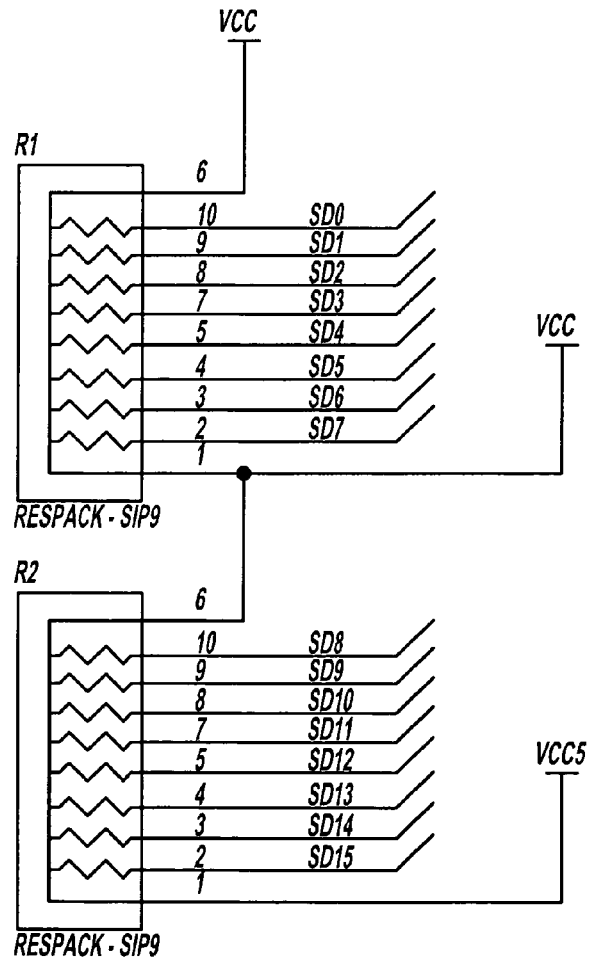
Figure 2C:
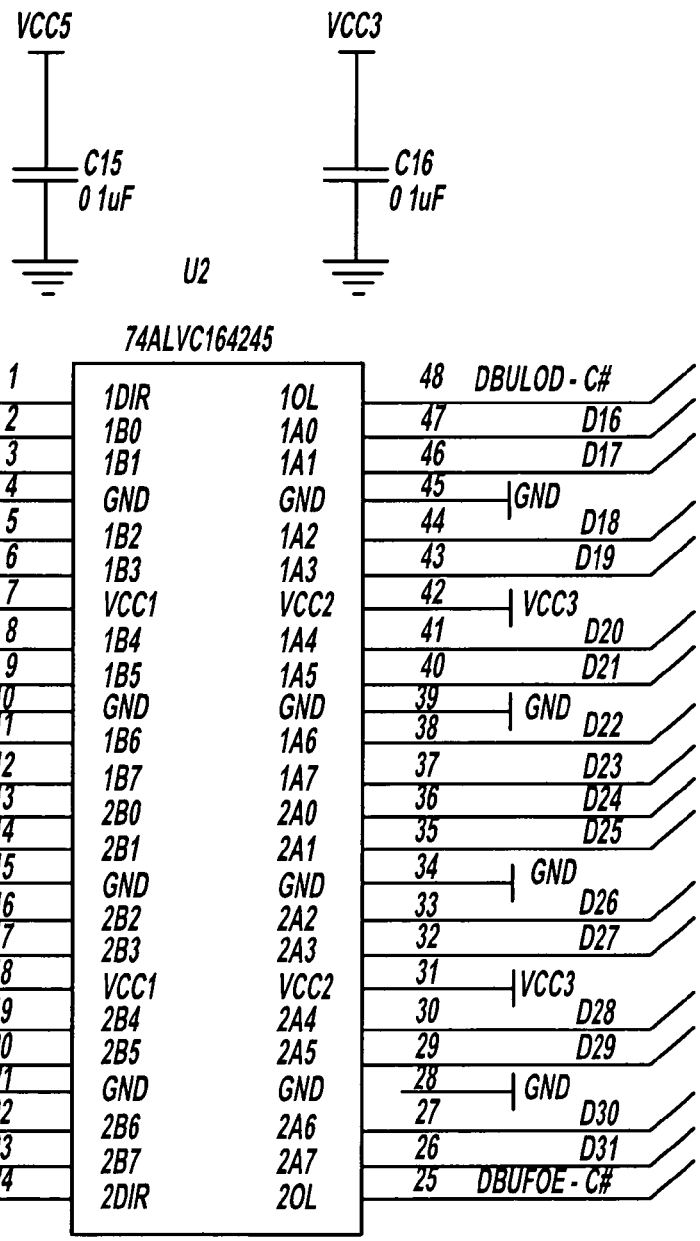
Figures 1, 2D:
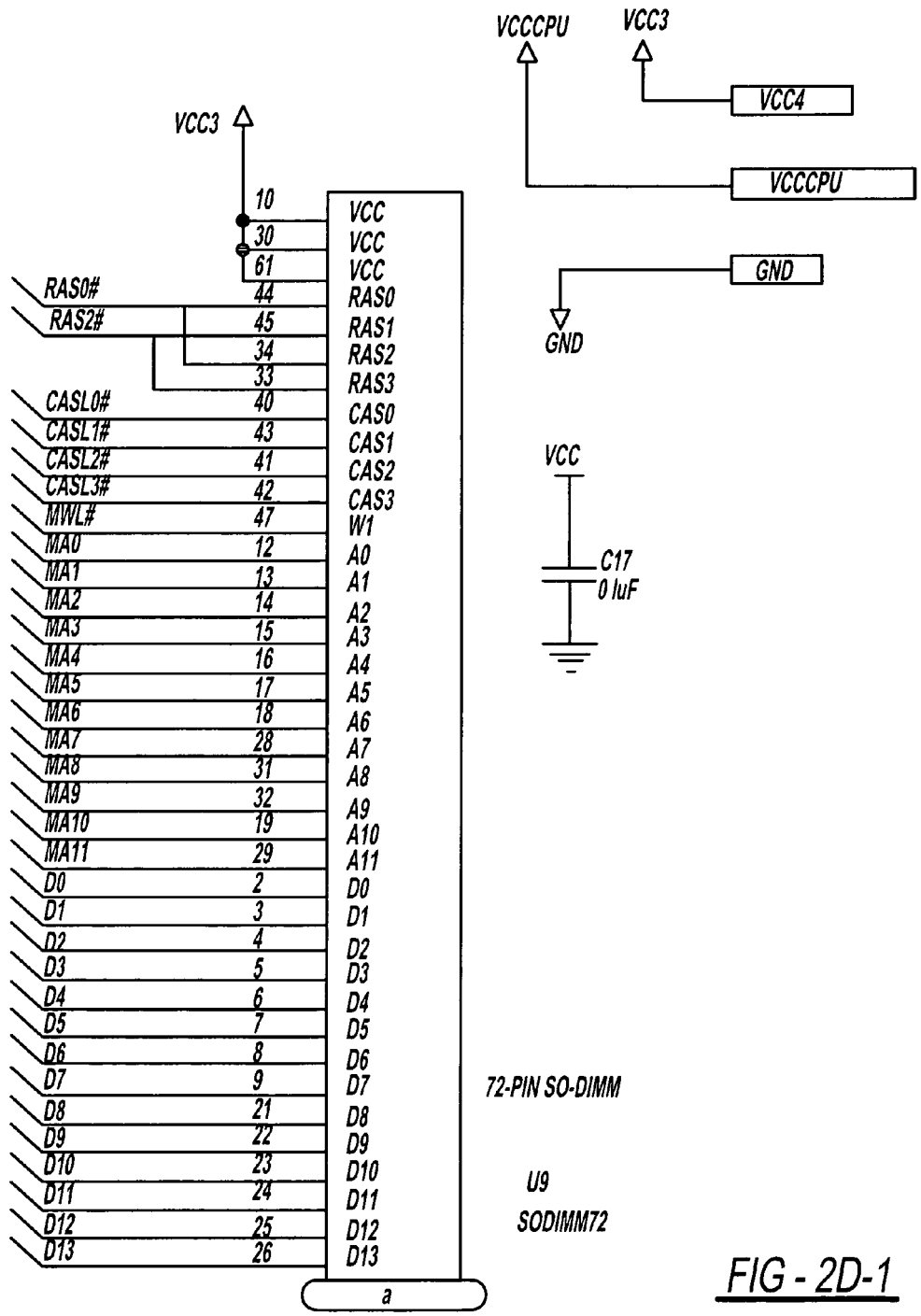
Figures 2, 2D:
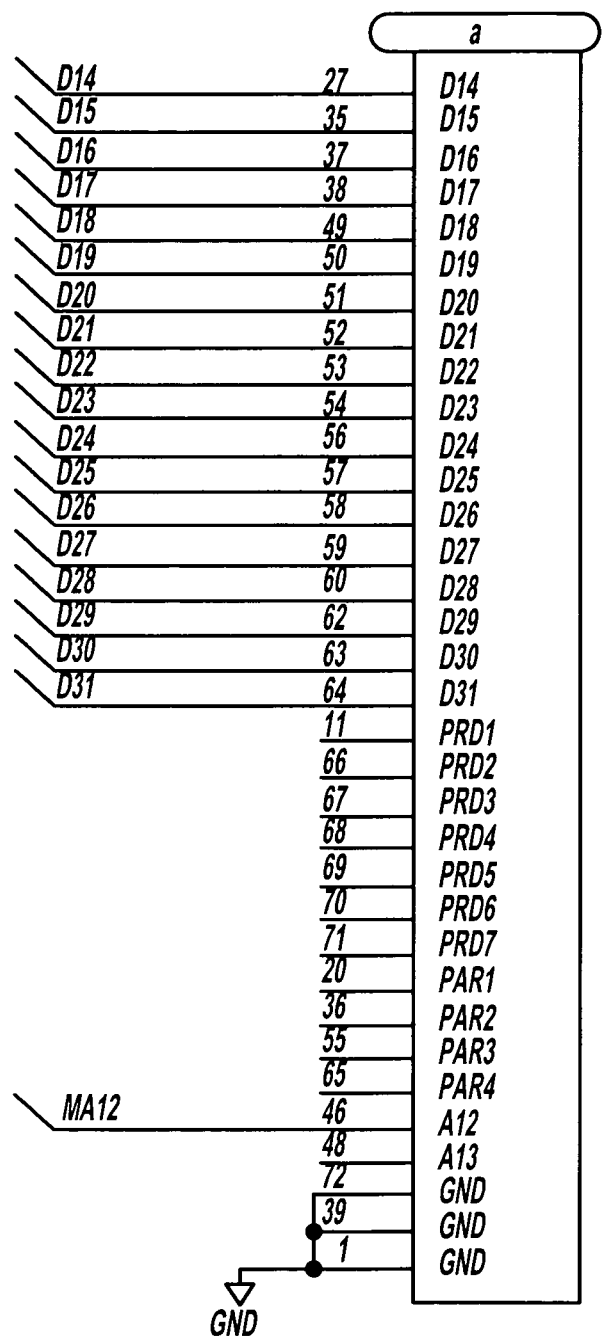
Figures 1, 2E:
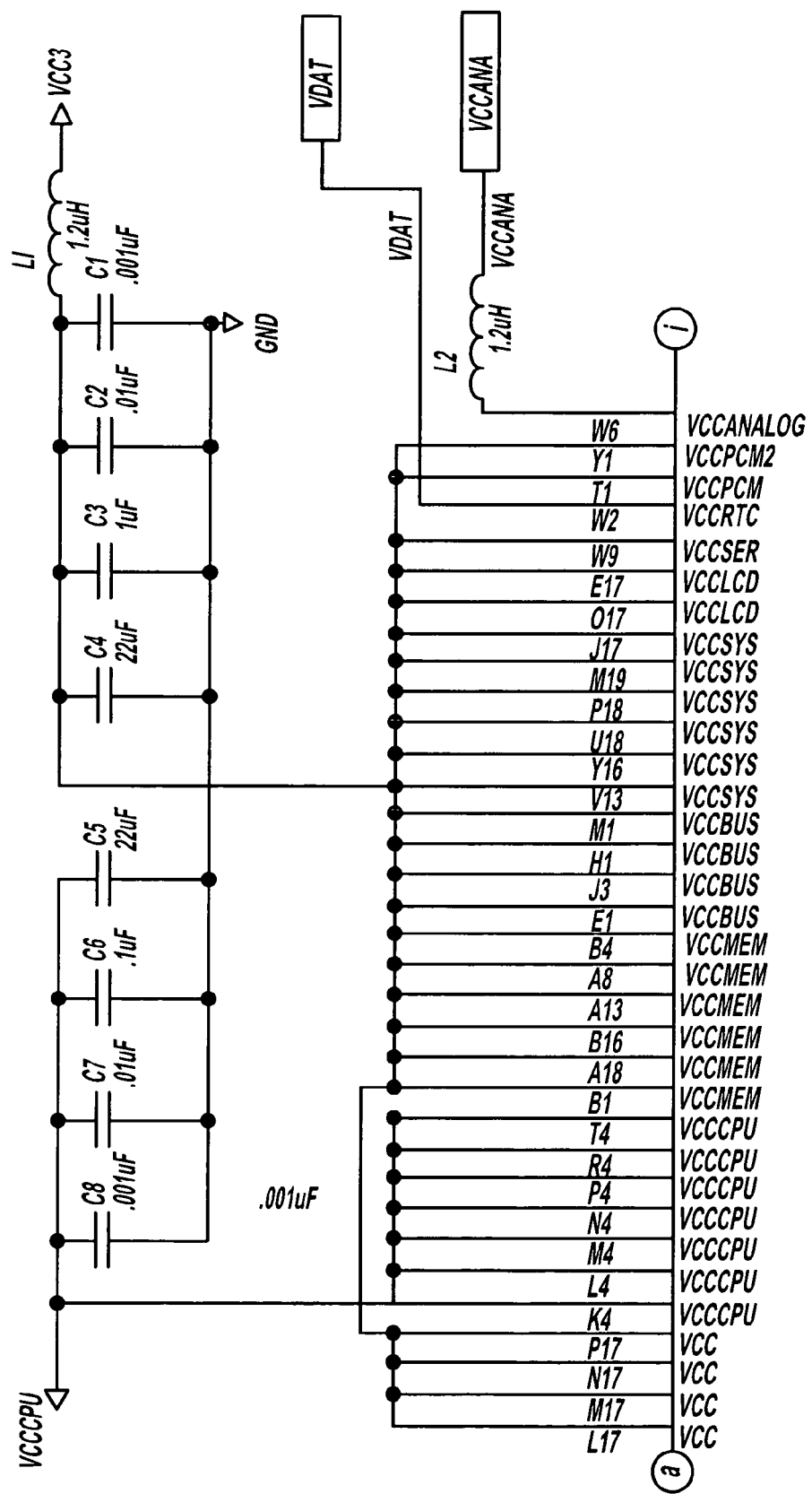
Figures 2, 2E:
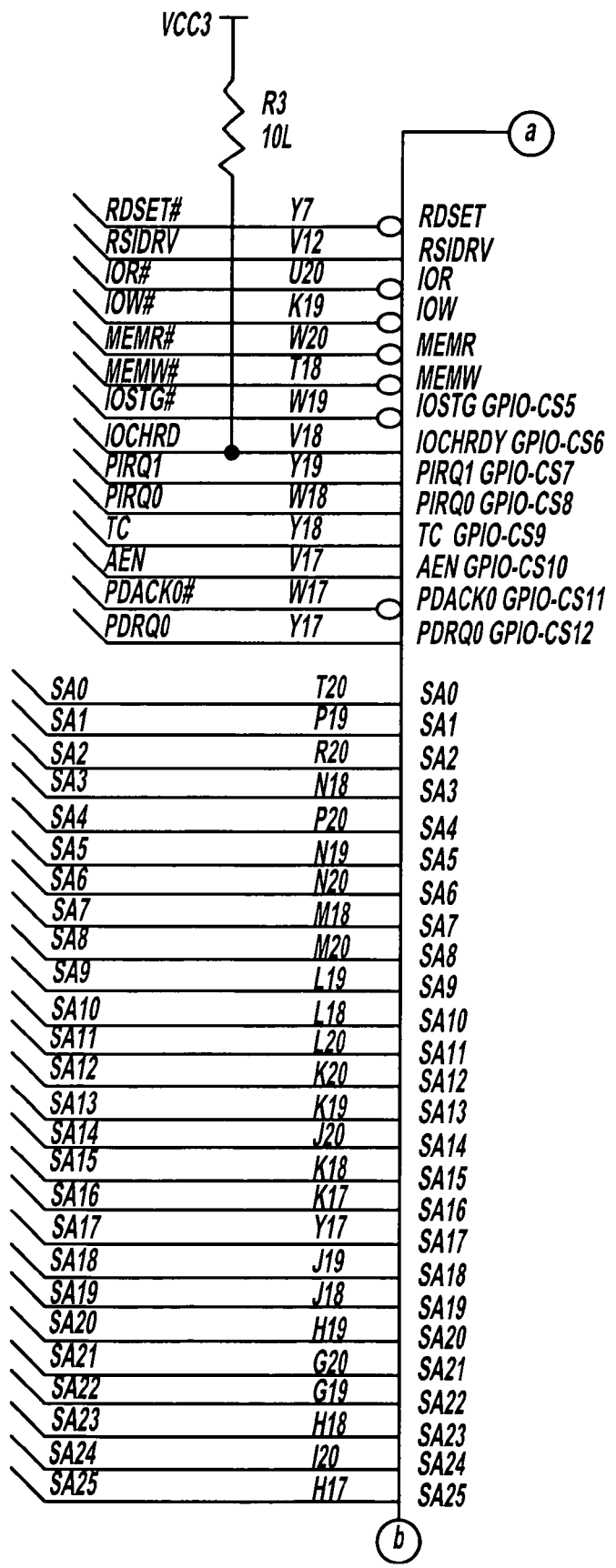
Figures 2, 2E, 3:
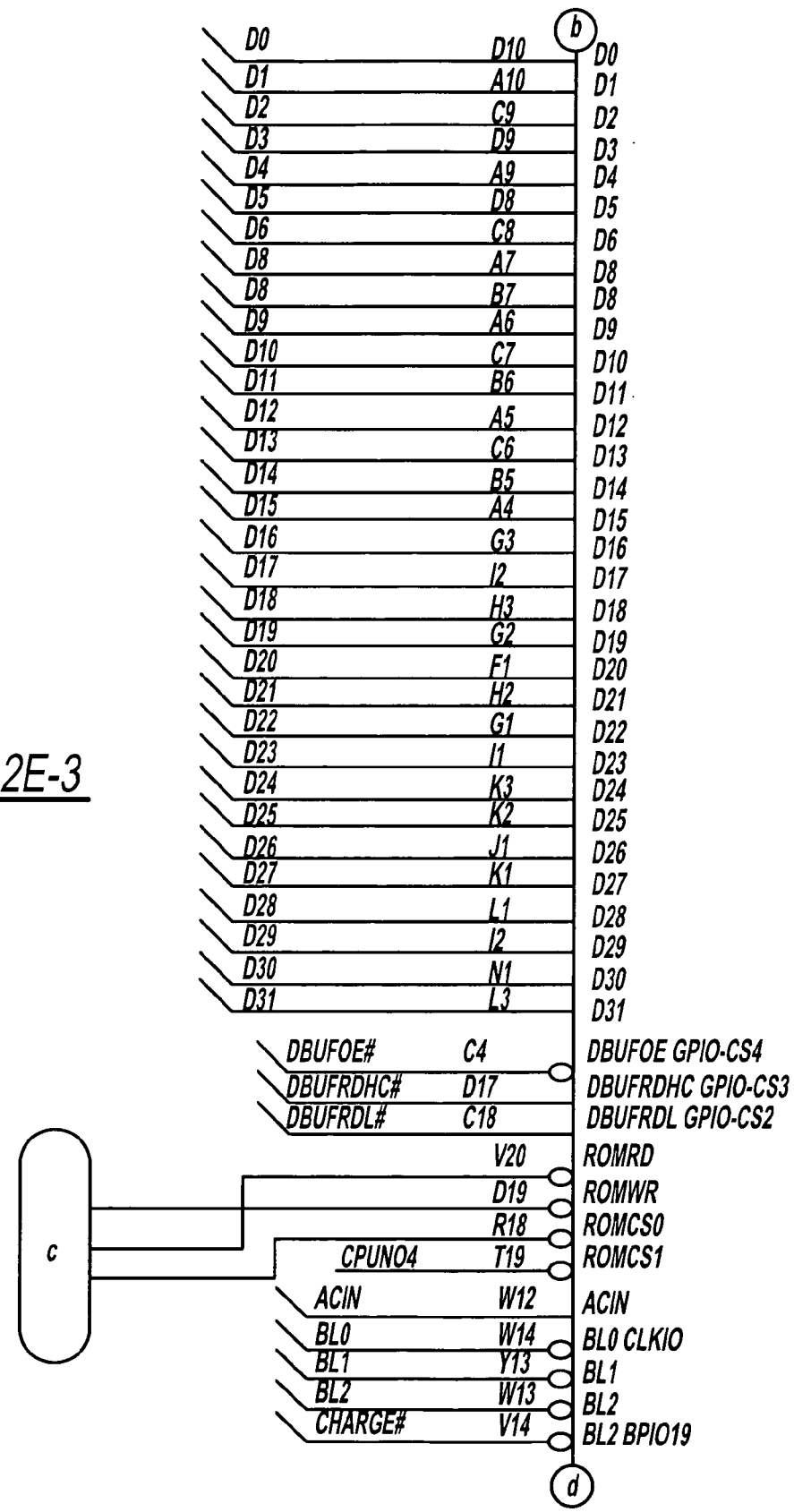
FIG. 3 illustrates device mainboard schematic: daughter-card interconnects modified ISA)

Now turning to FIG. 2, the device hardware platform is depicted as having a CPU and associated buffering and memory. The board is based on the AMD Elan SC400 integrated CPU. Level shifting buffers provide translation between the 3.3 VDC and 5 VDC portions of the system. A 72-pin small-outline dual inline memory module socket provides interface to a standard memory module. This module is used as the system's RAM. A flash-ROM provides non-volatile memory space for the system's BIOS and boot routines.

Daughtercard interface slots (FIG. 3) provide a subset of ISA architecture signals, as well as proprietary signals that provide a card ID interface and predefined slot memory and I/O space decodes.

Figures 2, 2E, 3, 4:
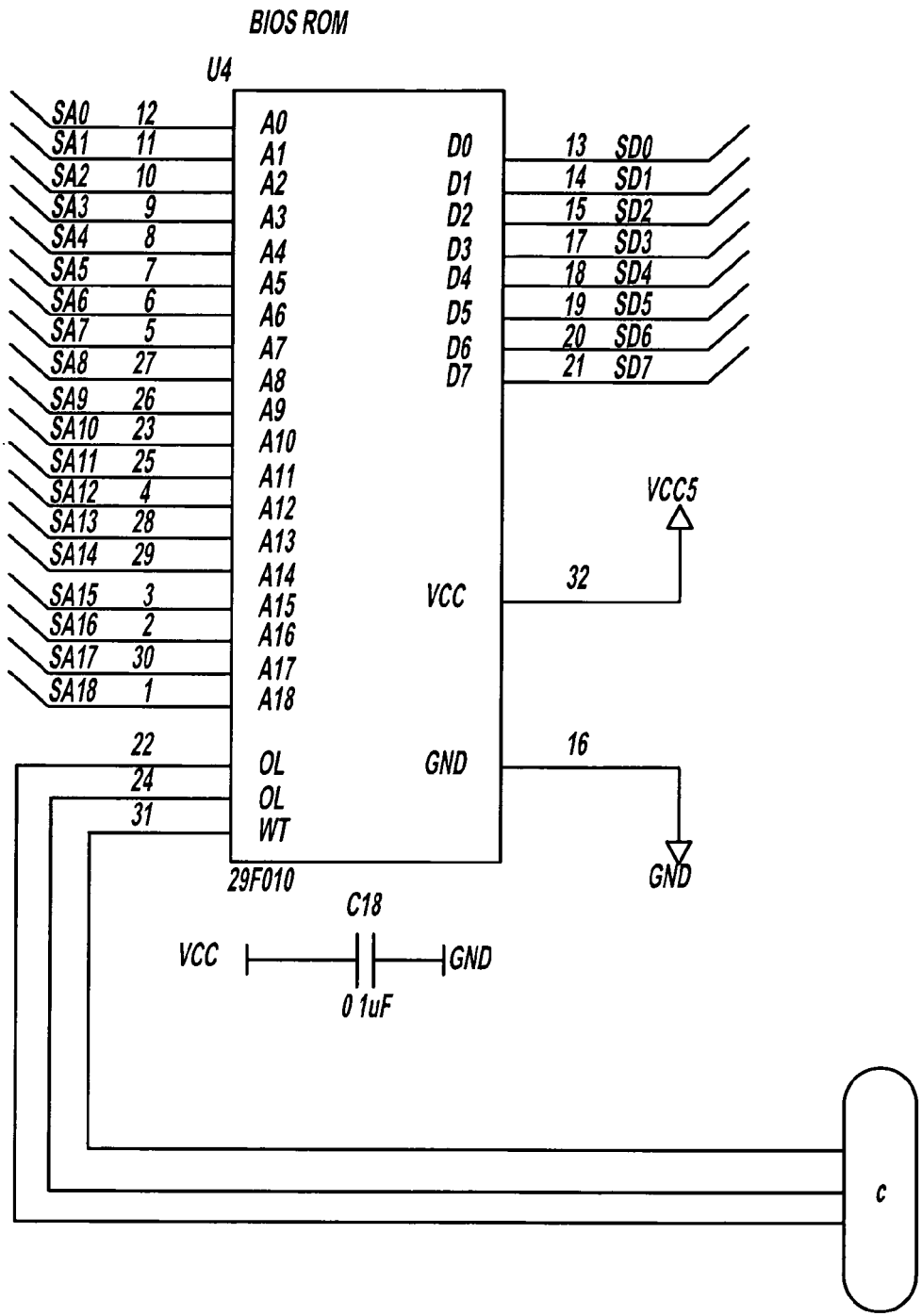
FIG. 4 illustrates device mainboard schematic.
Figures 2, 2E, 3, 4, 5:
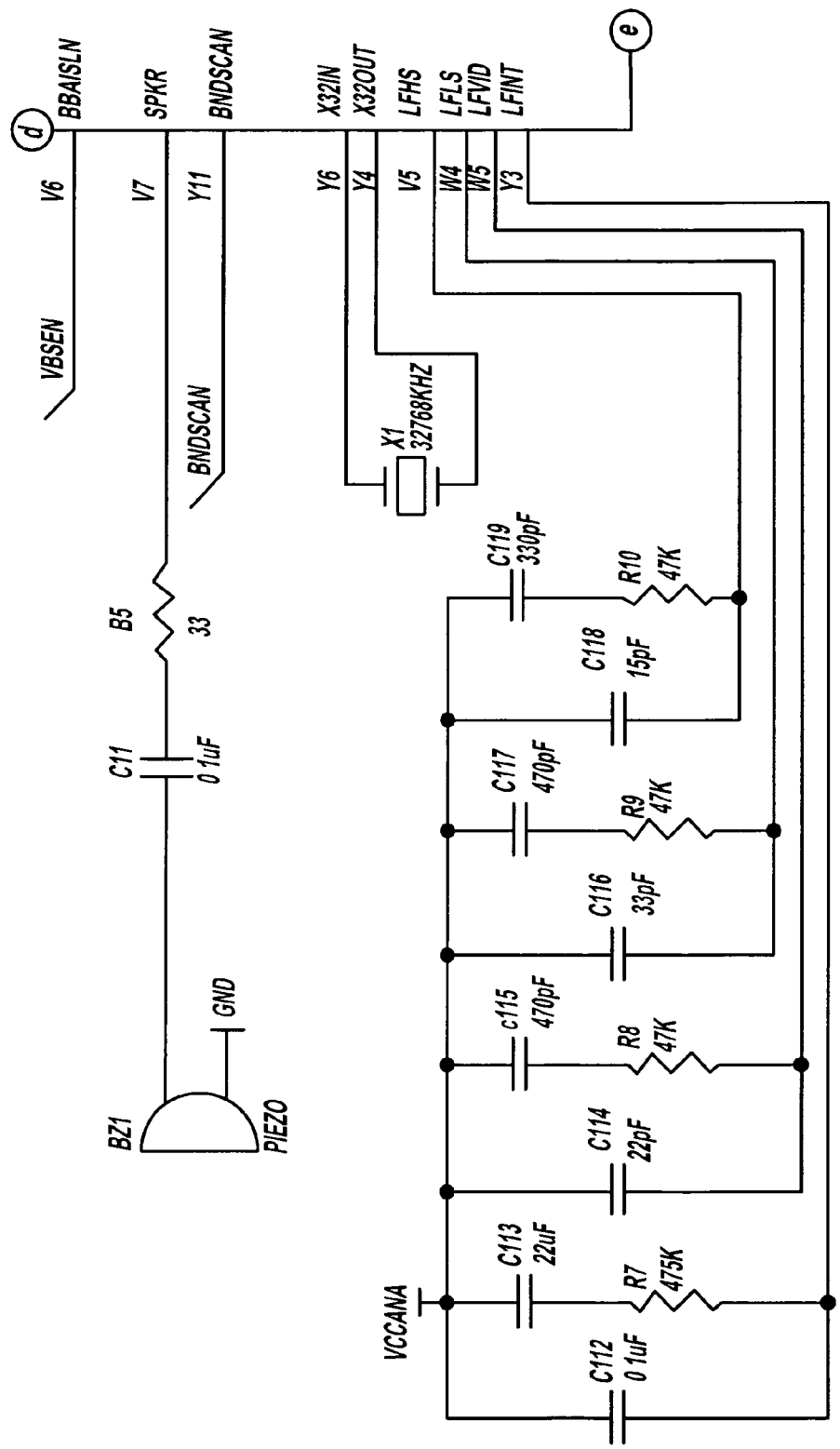
FIG. 5 illustrates device mainboard schematic: Serial devices (RS232 port, IRDA transceiver)
Figures 2, 2E, 3, 4, 5, 6:
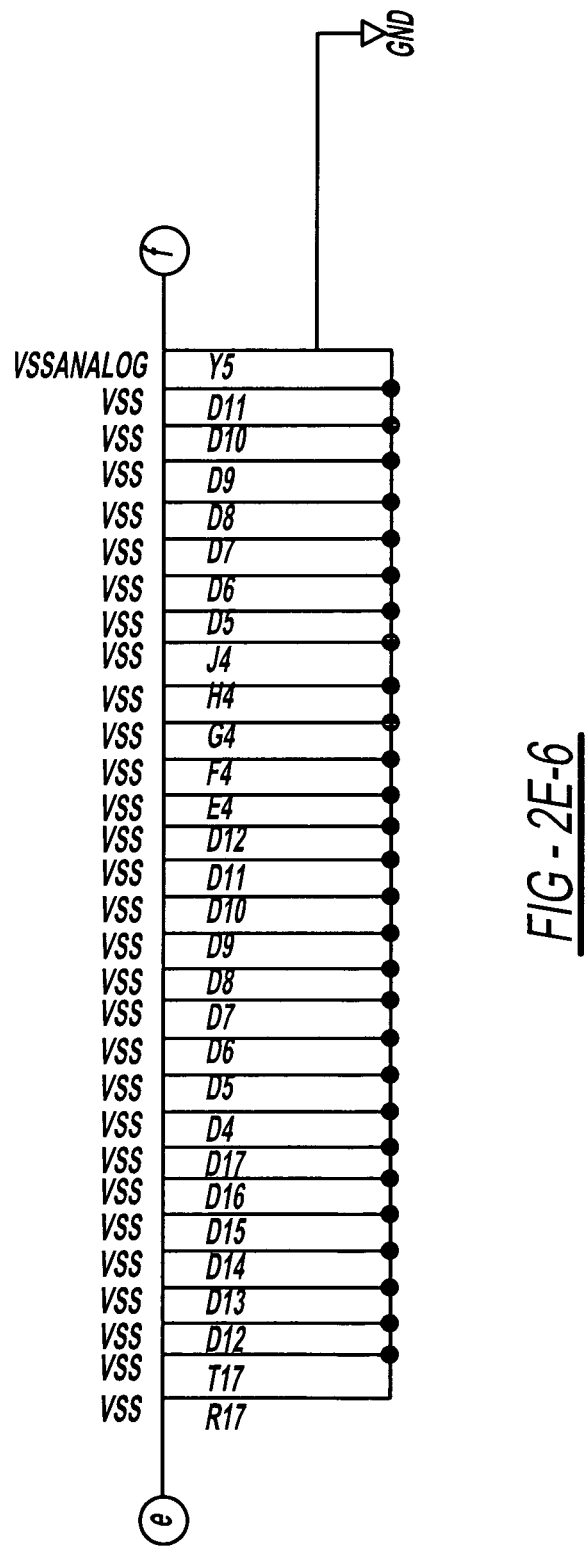
FIG. 6 illustrates device mainboard schematic: I/O devices (LCD, keypad connections)

Now turning to FIG. 4, PCMCIA sockets are provided for attachment of industry-standard PCMCIA devices. Serial interfaces are depicted in FIG. 5. LCD and keypad are shown in FIG. 6. An alphanumeric LCD interface and a 4-key keypad interface are provided for user input/output capabilities.

Figures 2, 2E, 3, 4, 5, 6, 7:
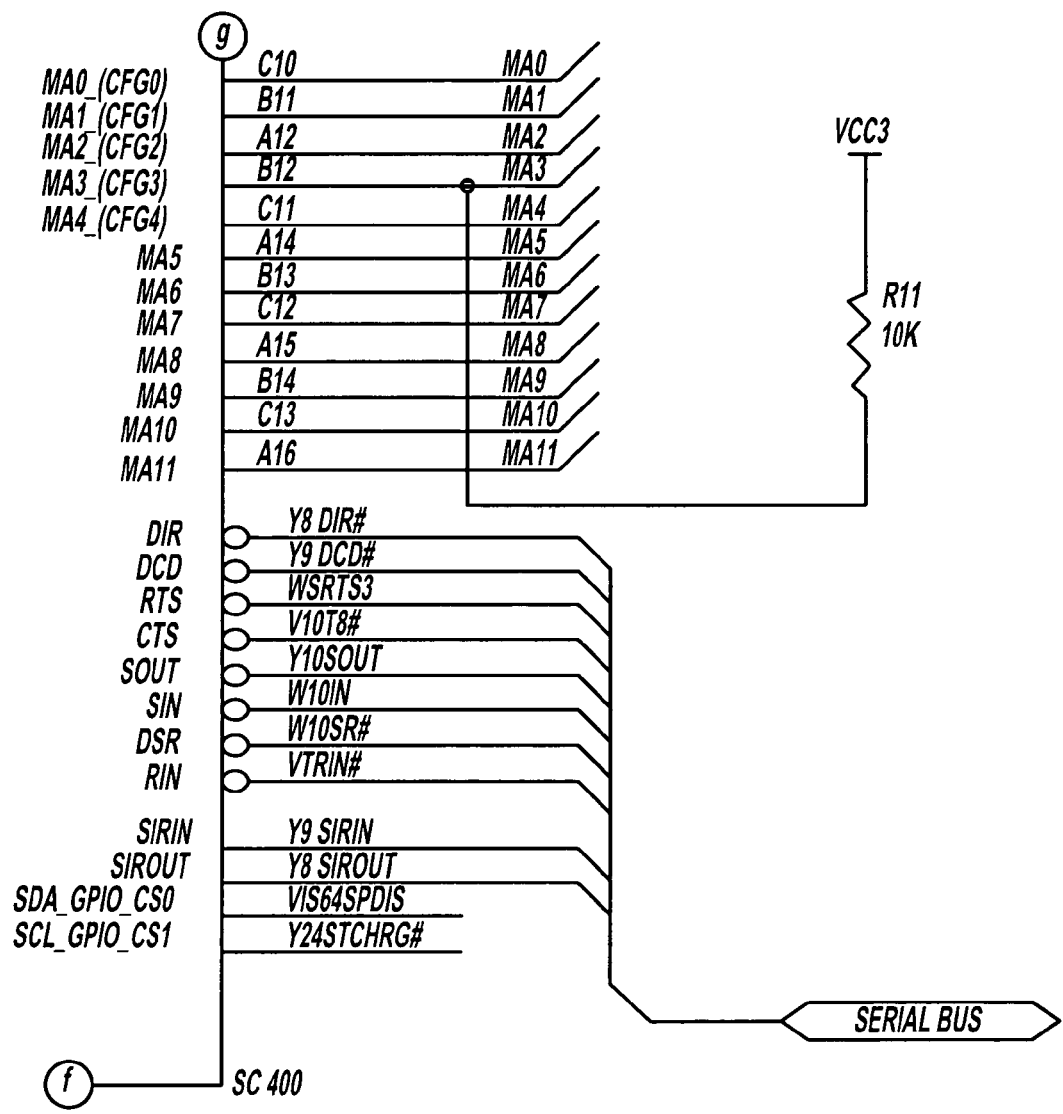
FIG. 7 illustrates device mainboard schematic: Ethernet controller.
Figures 2, 2E, 3, 4, 5, 6, 7, 8:
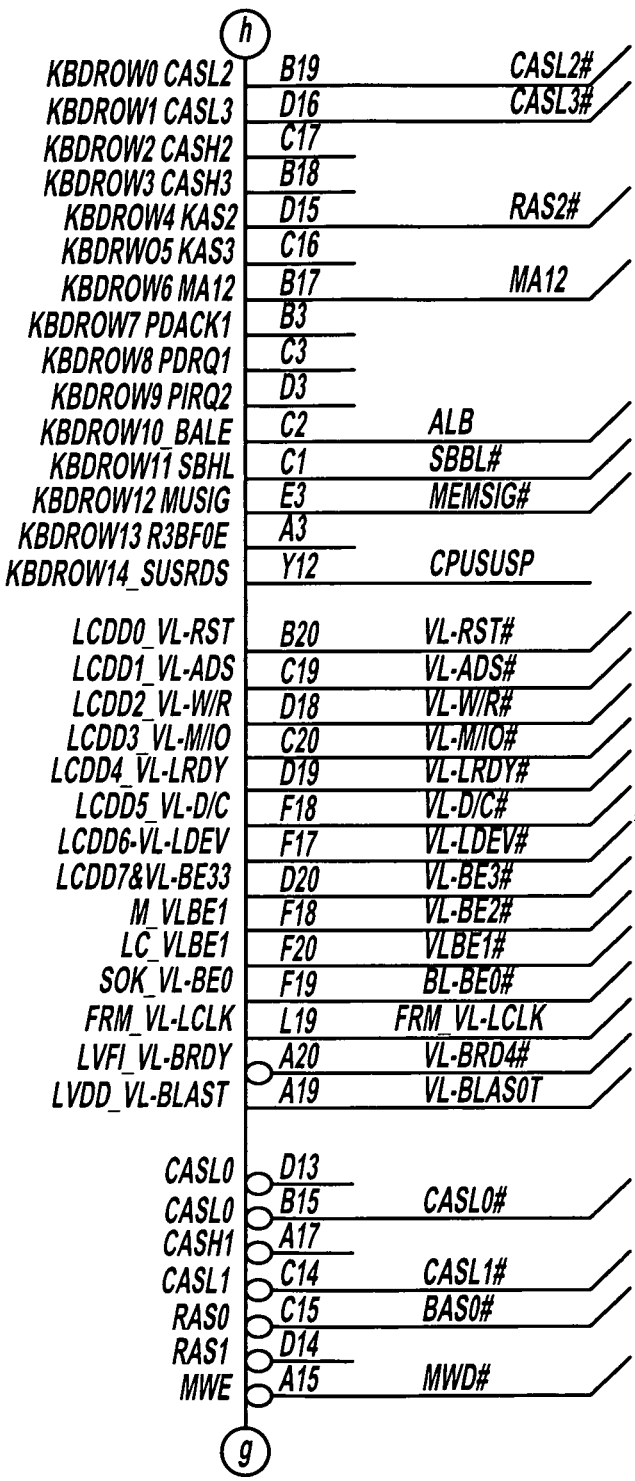
FIG. 8 illustrates device mainboard schematic: power supply interconnect.

An ethernet interface is shown in FIG. 7. A standard 10-base T Ethernet interface is implemented a Crystal Semiconductor CS8900 device. This device provides the primary user communication interface. FIG. 8 shows a power supply interconnect that forms an attachment point for a small DC-DC converter that provides system power supplies.

Figures 2, 2E, 3, 4, 5, 6, 7, 8, 9:
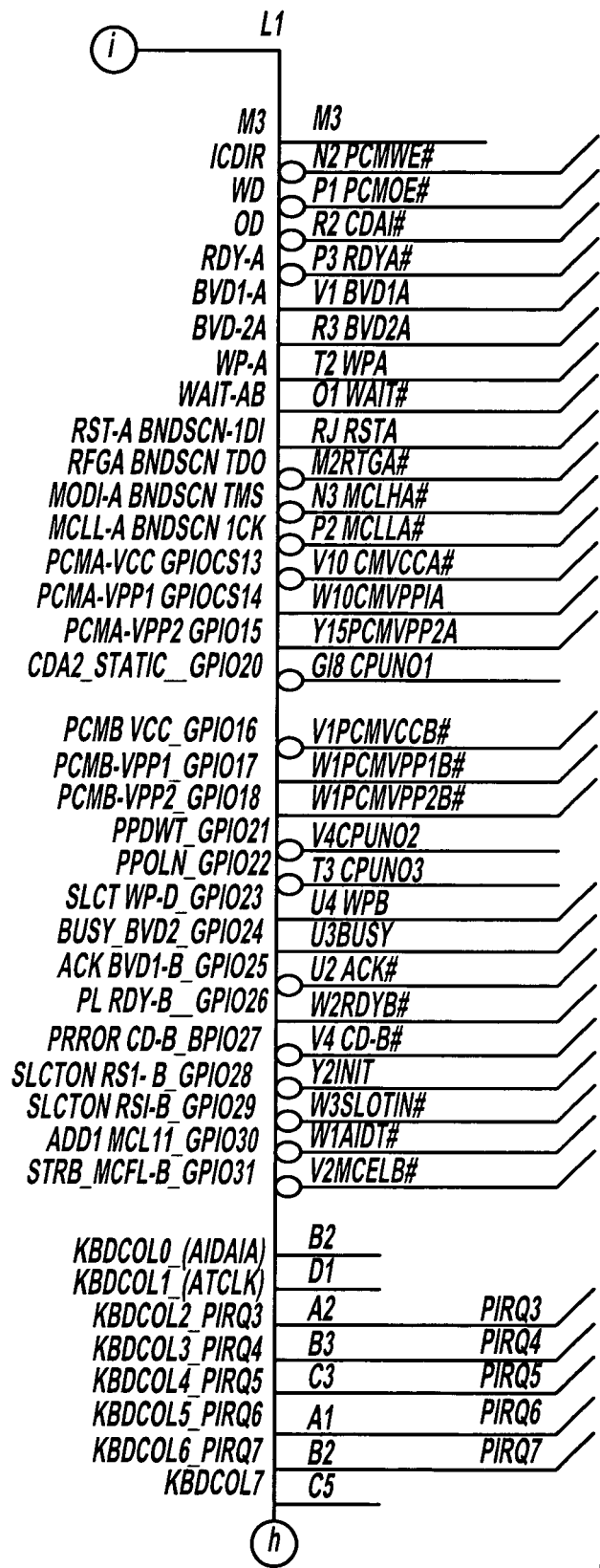
FIG. 9 illustrates device mainboard schematic: IDE device interface.
Figure 3A:
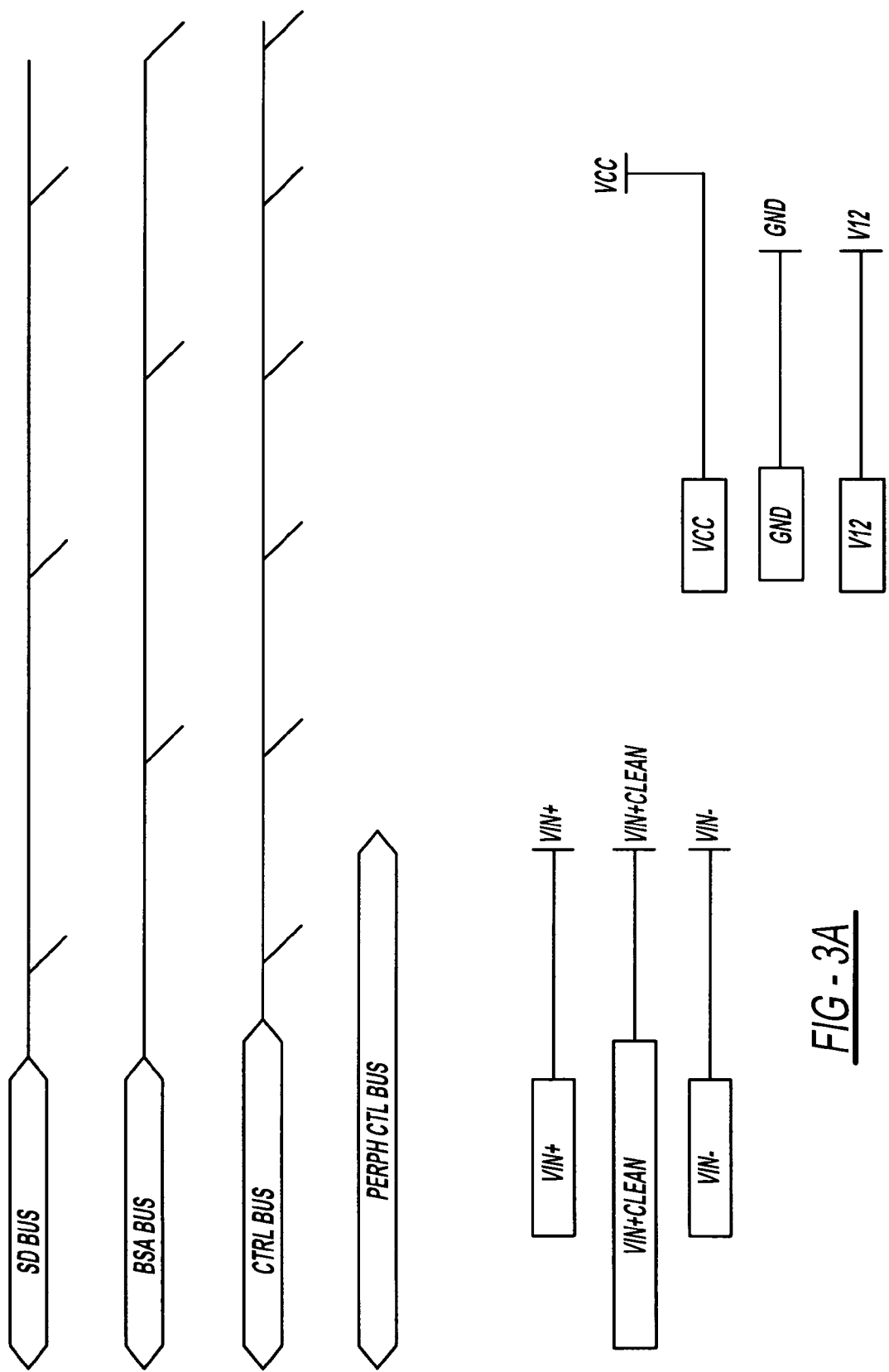
Figures 1, 3B:
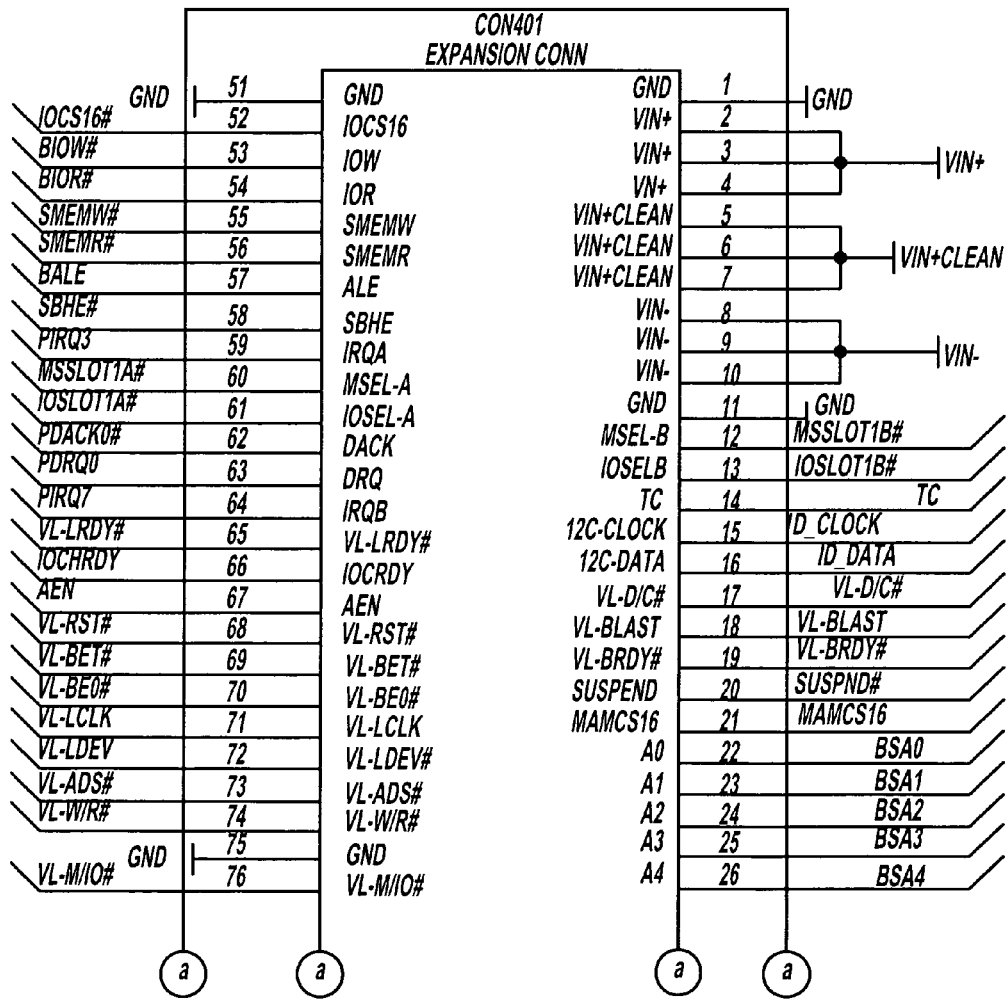
Figures 2, 3B:
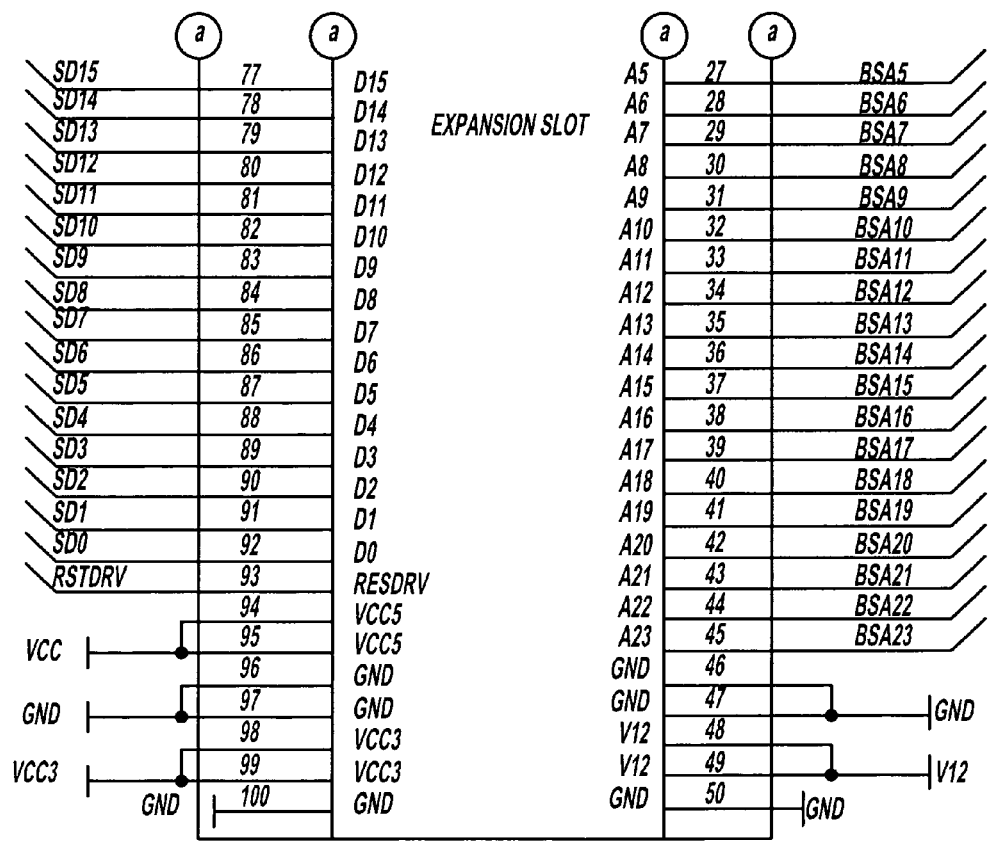
Figures 1, 3C:
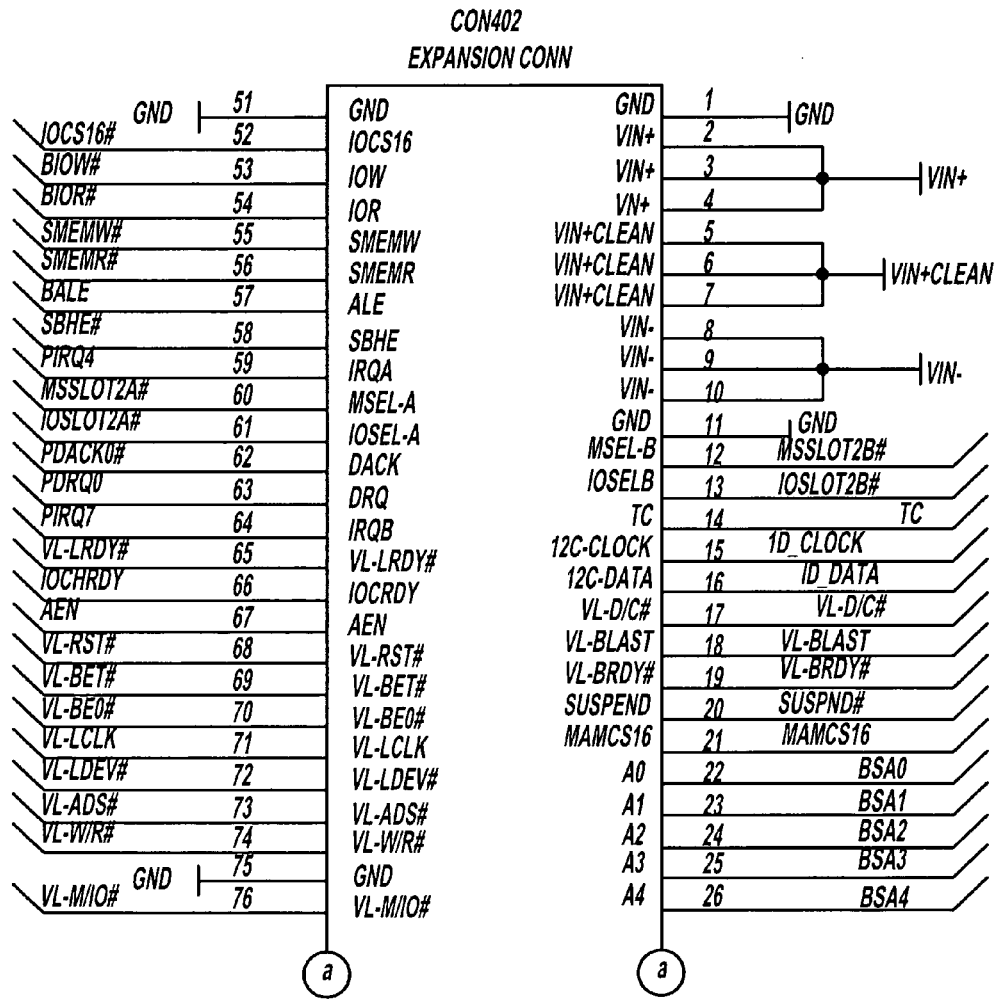
Figures 2, 3C:
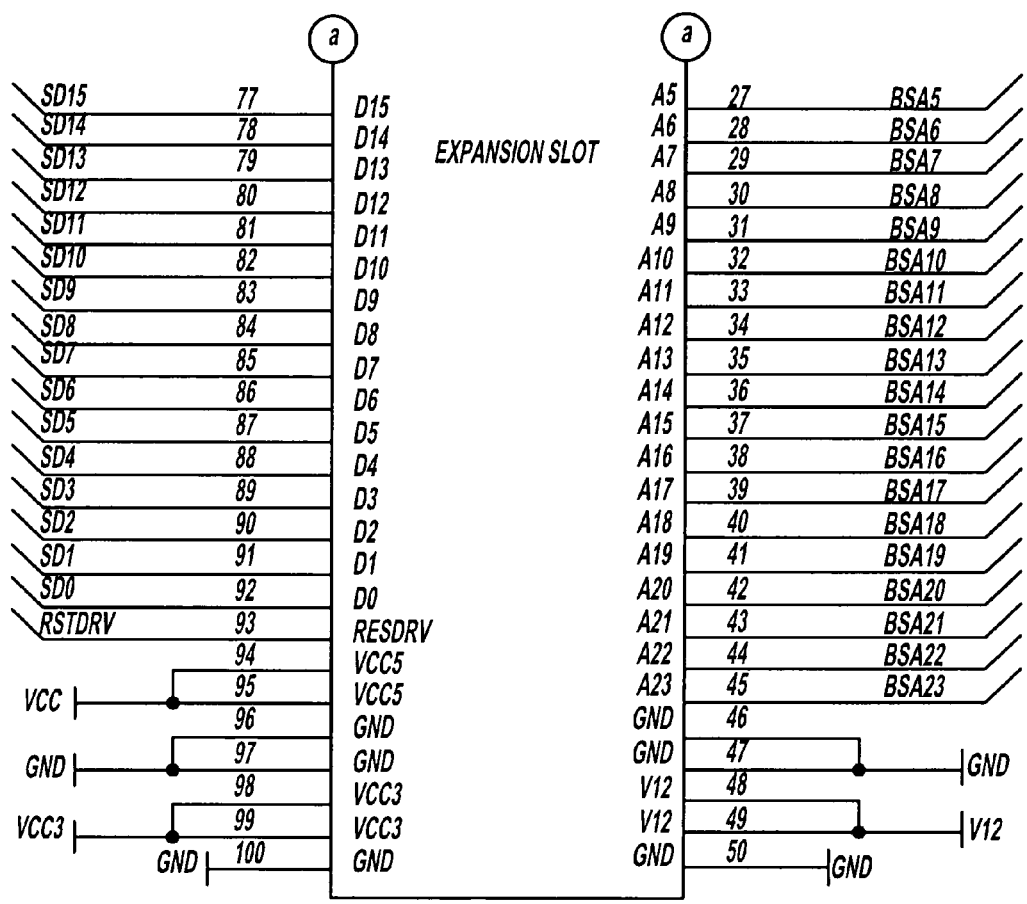
Figures 1, 3D:
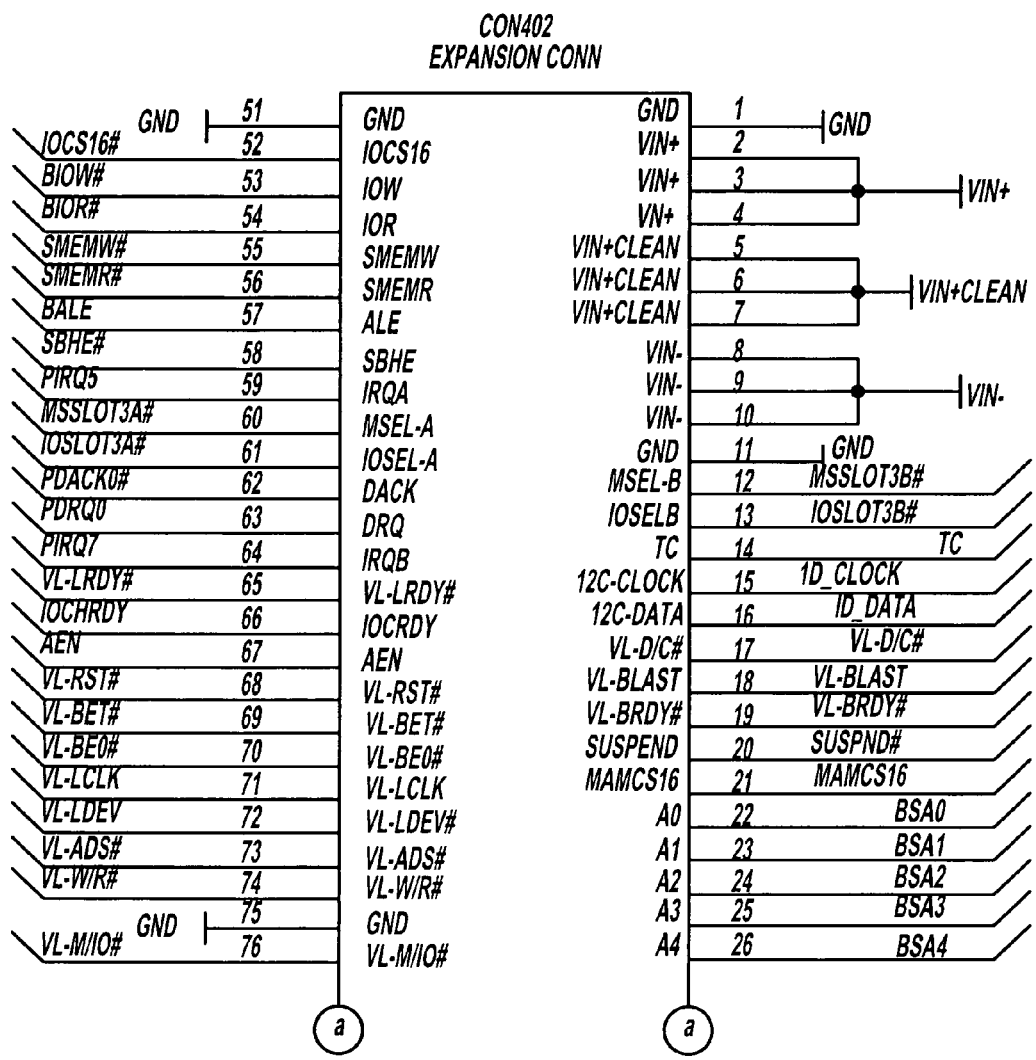
Figures 2, 3D:
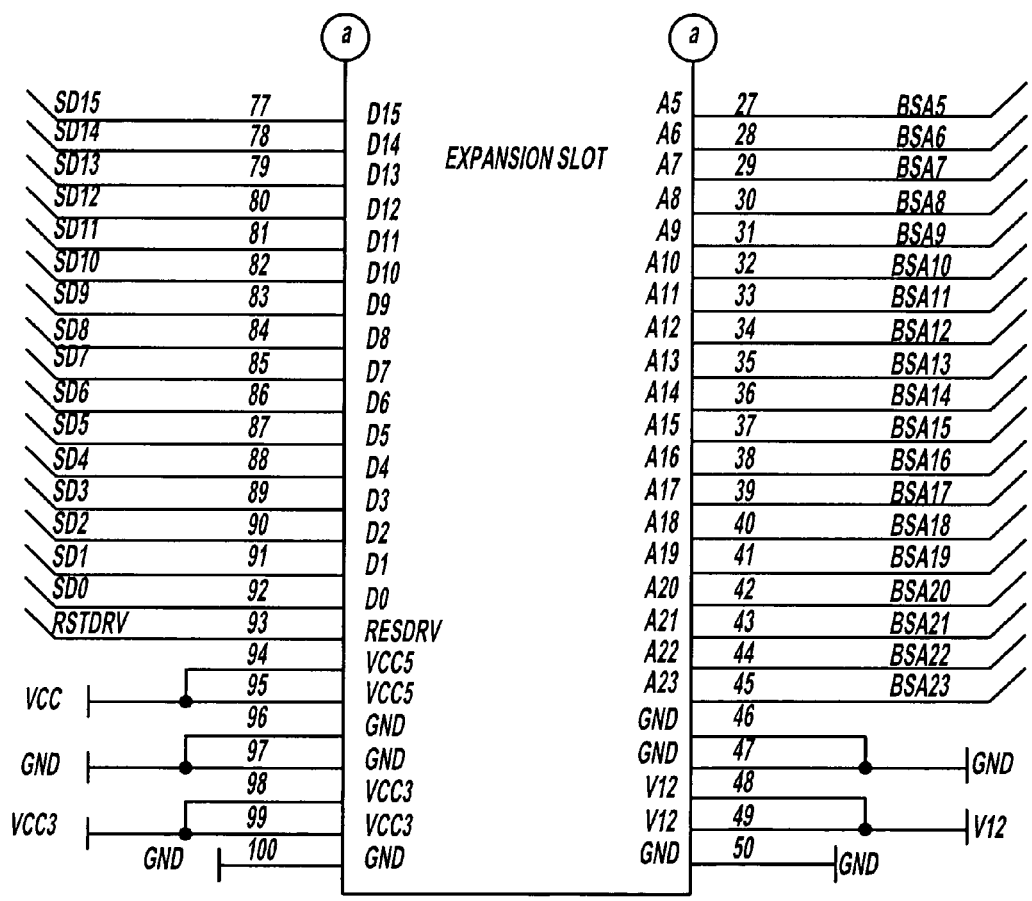
Figure 4A:
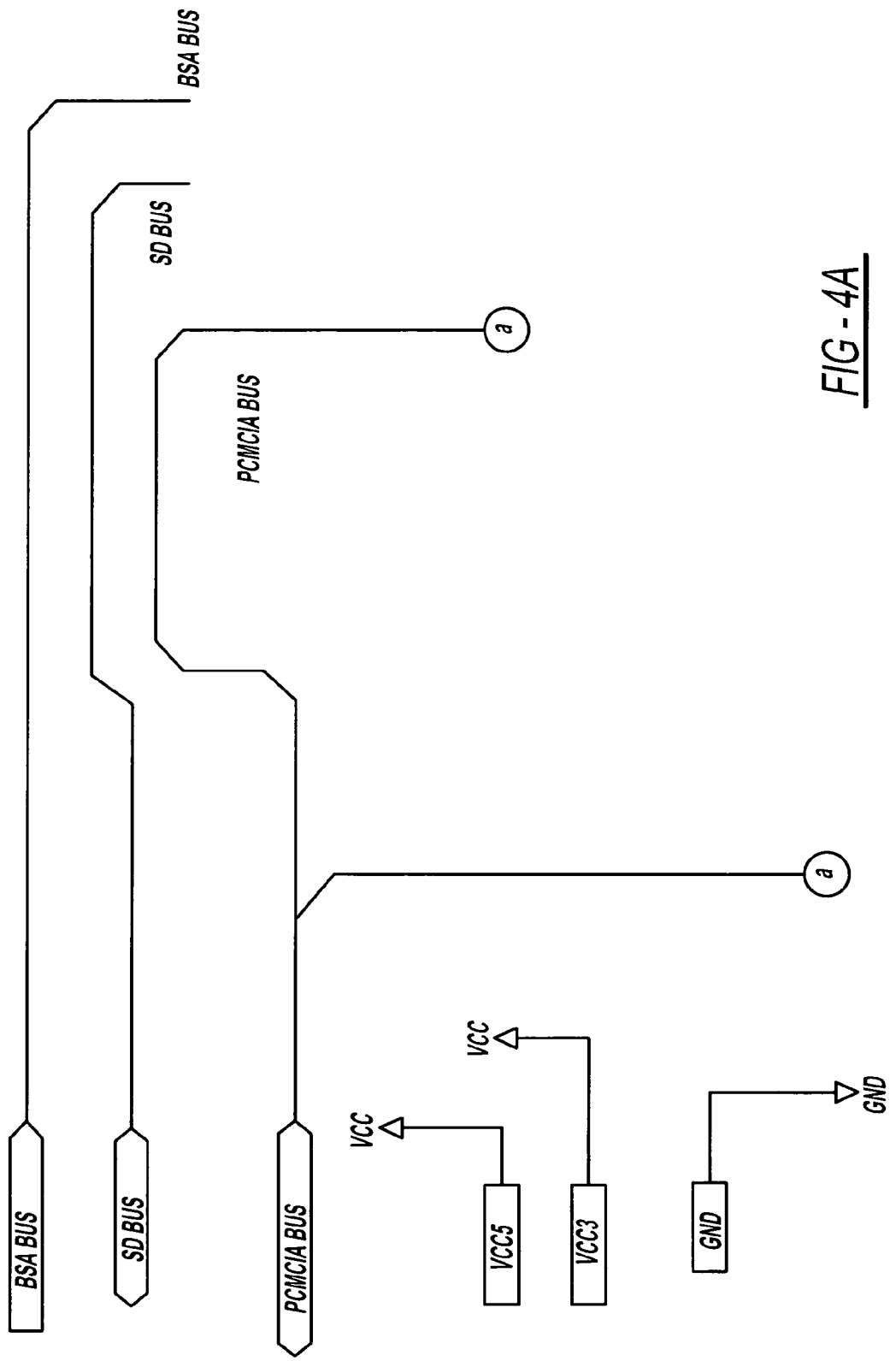
Figure 4B:
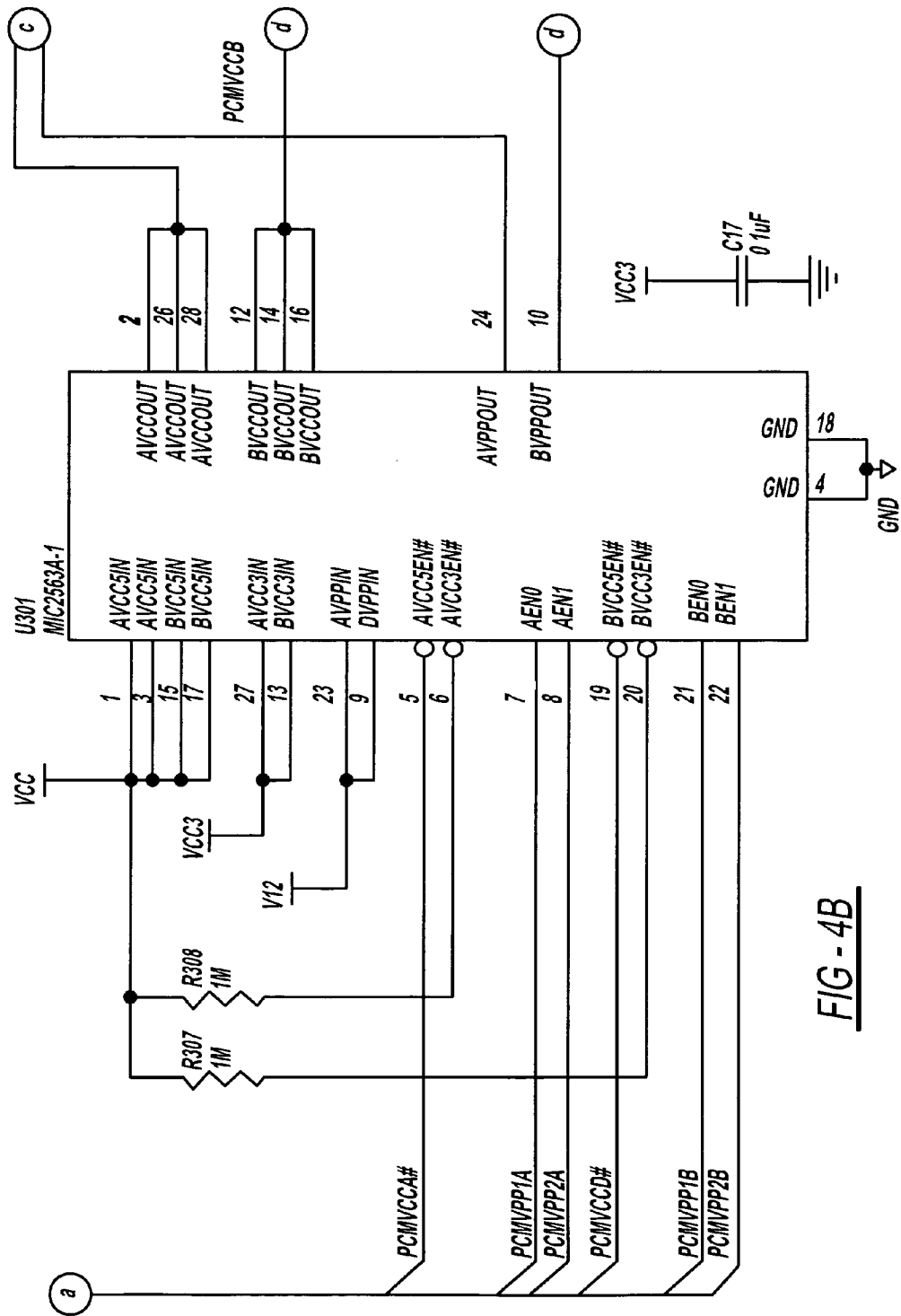
Figure 4E:
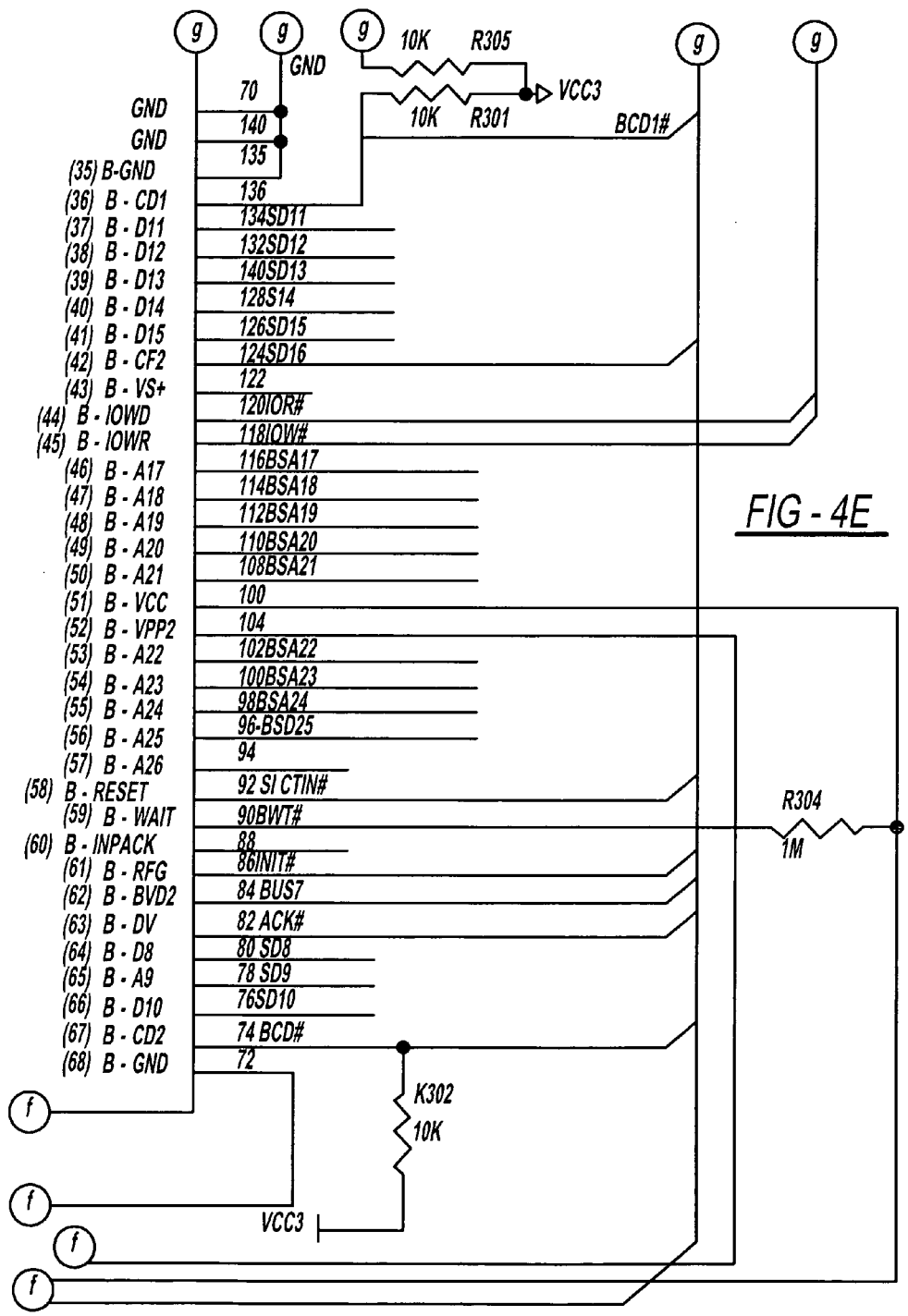
Figure 4F:
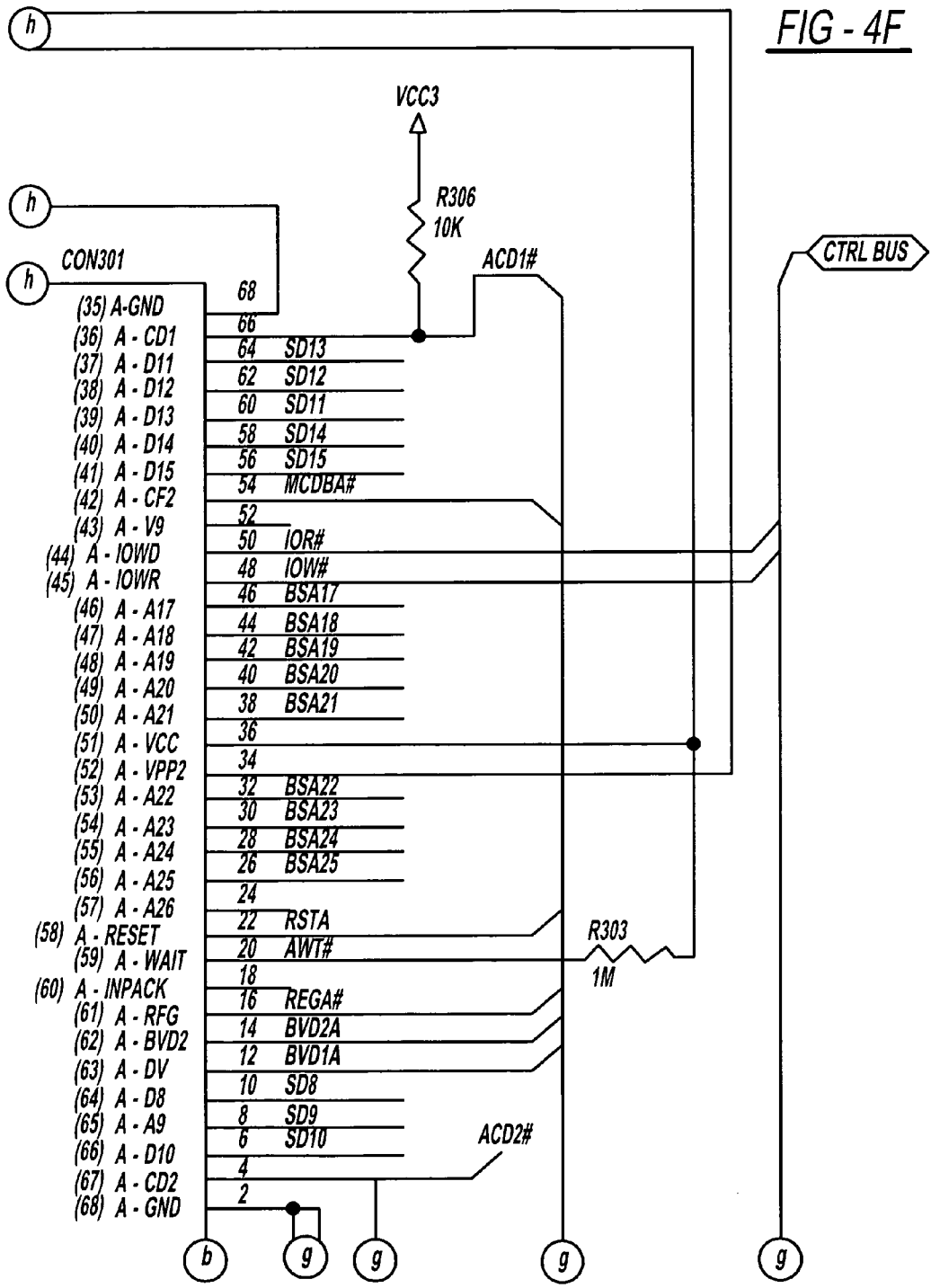
Figure 5A:
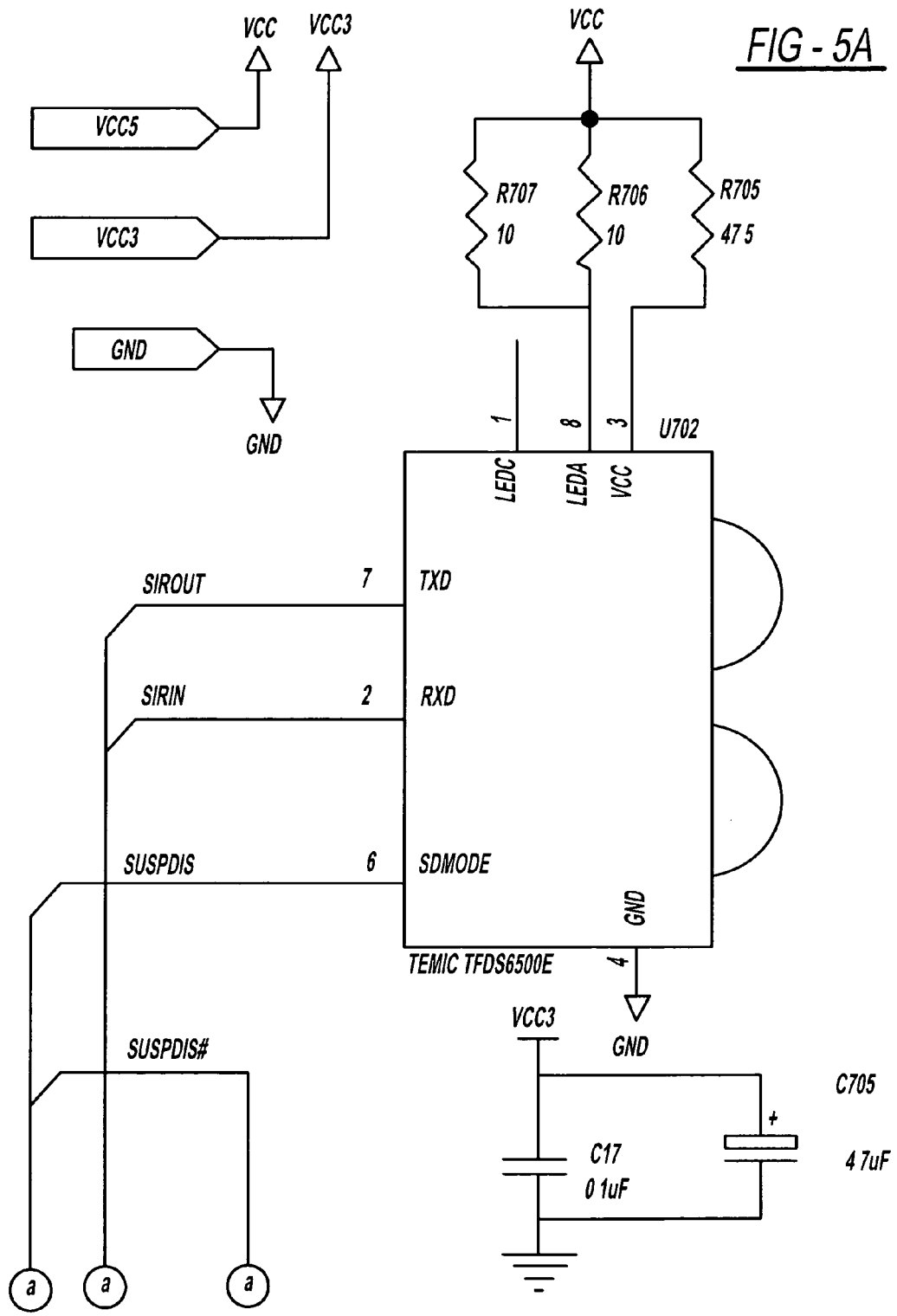
Figure 5B:
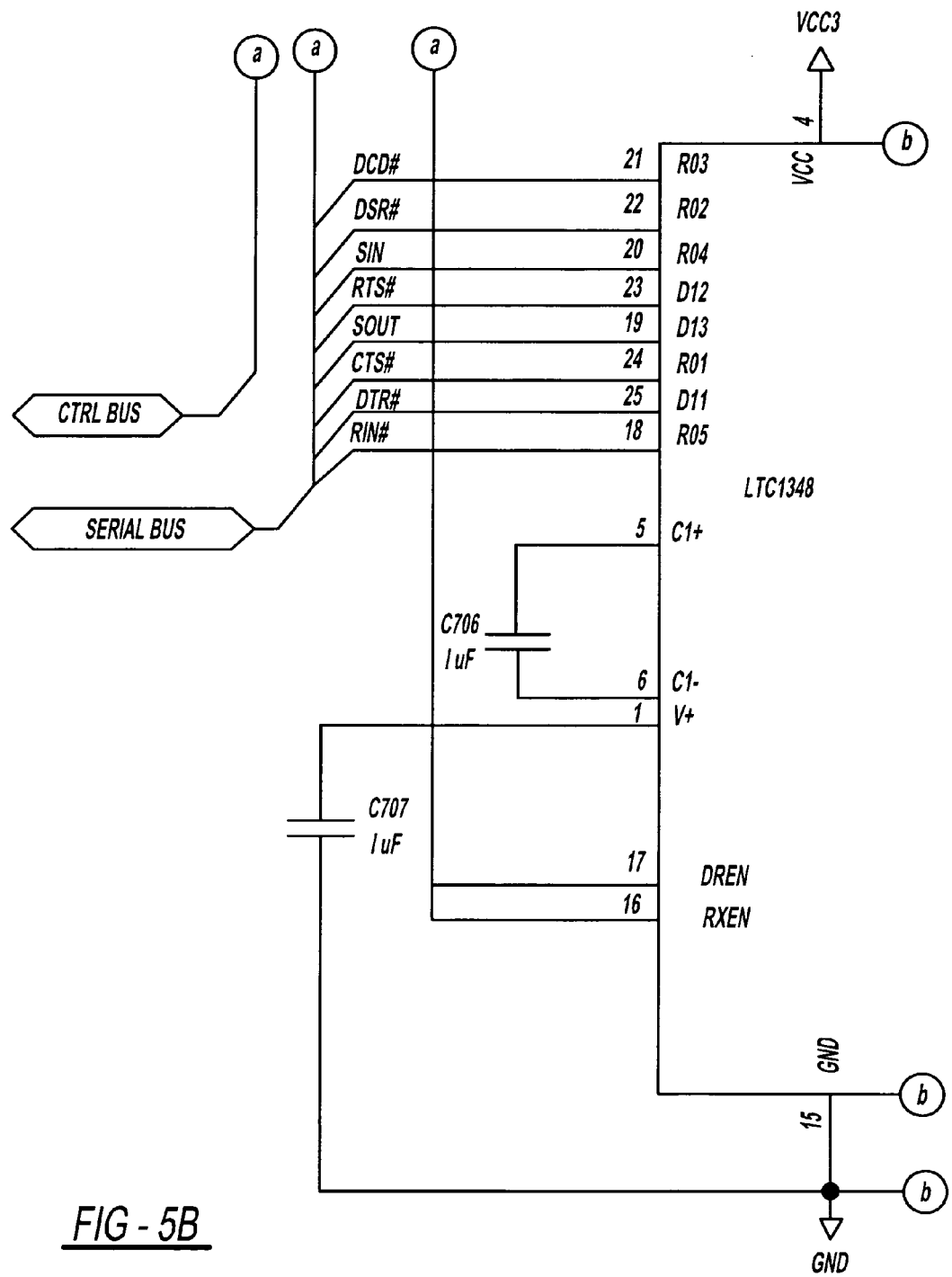
Figure 5C:
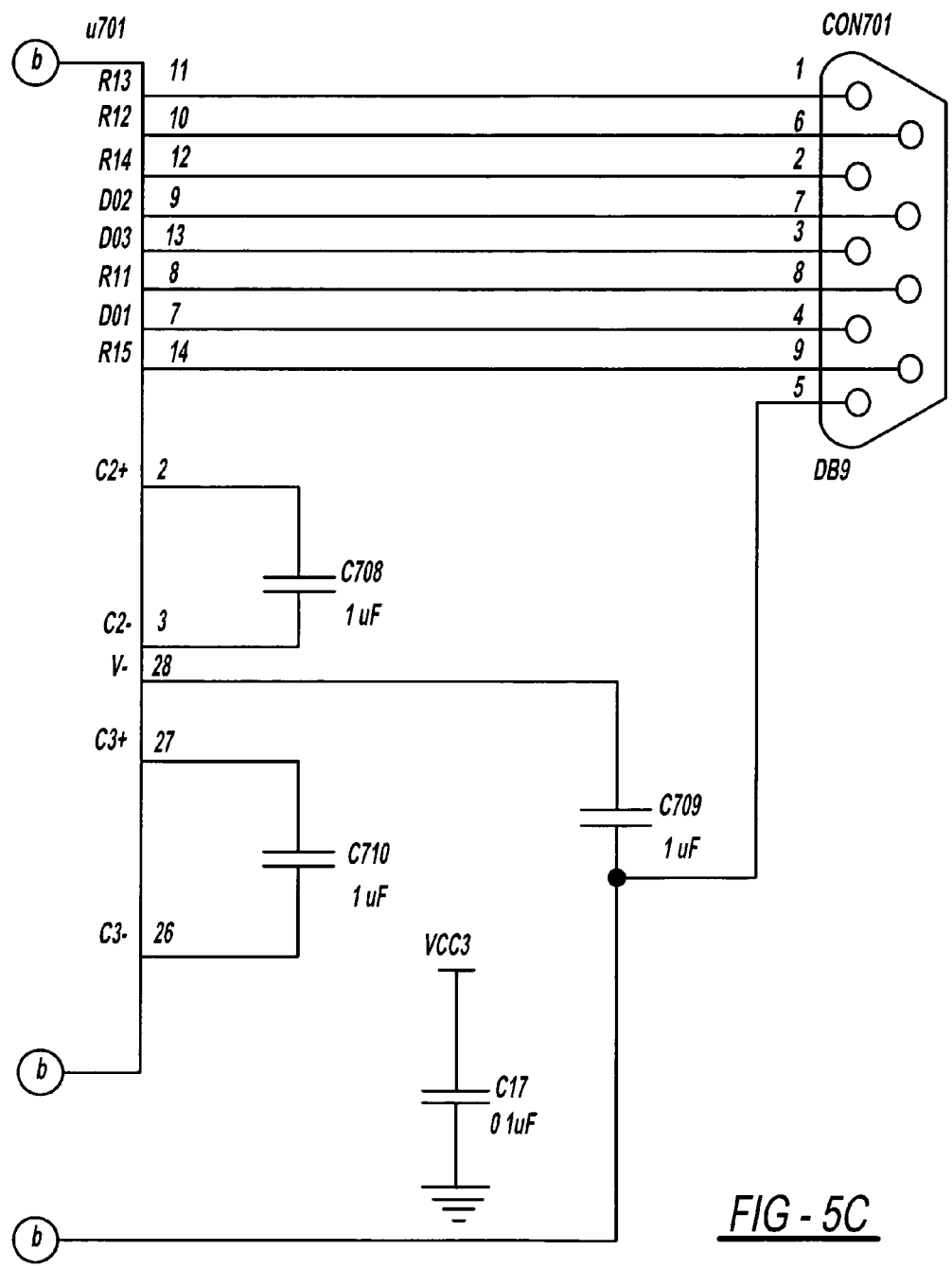
Figure 6A:
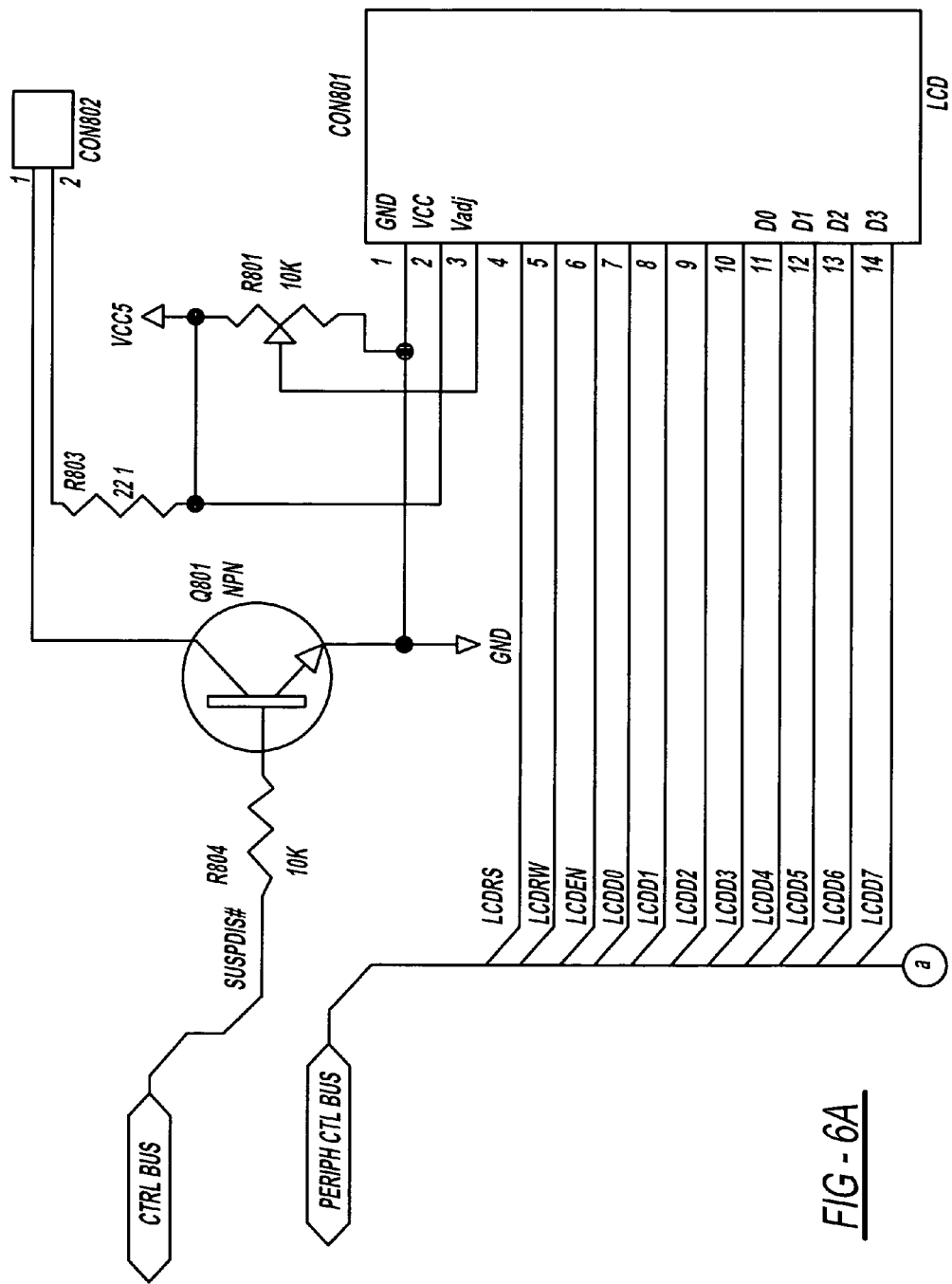
Figure 6B:
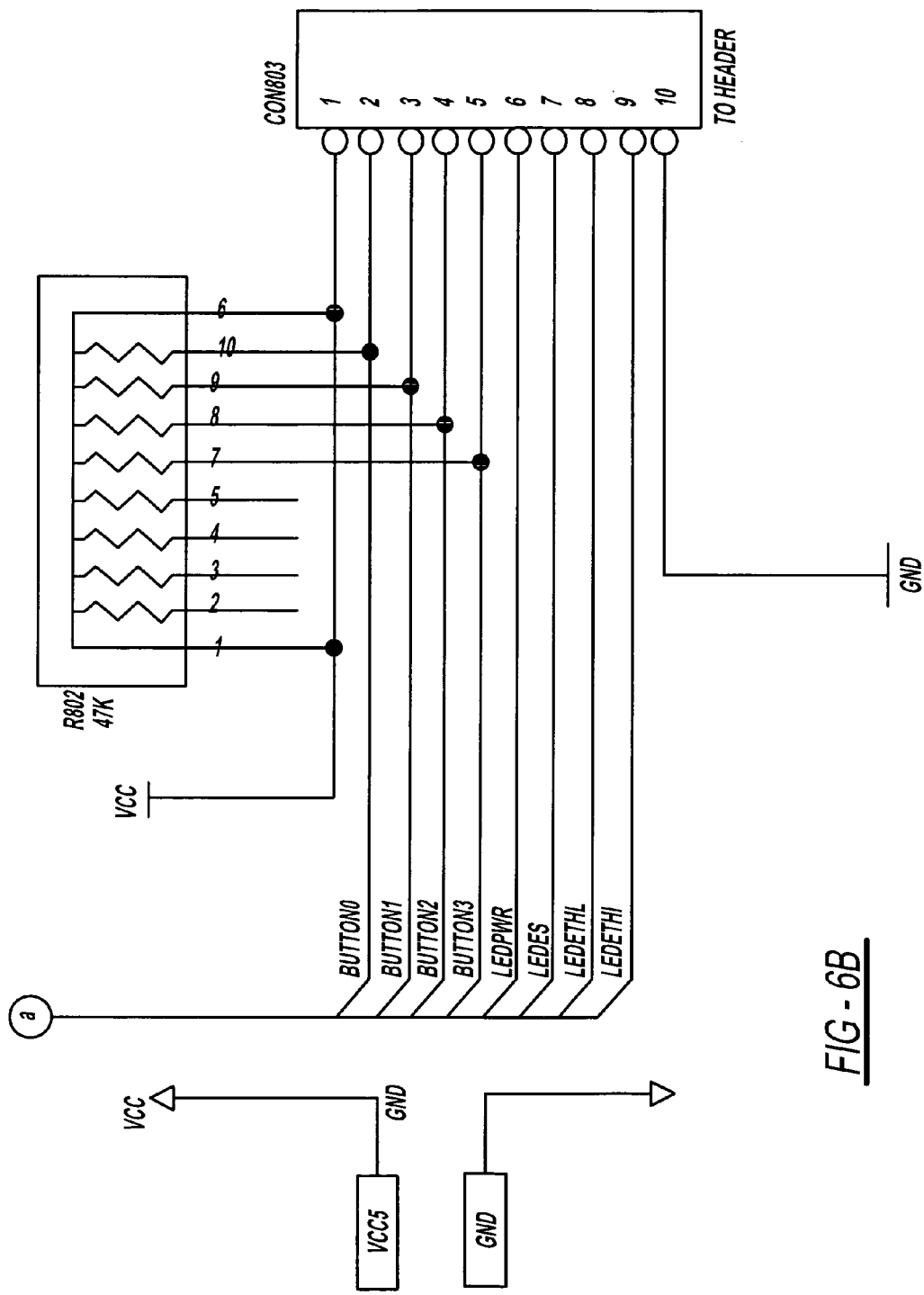
Figure 7A:
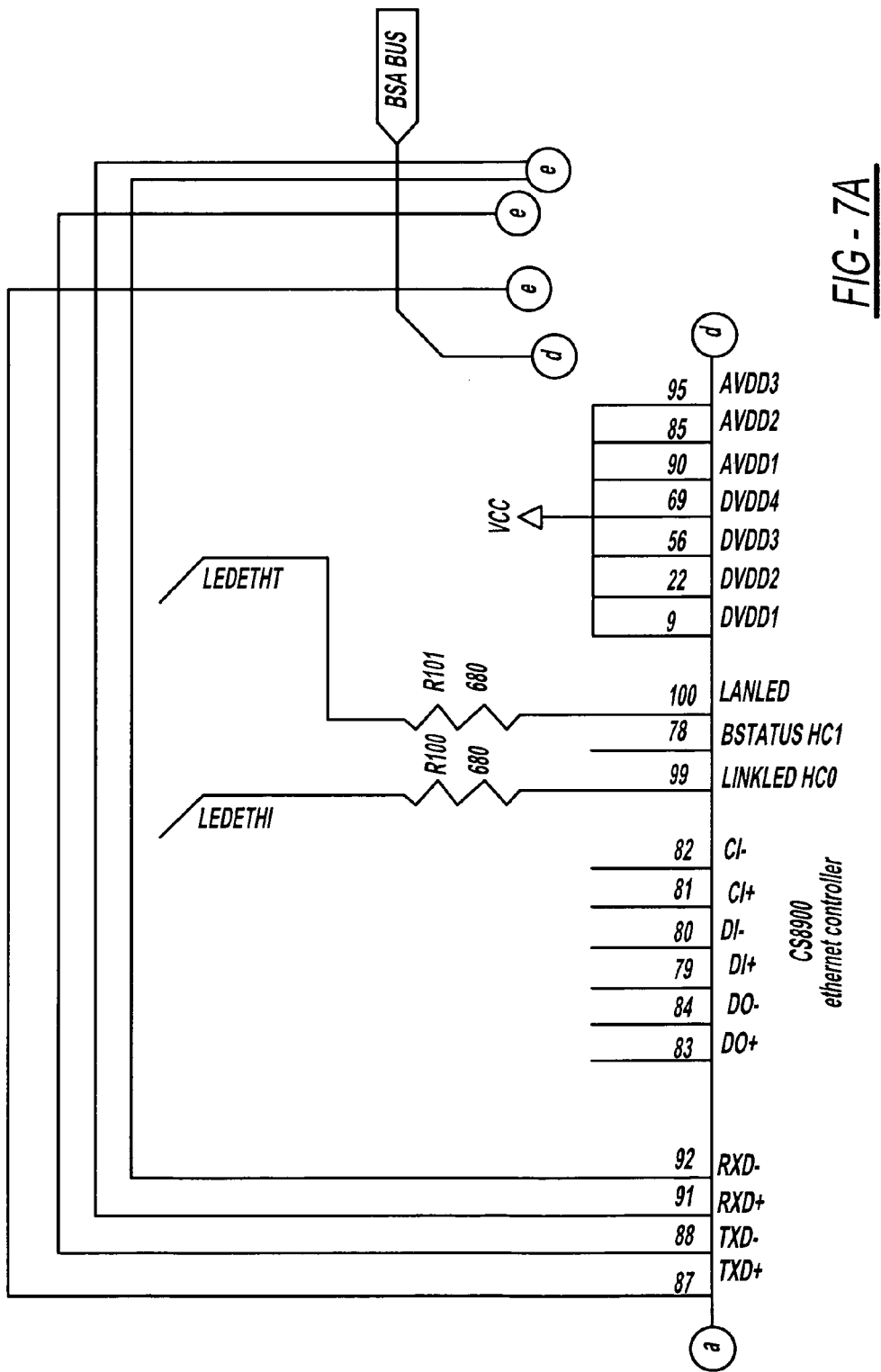
Figure 7B:
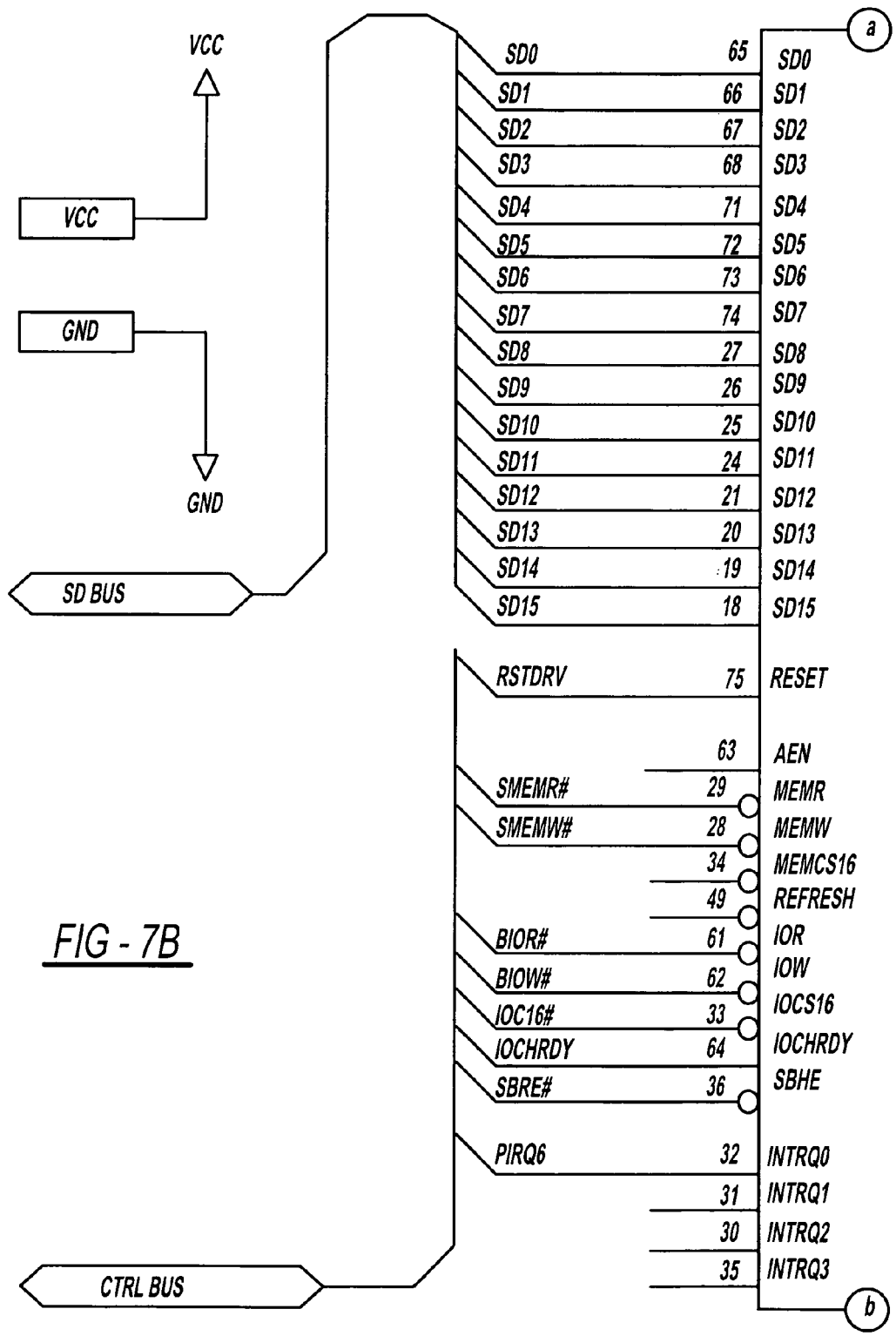
Figure 7C:
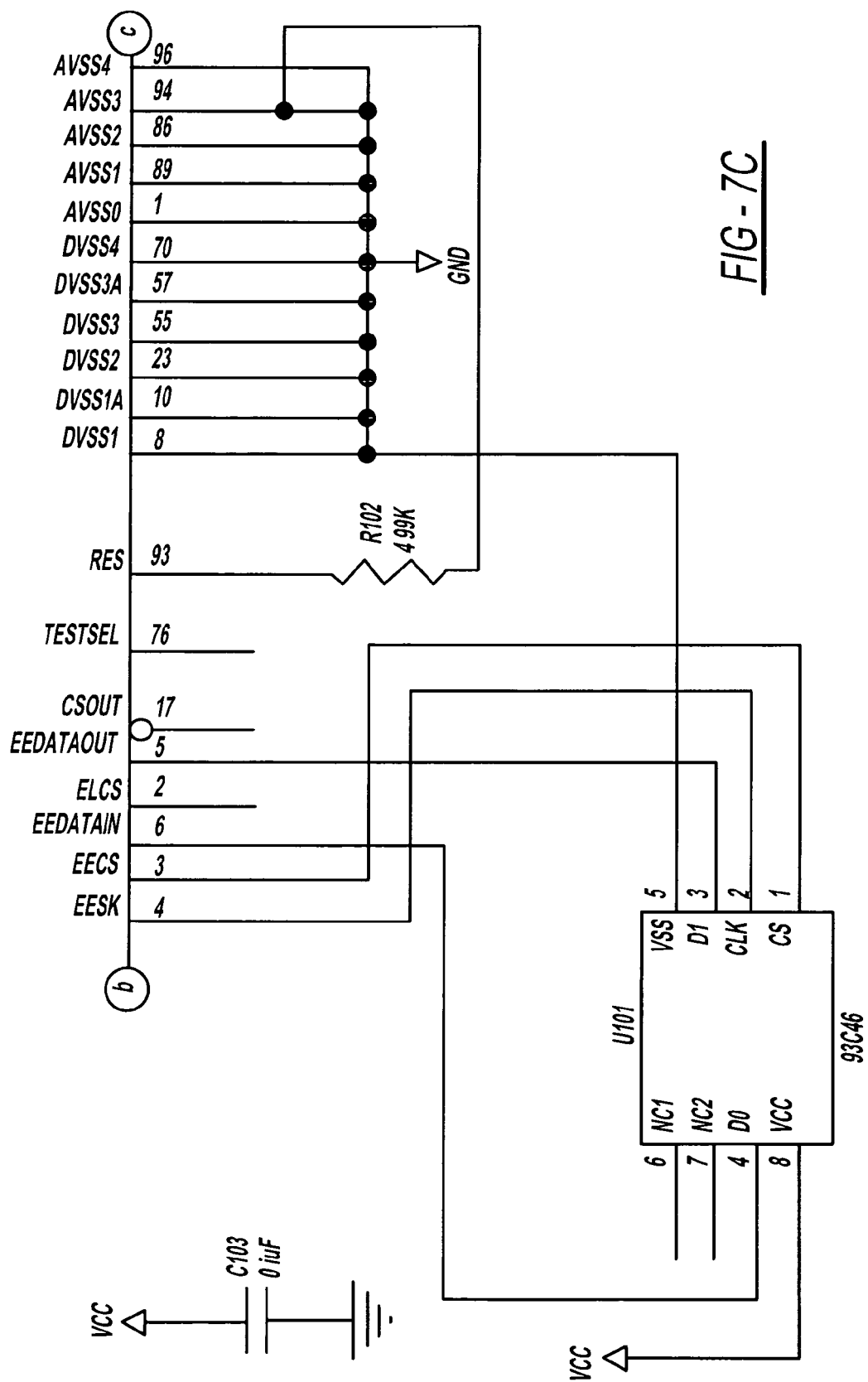
Figure 7D:
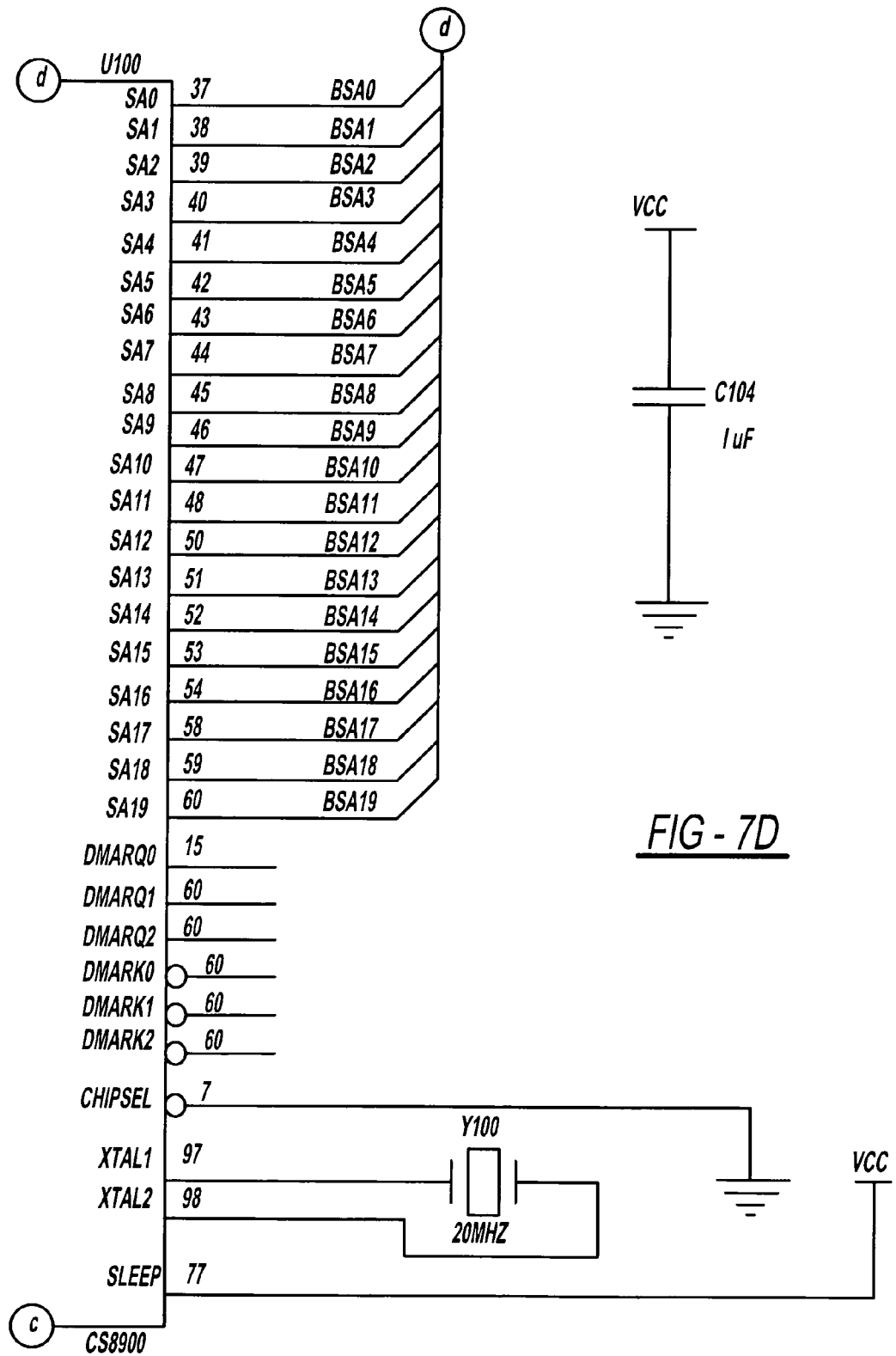
Figure 7E:
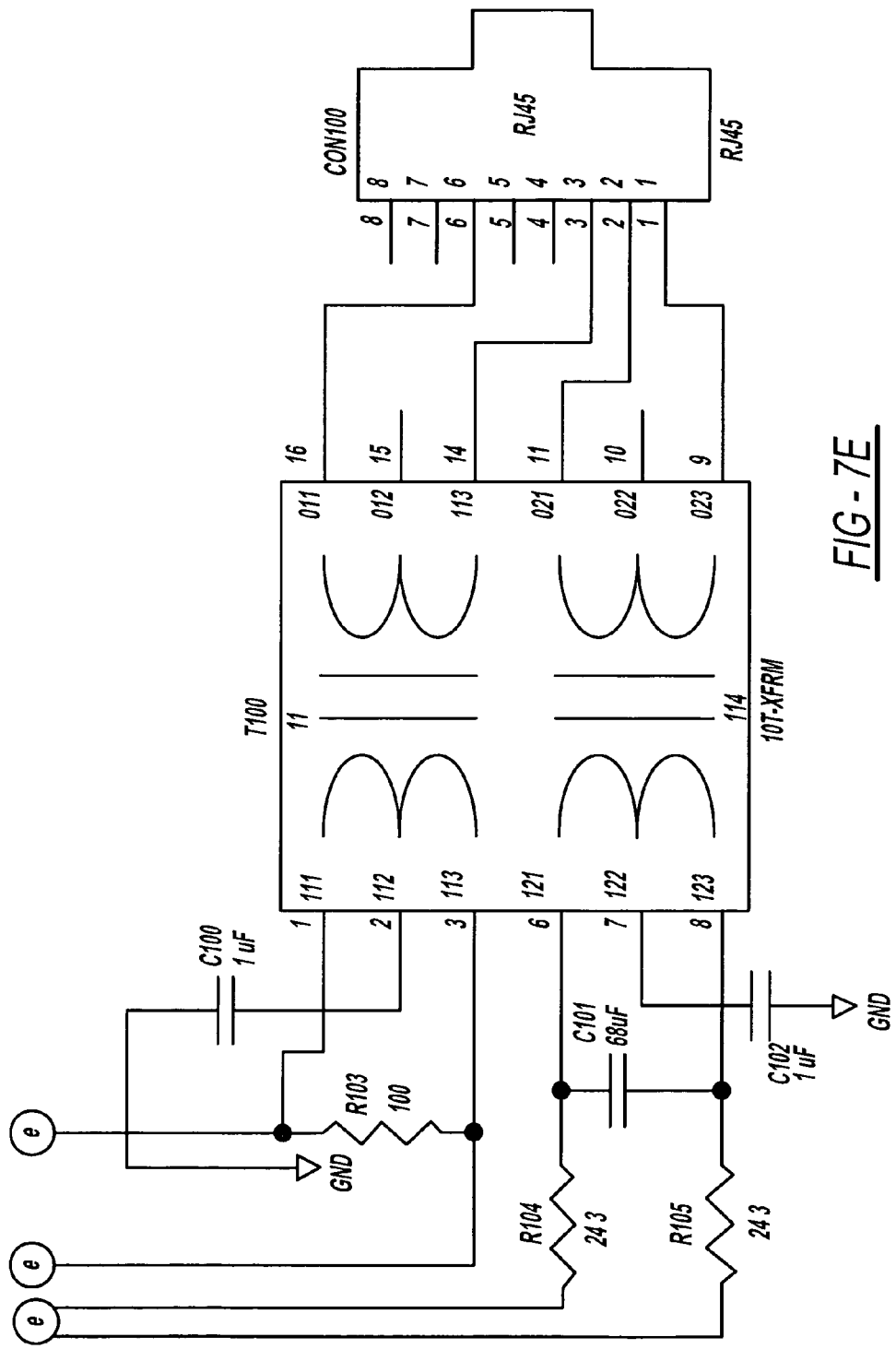
Figure 8A:
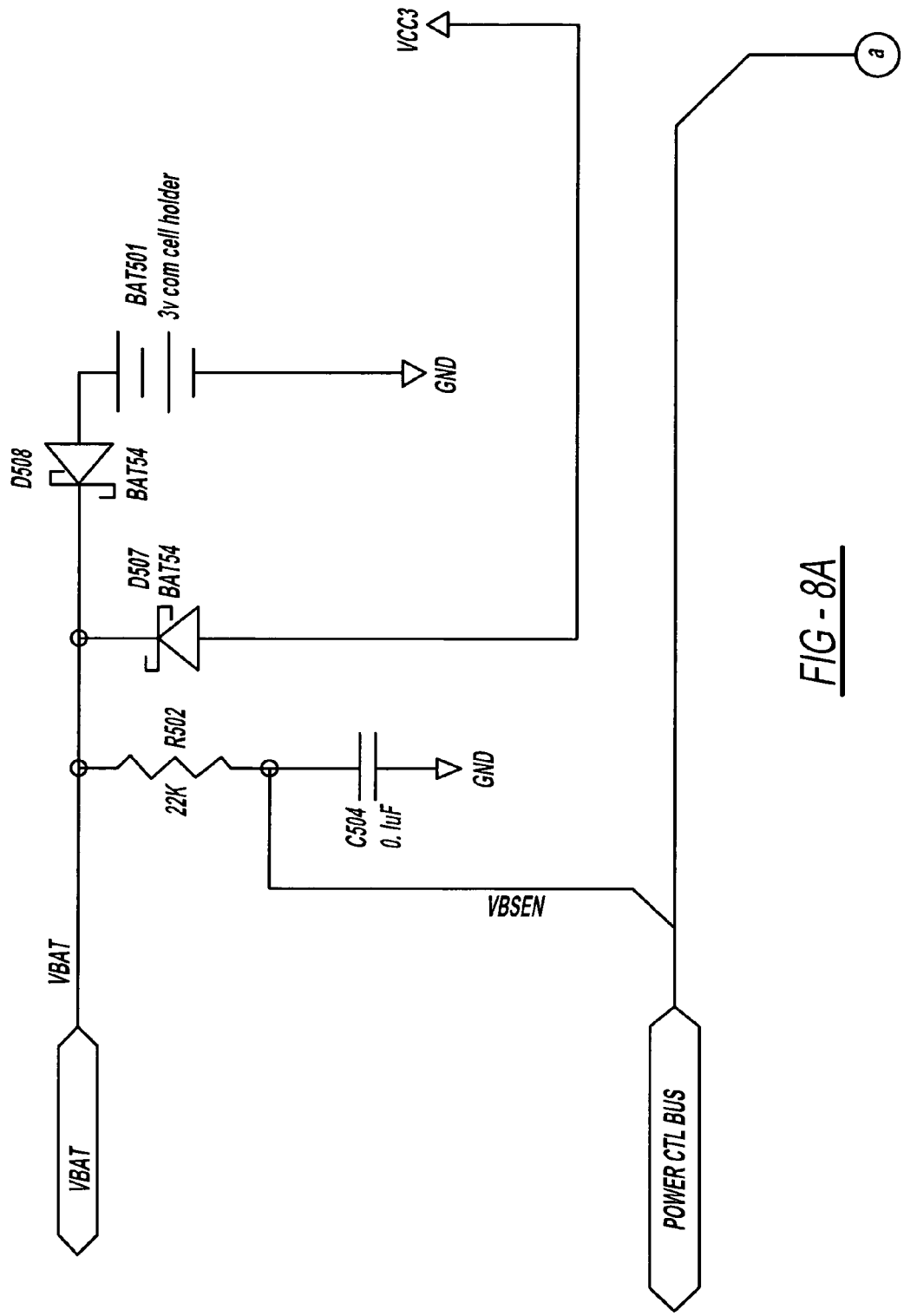
Figure 8B:
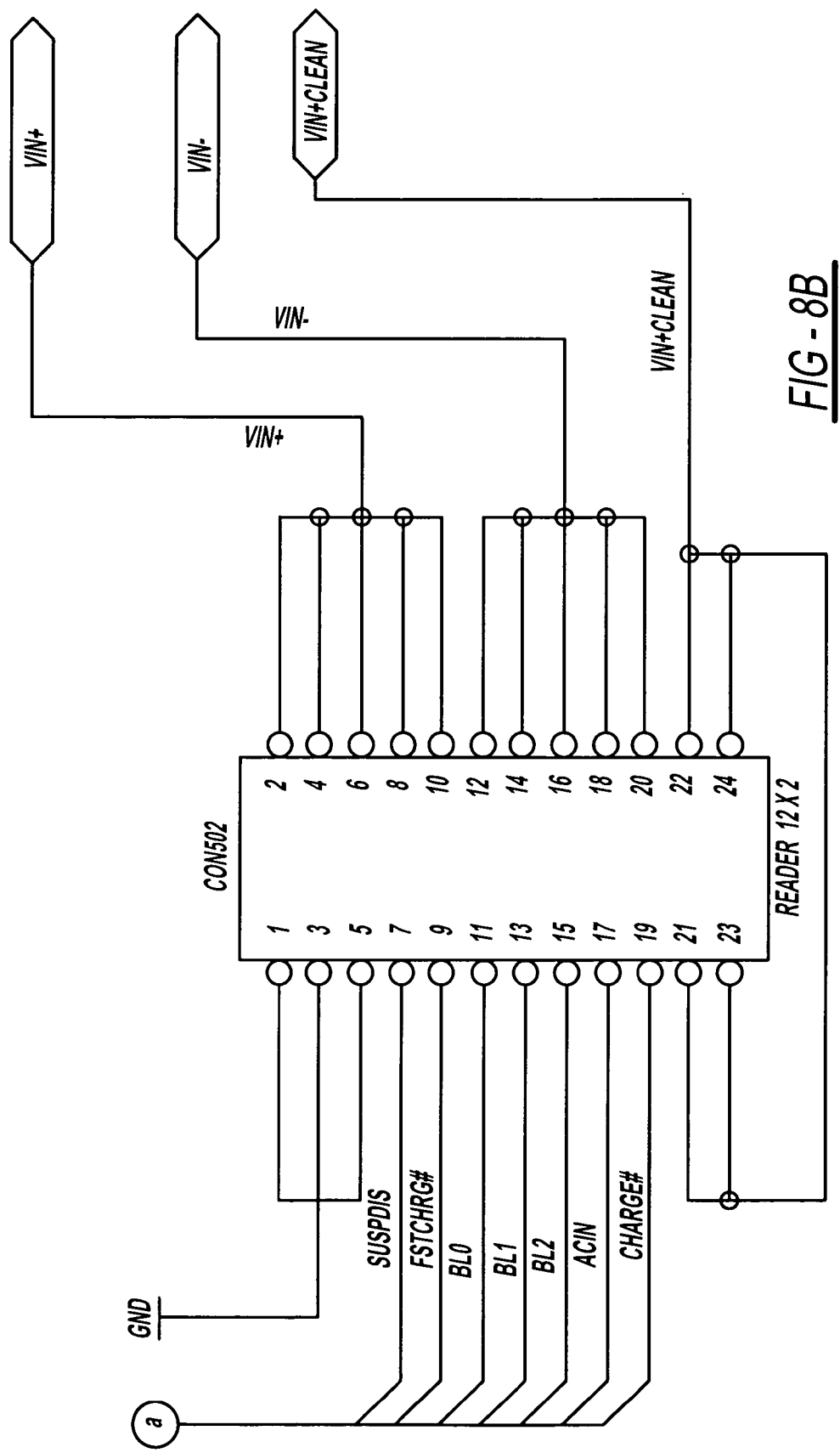
Figure 8C:
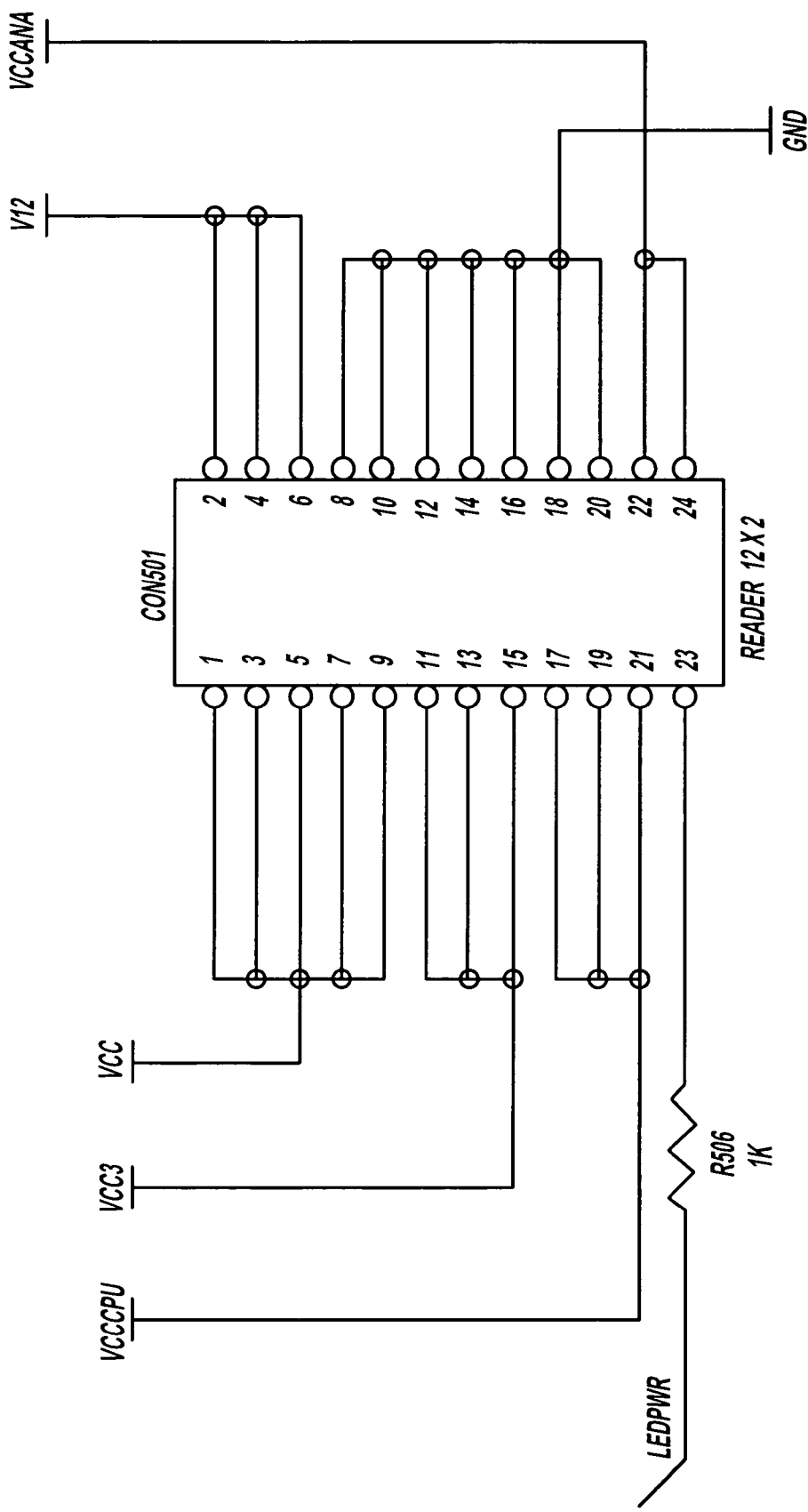
Figure 8E:
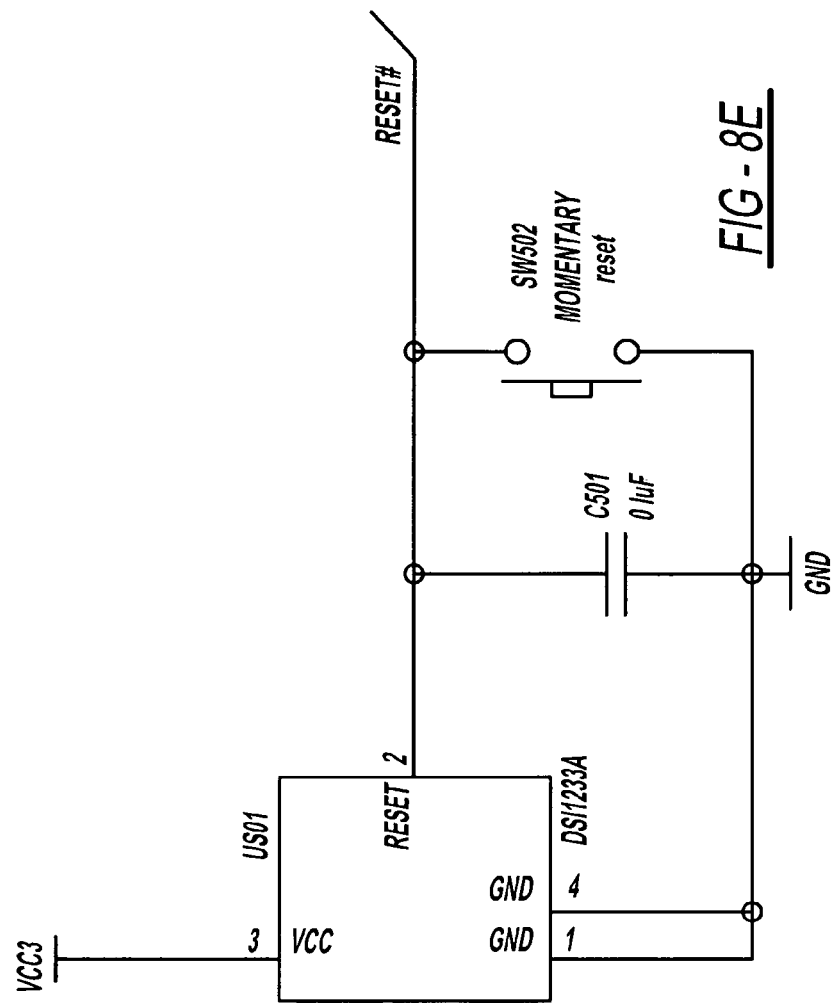
Figure 8D:
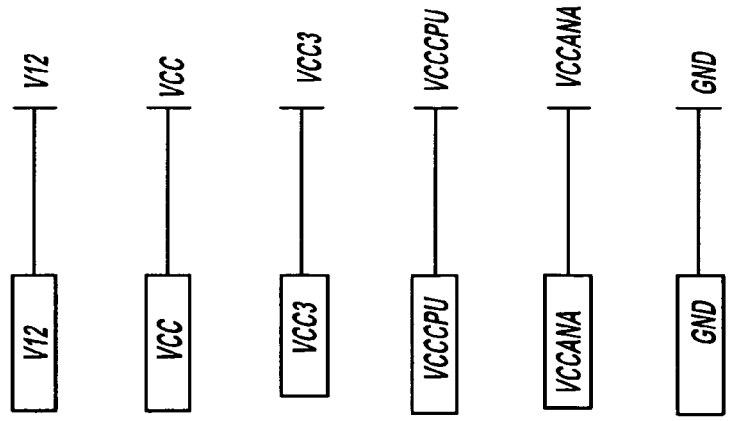
Figure 9A:
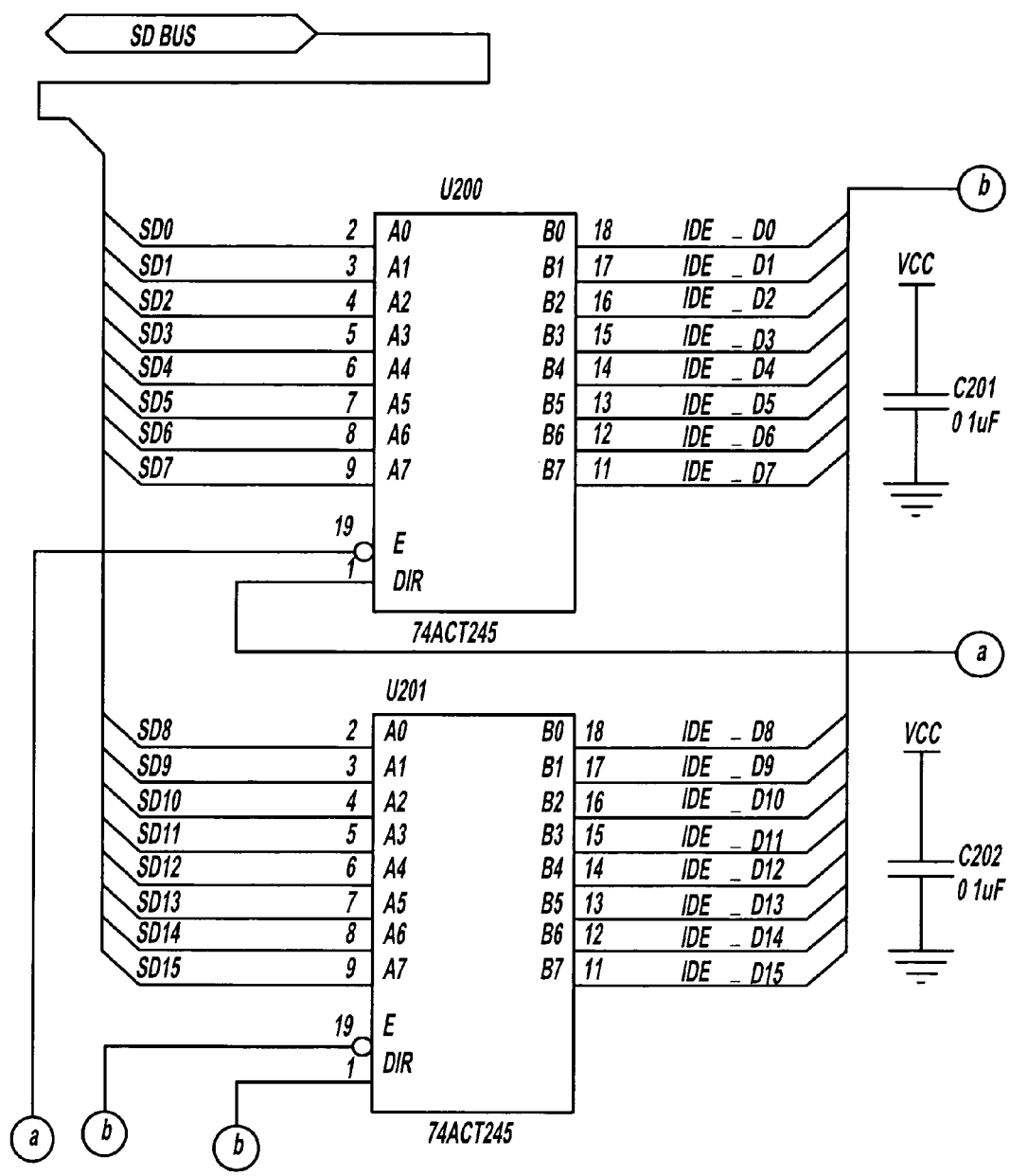
Figure 9B:
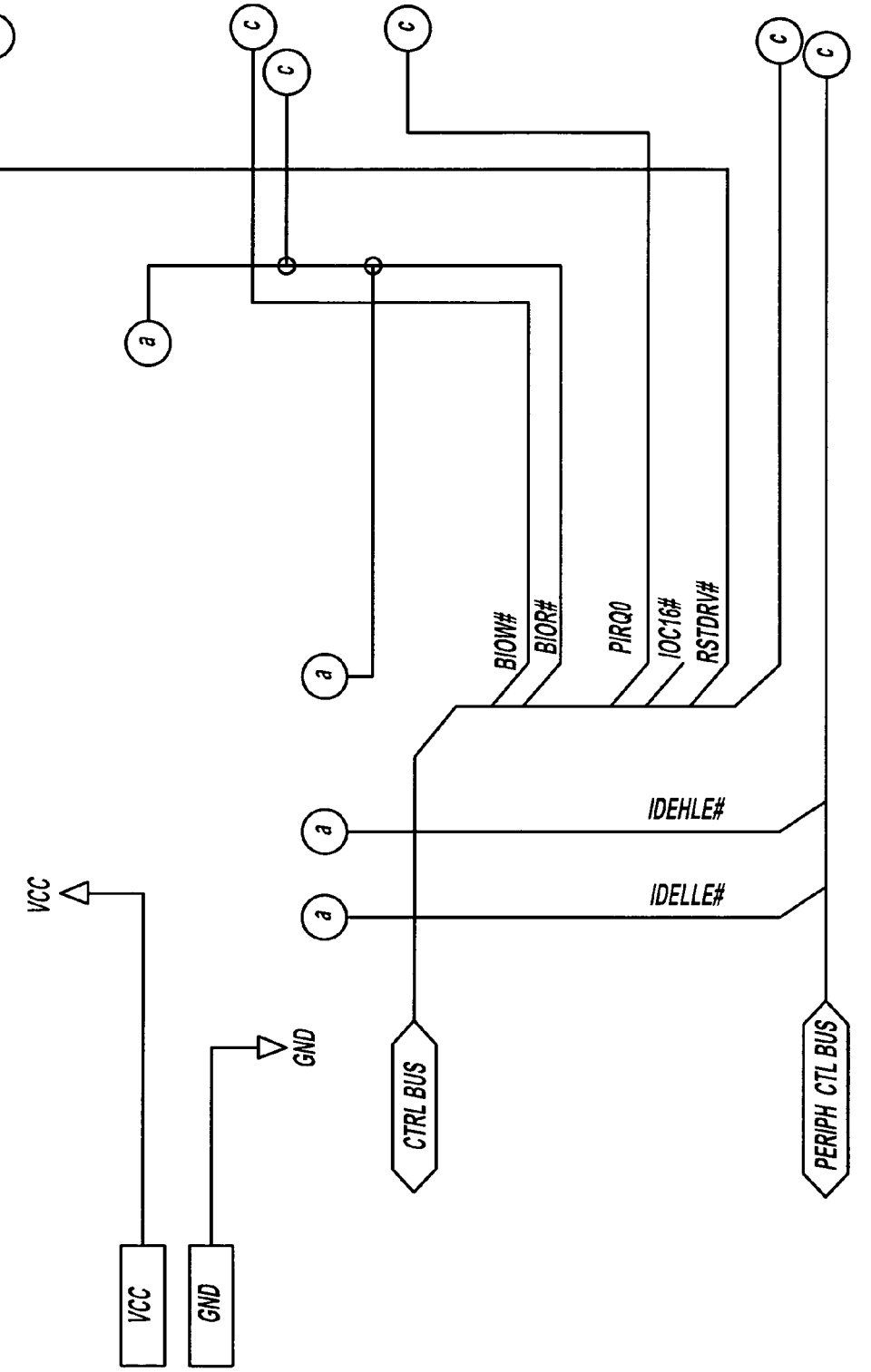
Figure 9C:
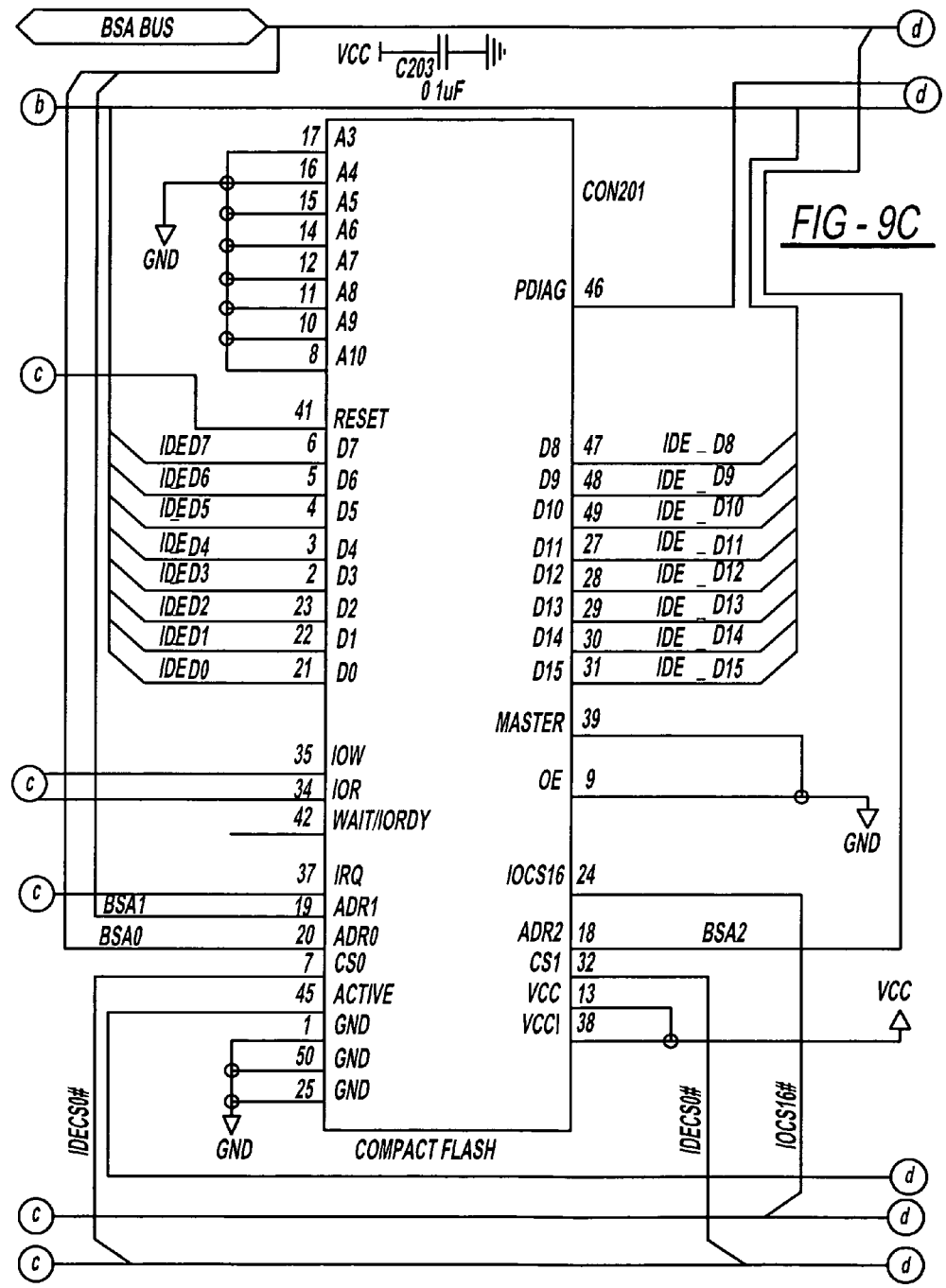
Figure 9D:
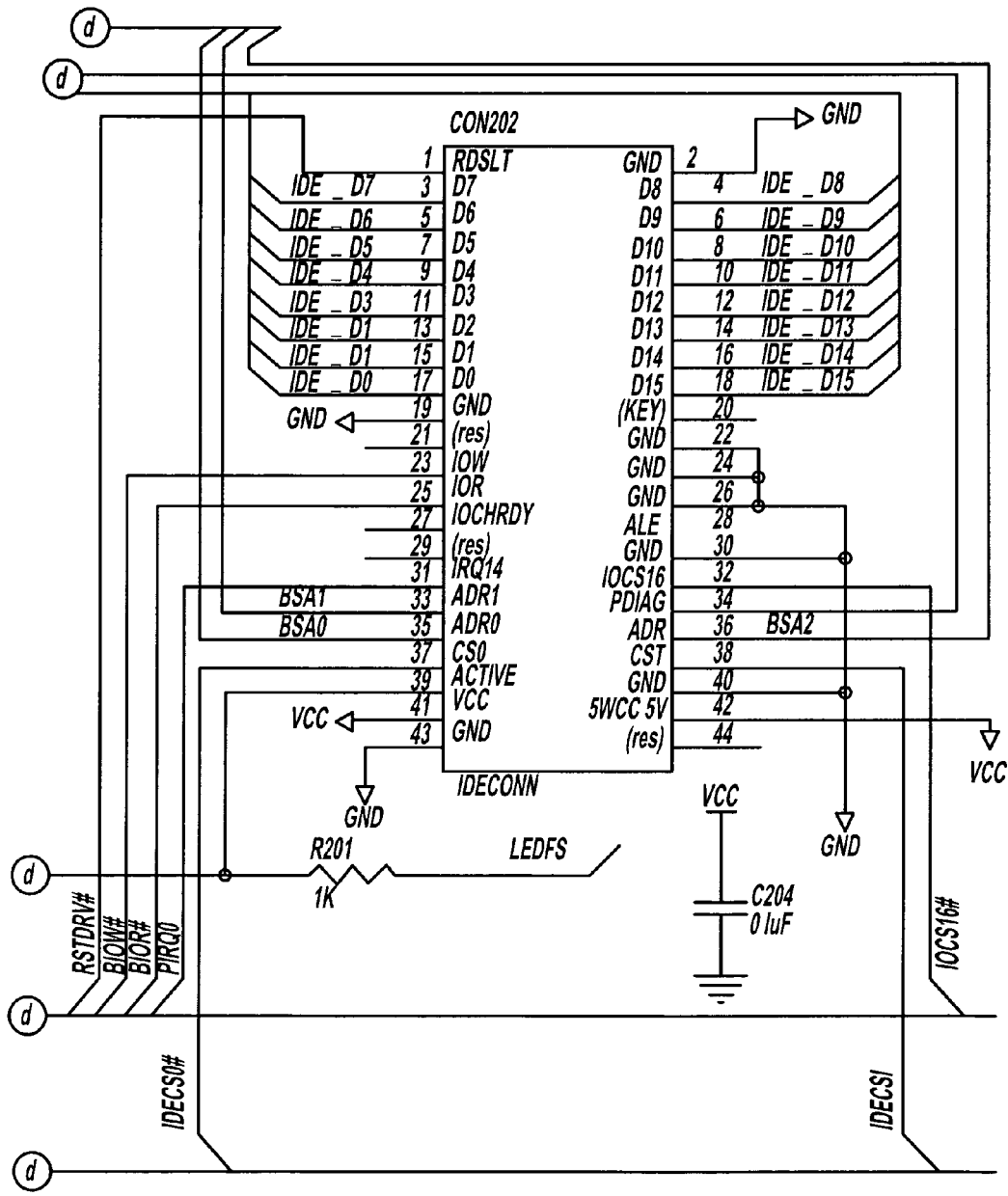
Figure 10B:
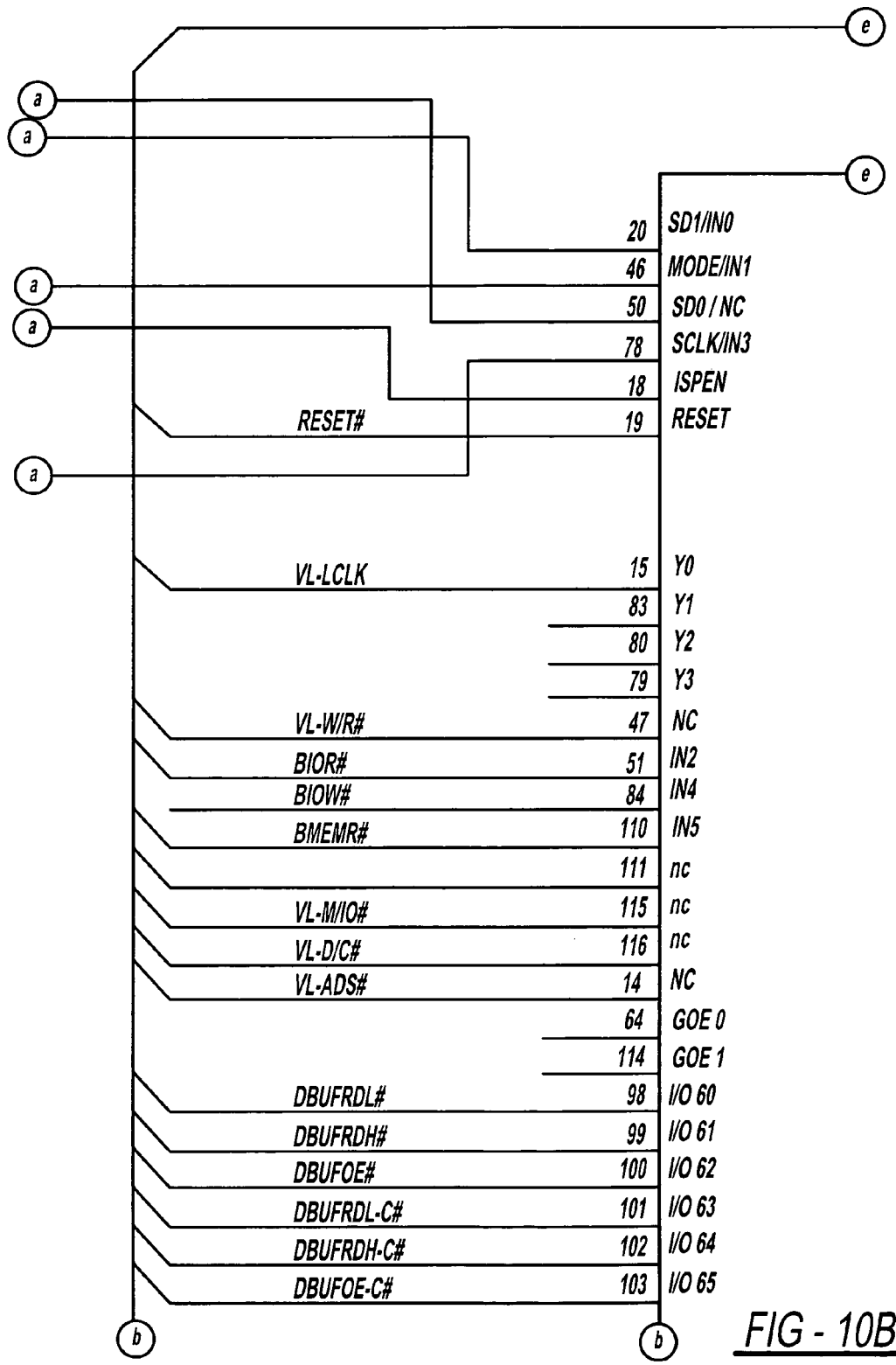
FIG. 10 illustrates device mainboard schematic: CPLD glue logic.
Figure 10C:
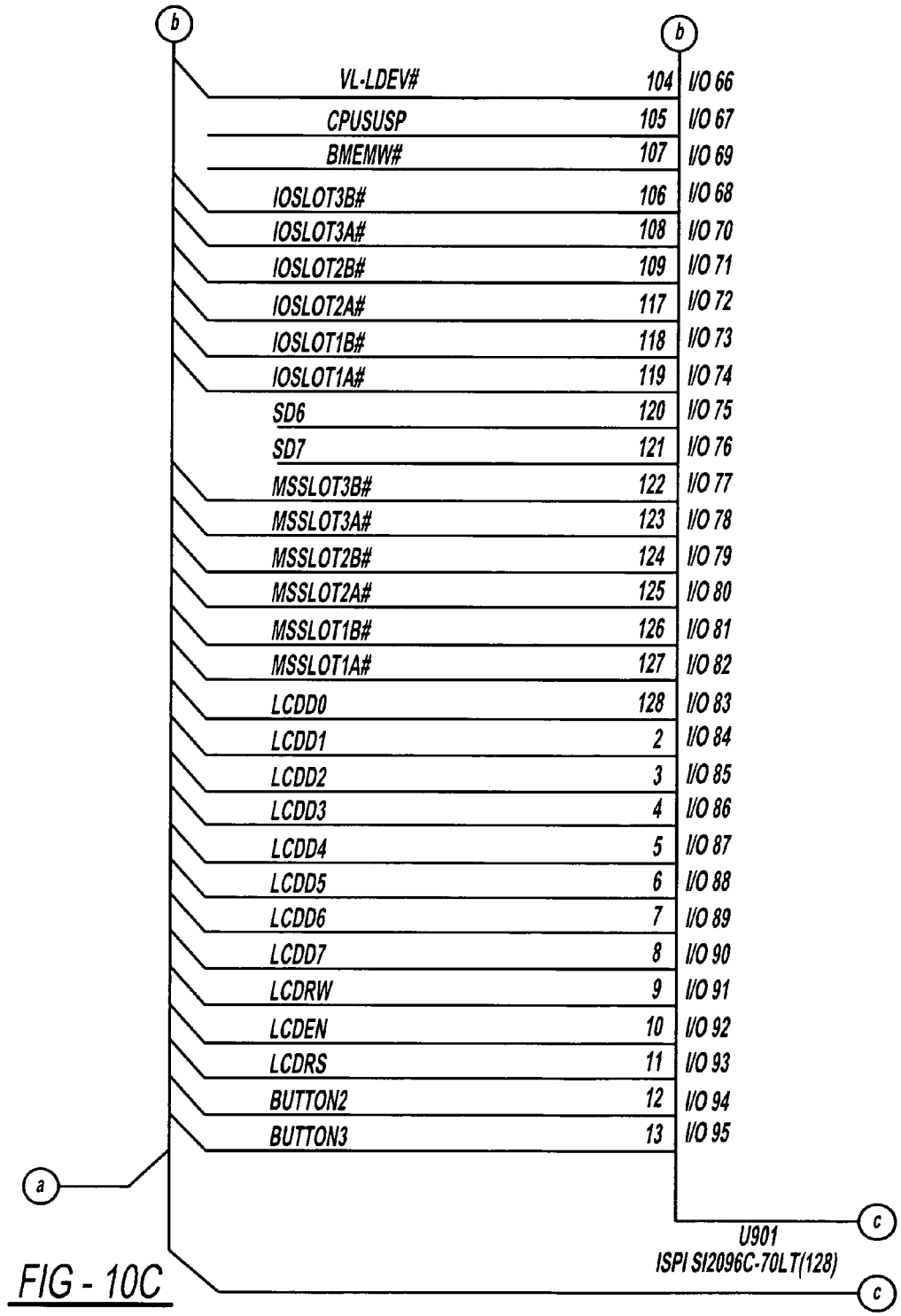
Figure 10D:
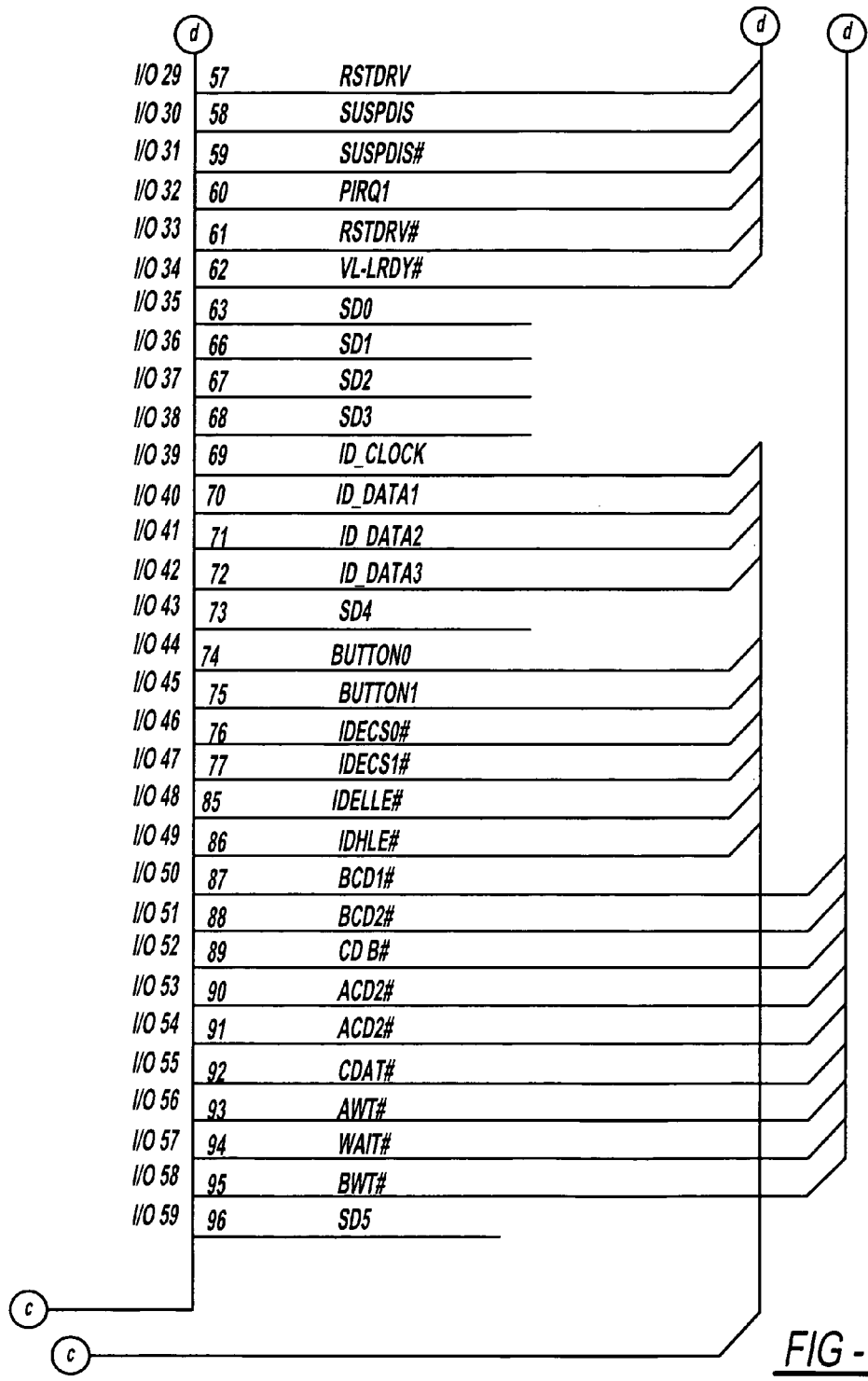
Figure 10E:
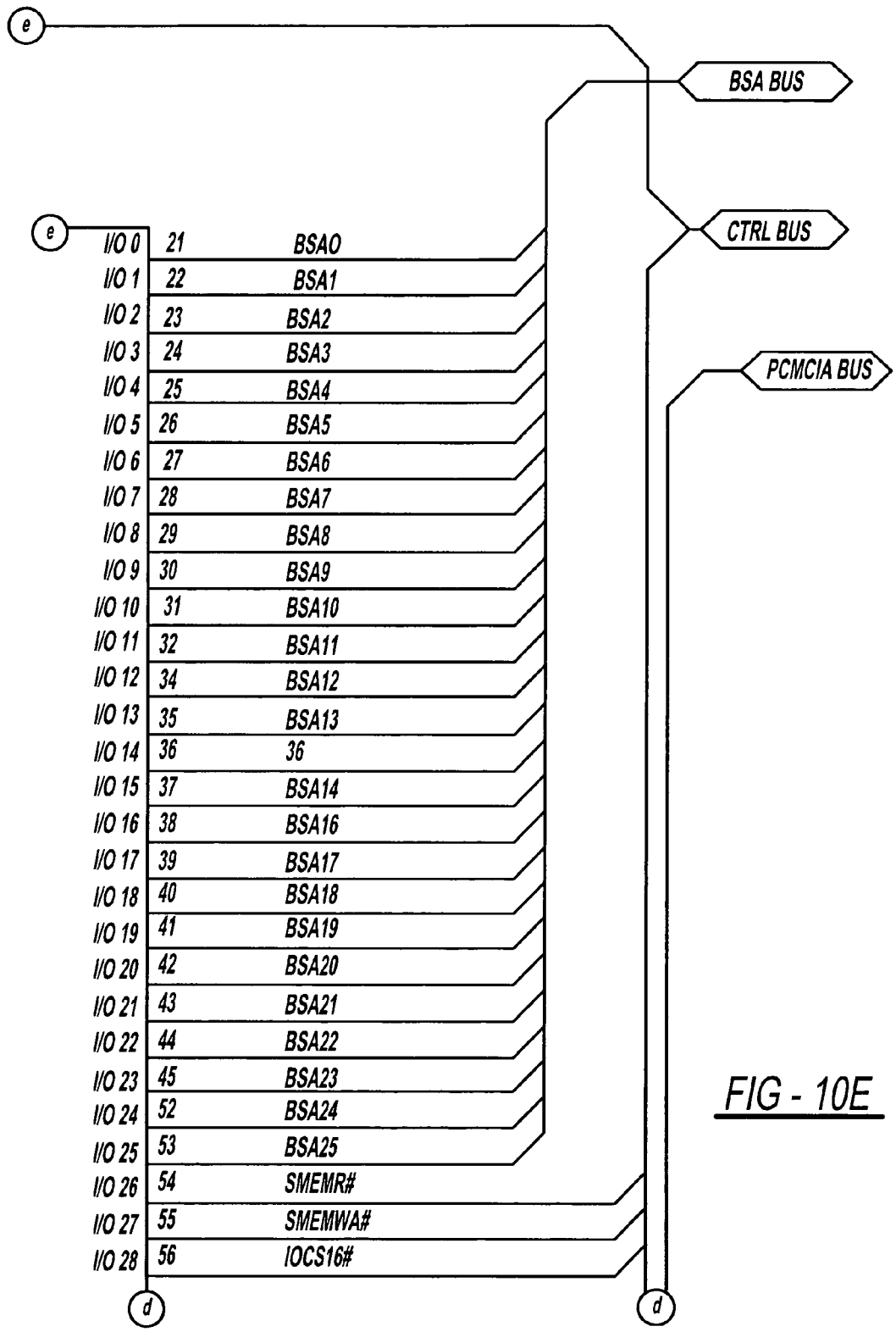
Figure 11A:
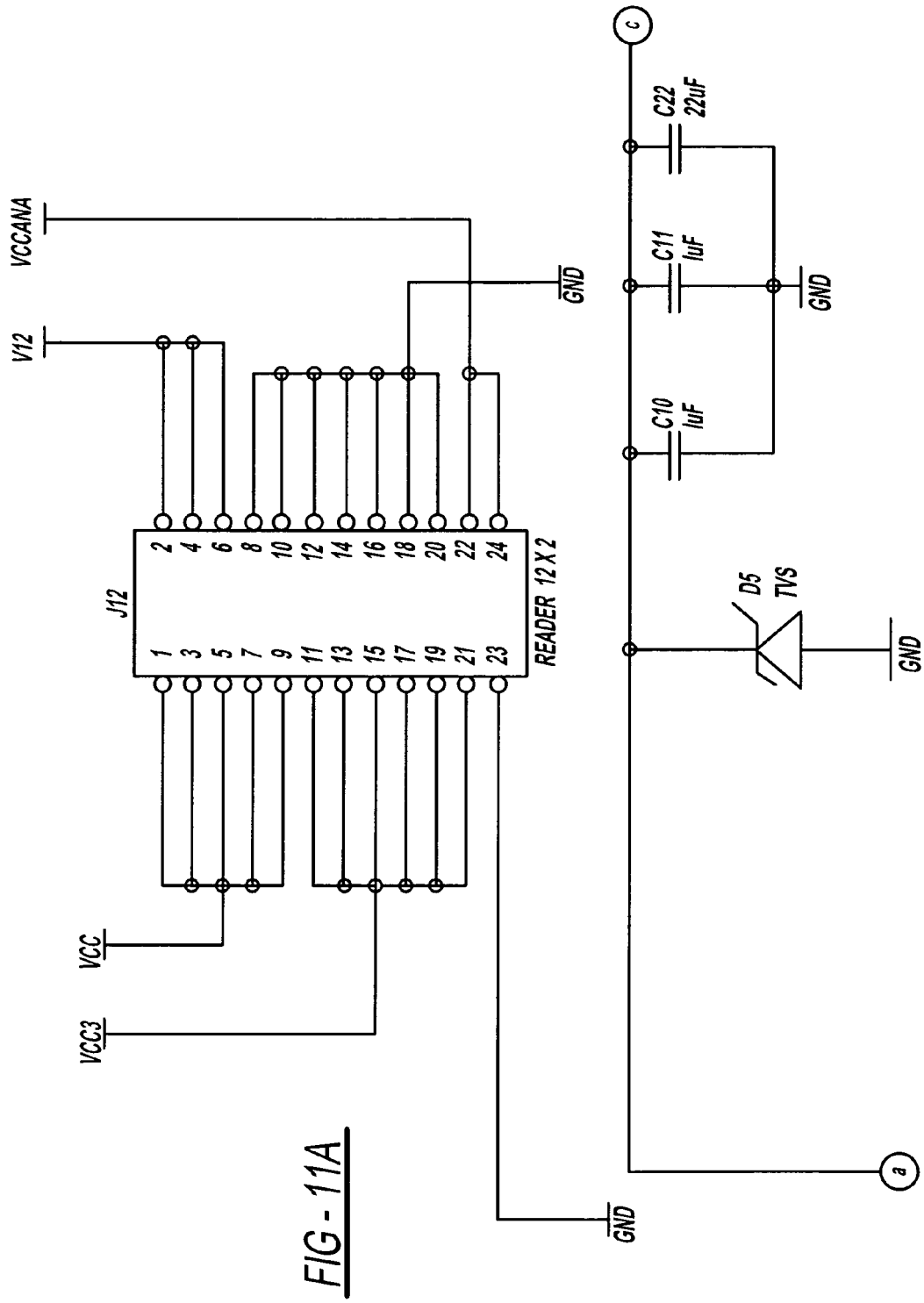
FIG. 11 illustrates device power supply board mainboard schematic.
Figure 11B:
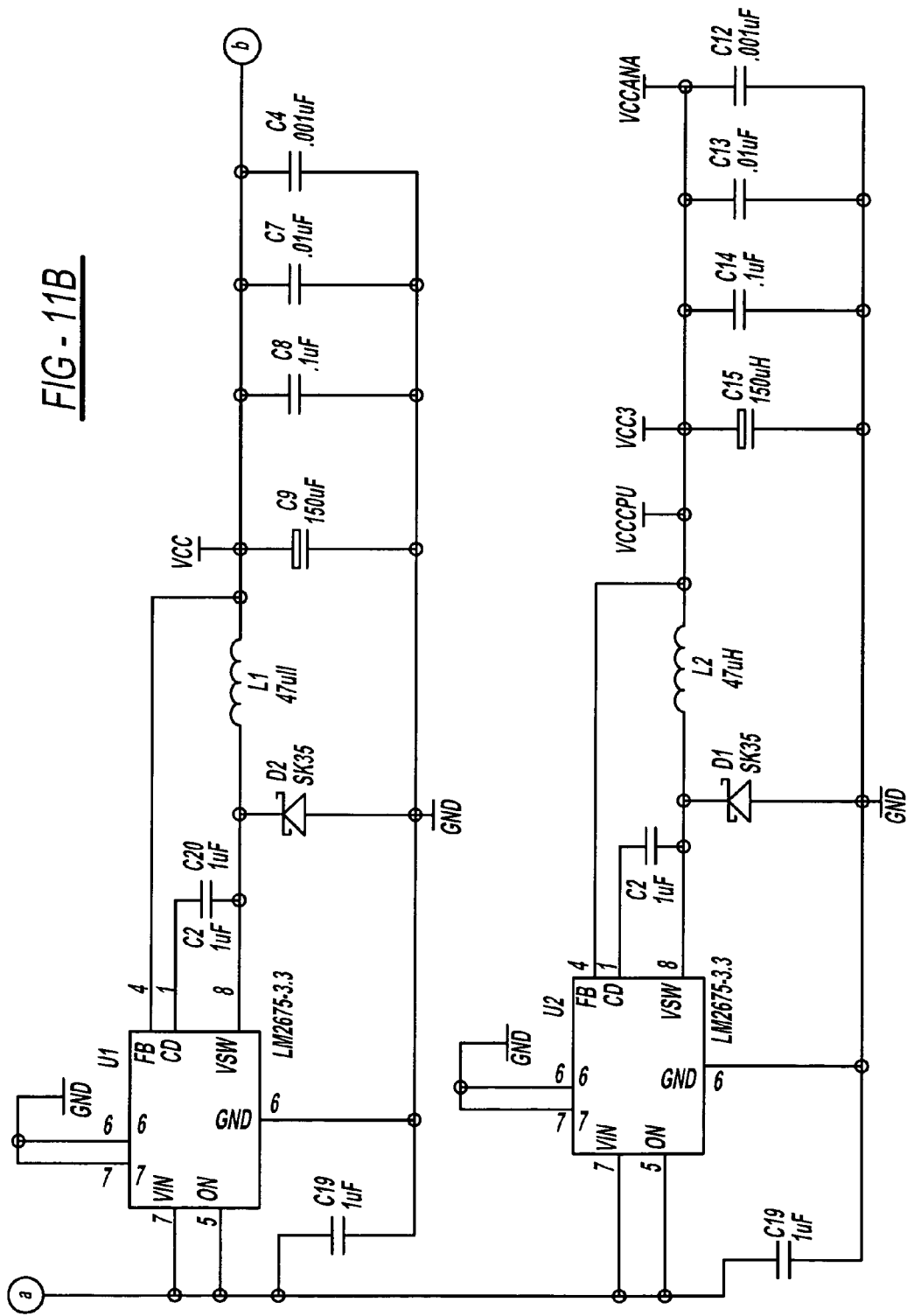
Figure 11C:
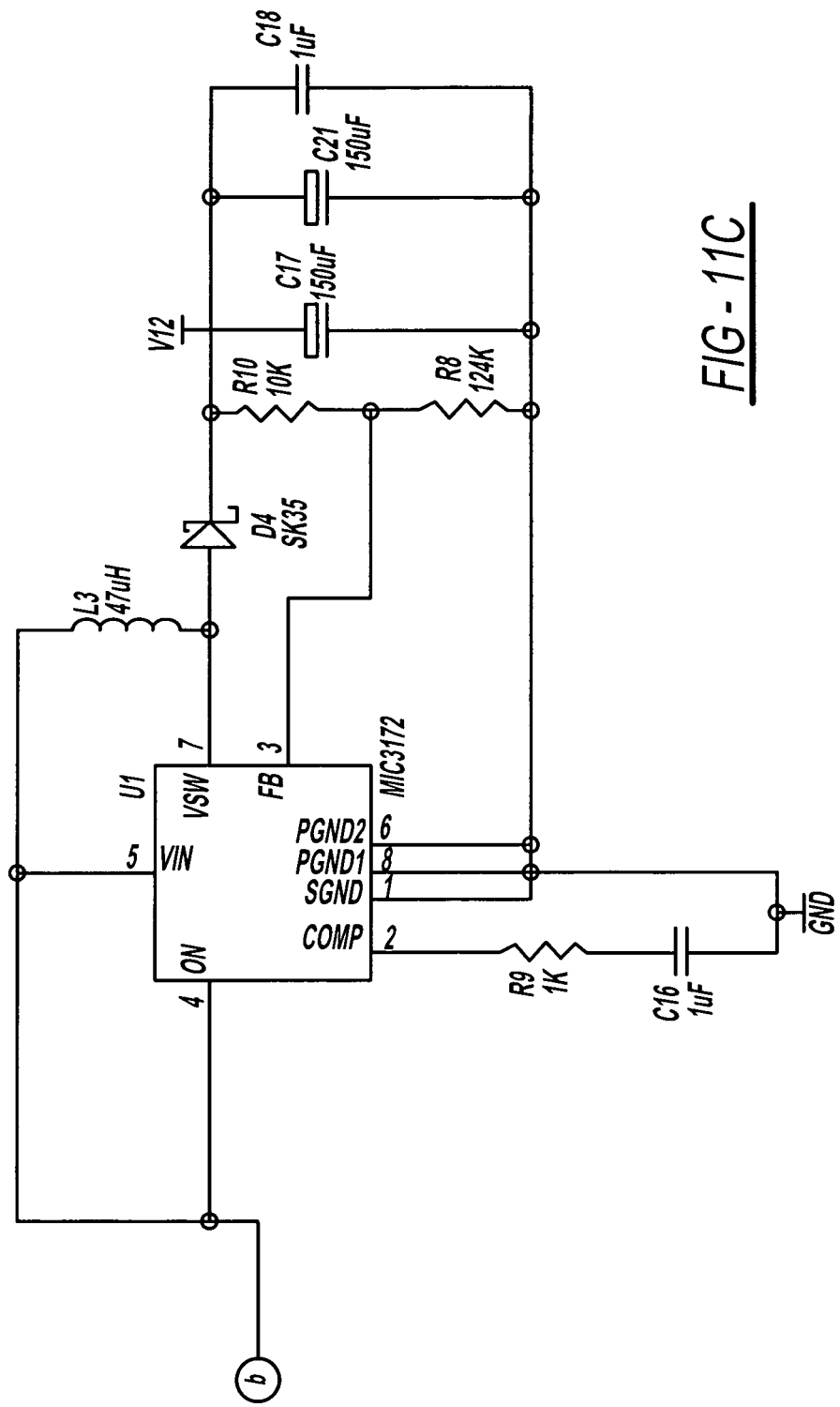
Figure 11D:
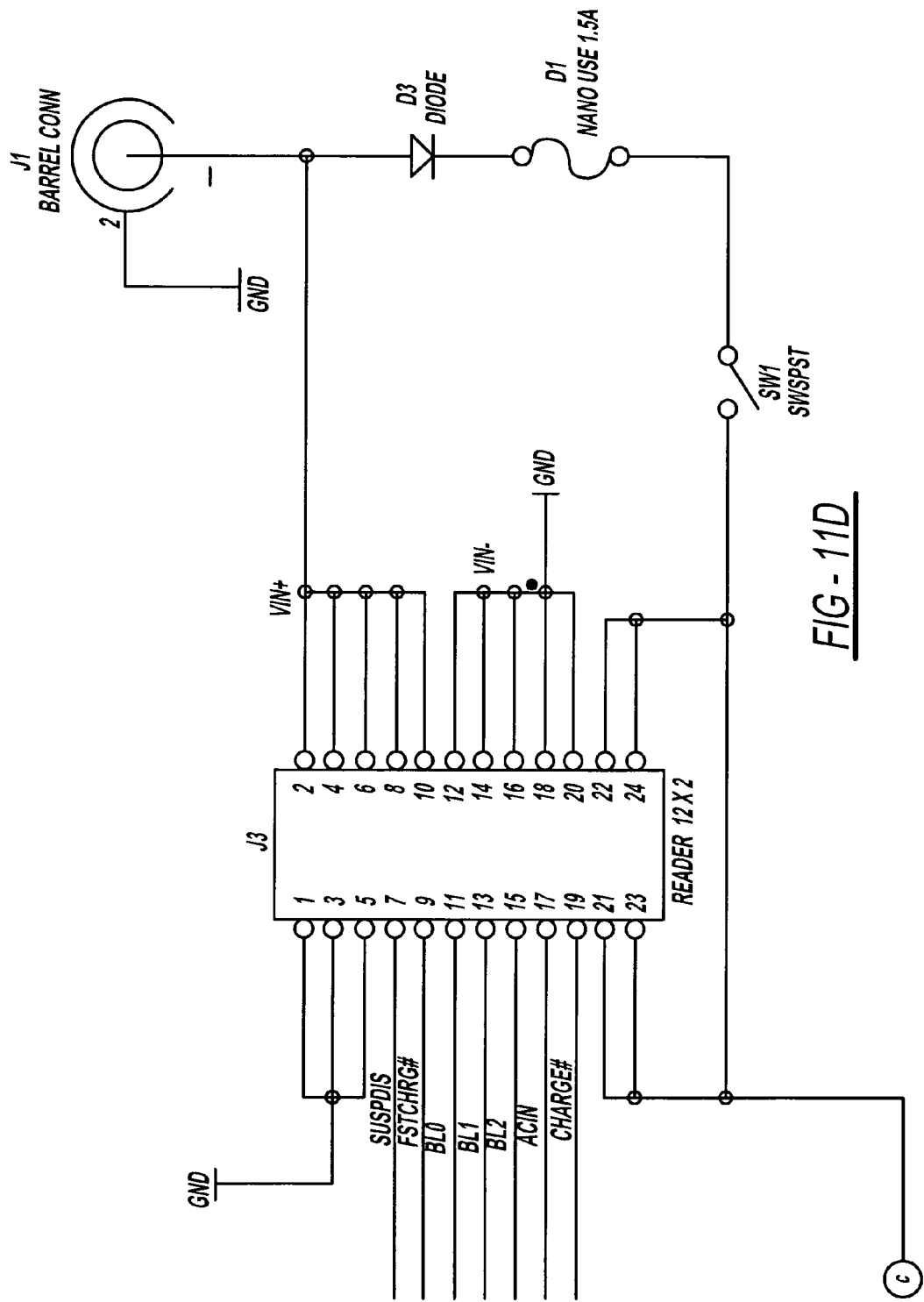

An ATA interface provides an attachment point for mass storage devices (FIG. 9). One Compact Flash and one 44-pin IDE interface is provided.

A programmable logic block (CPLD) provides a programmable logic space (FIG. 10). This logic provides support for a LCD/Keypad interface, a daughtercard slot support, buffer control, and an address decoding/interrupt routing for other system peripherals.

FIG. 11 depicts a power supply card as providing three DC-DC converters that provide the device hardware platform's required supply voltages (3.3 VDC, 5 VDC and 12 VDC). The supported input voltage range is between 6 VDC and 35 VDC. The circuit provides protection against incorrect or reverse-polarity input Voltages.

Figure 12:
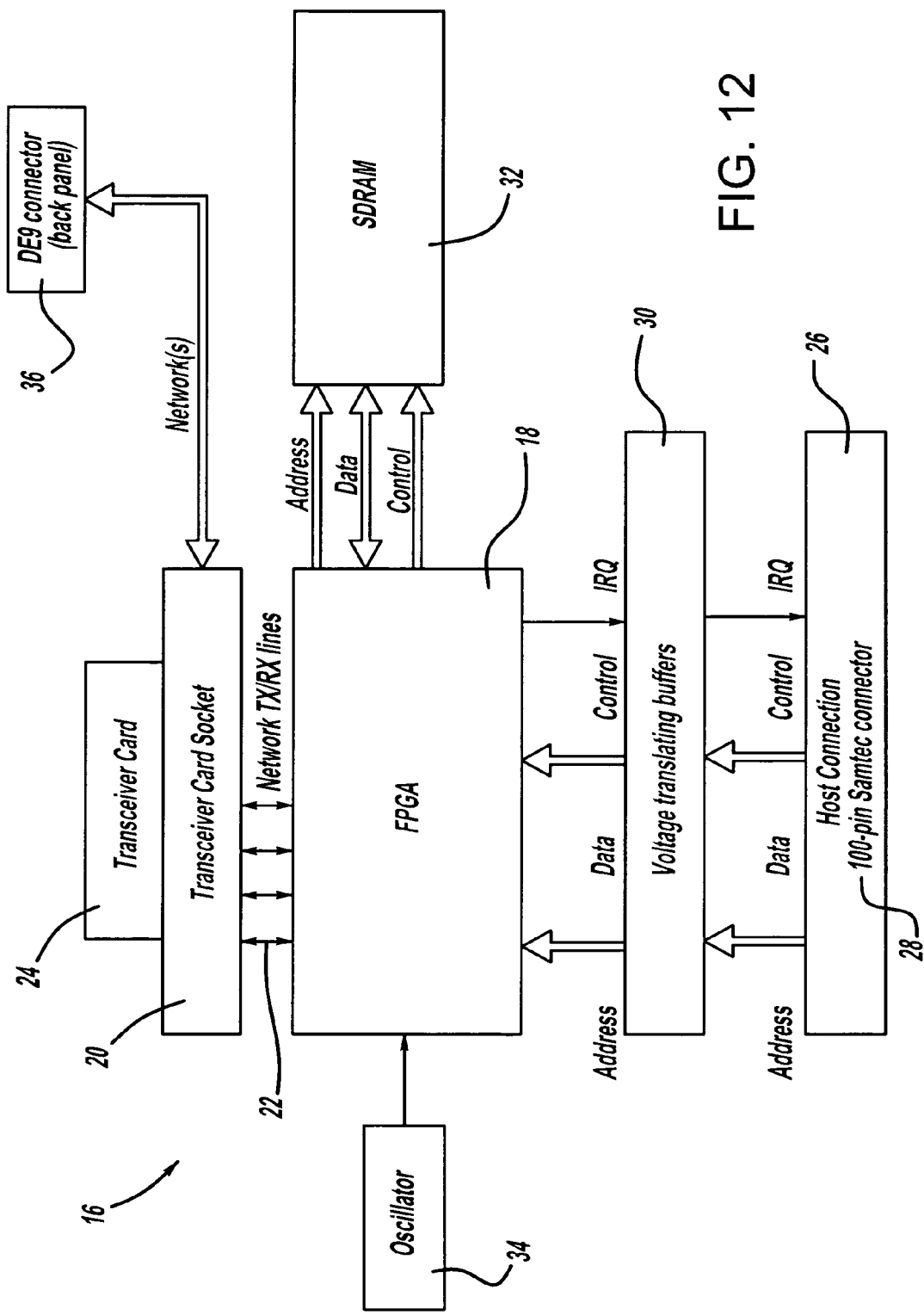
FIG. 12 is a flow diagram of an add-in card for use with a protocol adapter to provide the ability to monitor and translate messages between a vehicle network operating in one or more protocols and a host computer, according to the present invention.

A schematic for another embodiment of circuit board having data recording circuitry operable for use with a protocol adapter according to the present invention is shown generally at 16 in FIG. 12. The circuit board 16 in this embodiment includes a circuit, such as a microprocessor, or in this embodiment a Field Programmable Gate Array (FPGA) 18, and the circuit board 16 is able to function as an add-on device for an existing protocol adapter. Furthermore, the circuit board 16 is removable such that the circuit board 16 is suitable for use with more than one protocol adapter.

The FPGA 18 is in electrical communication with a transceiver card socket 20 through the use of network TX/RX Lines 22. The transceiver card socket 20 is a twenty-position socket which receives various interchangeable transceiver cards 24, each having a transceiver circuit. Each transceiver card 24 has firmware appropriate to a specific application, such as, but not limited to, a Control Area Network (CAN) protocol. In alternate embodiments, the transceiver card 24 includes, but is not limited to, the SAE J1708, SAE J1939, and SAE J1850 protocols. Each transceiver card 24 used also includes a serial Electronically Erasable Programmable Read-Only Memory (EEPROM), which identifies the transceiver circuit on the card 24 to the system, thereby allowing for the loading of the appropriate device drivers and software.

The FPGA 18 is also connected to a host connection 26 through the use of a 100-pin stacking connector 28, but it is within the scope of the invention that different types of connectors having more or less pins may be used. The host connection 26 is part of a host computer. The FPGA 18 of the present invention is a low-voltage FPGA 18 (in this embodiment, the FPGA 18 operates at +2.5V, but it is within the scope of the invention that other voltages may be used) and is interfaced to the host computer through the use of voltage translating buffers 30, which allow the FPGA 18 to be powered by the host computer's +5.0V and +3.3V power supplies.

The FPGA 18 is also in electrical communication with a memory device, which in this embodiment is a Synchronous Dynamic Random Access Memory (SDRAM) device 32. The SDRAM device 32 is a 16-bit-wide, 256 MB SDRAM device 32 which provides first-in-first-out (FIFO) storage space for storing incoming vehicle network traffic. The firmware of the FPGA 18 implements the peripherals of the vehicle network, the host interface, and the controller of the SDRAM device 32. Also connected to the FPGA 18 is an oscillator 34 which is used for providing a clock signal for the SDRAM device 32 and the protocol being used by the system.

The transceiver card socket 20 is also connected to a DE9-F connector 36, which is accessible from the outside the protocol adapter's enclosure. This connector 36 provides access to the supported network(s) and also allows additional power input to the system.

In operation, the FPGA 18 provides for almost immediate logging of vehicle network data received from the DE9-F connector 36. The FPGA 18, transceiver card 24, and SDRAM device 32 (which are all part of the circuit board 16) are all operational prior to the host computer and the remaining components of the protocol adapter having completed booting up (i.e., having completed performing a boot sequence). The data logging occurs within milliseconds of start-up, and the data is stored using the SDRAM device 32. The transceiver card 24 has "quick-start functionality," and captures the message traffic detected, and the data is stored on the SDRAM device 32. Once the system has finished booting up, and the host computer has finished booting up, the data logged in the SDRAM device 32 is then transferred to the host computer. Once the data reaches the host computer, the data is then post-processed, if desired. The present invention overcomes the disadvantages of other systems, in which time passes while the host computer and protocol adapter boot up after the power is initially turned on. The FPGA 18 communicates with the vehicle network in the protocol supported by the transceiver card 24, and the data is recorded using the SDRAM device 32.

With the exception of the deep FIFO SDRAM device 32, any network peripherals implemented in the FPGA 18 are designed to appear to the software as standard devices that are already supported by existing device drivers (such as a standard Universal Asynchronous Transmit and Receive (UART), for example). Any peripheral registers are mapped into the ISA memory space on the host computer. In a typical application, each card 24 supports two channels, but it is within the scope of the invention that each card 24 is made to support more or less channels. A single interrupt is (often shared between multiple channels on the transceiver card 24) is routed to the processor on the host computer.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A circuit board having quick-start data logging capability and is functional with a protocol adapter for providing communication between a vehicle network and a host computer in one or more of a plurality of protocols, said circuit board comprising:
    a removable circuit board configured to connect between a protocol adapter and a vehicle network;
    a circuit of said removable circuit board in communication with a vehicle network and a host computer;
    at least one transceiver circuit selectively in electrical communication with said circuit, said at least one transceiver circuit supporting at least one vehicle network protocol;
    a volatile memory device in electrical communication with said circuit, such that said volatile memory device is operable to receive data from a vehicle network operating in said vehicle network protocol prior to said protocol adapter and said host computer completing boot up; and
    wherein said circuit is operational and begins immediate logging of vehicle network data onto said volatile memory prior to the host computer and the protocol adapter having completed booting up.

2. The circuit board according to claim 1, wherein said circuit board is removable from said protocol adapter and is used with other protocol adapters.

3. The circuit board to claim 1, said volatile memory device further comprising a synchronous dynamic random access memory (SDRAM) device.

4. The circuit board according to claim 1, wherein said circuit is a field programmable gate array.

5. The circuit board according to claim 1, wherein said circuit is a microprocessor.

6. The circuit board according to claim 1, wherein said one or more of a plurality of protocols are selected from the group consisting of controller area network protocols, SAE J1708 protocols, SAE J1939 protocols, J1850 protocols, key word protocol 2000, and UART-based protocols.

7. The circuit board according to claim 1, wherein the at least one transceiver circuit is a transceiver card selectively in electrical communication with said circuit board.

8. The circuit board according to claim 1, wherein said at least one transceiver circuit is one selected from the group consisting of J1850, UBP, CCD, SCI, CAN, J1587, J1939, J2284, J2411, ISO 11992, ISO 9141-2 and KWP2000 modules.

9. A circuit board having quick-start data logging capability and is functional with a protocol adapter for providing communication between a vehicle network and a host computer in one or more of a plurality of protocols, said circuit board comprising:
    a removable circuit board configured to connect between a protocol adapter and a vehicle network;
    a circuit of said removable circuit board in electrical communication with other components of a protocol adapter, said circuit being operable to communicate with a vehicle network operating in more than one of a plurality of protocols;
    one or more transceiver circuits in electrical communication with said circuit, said one or more transceiver circuits providing communication between said protocol adapter and said vehicle network in said one or more plurality of protocols; and
    a volatile memory device in electrical communication with said circuit, wherein said circuit is operational and begins immediate logging of vehicle network data onto said volatile memory prior to the host computer and the protocol adapter having completed booting up.

10. The circuit board according to claim 9, wherein said circuit board is removable from said protocol adapter and is used with other protocol adapters.

11. The circuit board according to claim 9, said volatile memory device further comprising a synchronous dynamic random access memory (SDRAM) device.

12. The circuit board according to claim 9, wherein said circuit is one selected form the group consisting of a field programmable gate array and a microprocessor.

13. The circuit board according to claim 9, wherein said at least one transceiver circuit is one selected from the group consisting of J1850, UBP, CCD, SCI, CAN, J1587, J1939, J2284, J2411, ISO 11992, ISO 9141-2 and KWP2000 modules.

14. The circuit board according to claim 9, wherein said one or more of a plurality of protocols are selected from the group consisting of controller area network protocols, SAE J1708 protocols, SAE J1939 protocols, J1850 protocols, key word protocol 2000, and UART-based protocols.

15. The circuit board according to claim 9, wherein said transceiver circuit is part of a transceiver card selectively mounted to said circuit board.

16. A circuit board having quick-start data logging capability and is functional with a protocol adapter for providing communication between a vehicle network and a host computer in one or more of a plurality of protocols said circuit board comprising:
    a removable circuit board configured to connect between a protocol adapter and a vehicle network;
    a field programmable gate array (FPGA) on said removable circuit board in communication with a vehicle network and a host computer;
    at least one transceiver card selectively mounted to said circuit board and in electrical communication with said field programmable gate array; and
    a volatile memory device in electrical communication with said field programmable gate array, wherein said field programmable gate array is operational and begins immediate logging of vehicle network data onto said volatile memory prior to the host computer and the protocol adapter having completed booting up.

17. The circuit board according to claim 16, wherein said circuit board is removable from said protocol adapter and is used with other protocol adapters.

18. The circuit board according to claim 16, said volatile memory device further comprising a synchronous dynamic random access memory (SDRAM) device.

19. The circuit board according to claim 16, wherein said one or more of a plurality of protocols are selected from the group consisting of controller area network protocols, SAE J1708 protocols, SAE J1939 protocols, J1850 protocols, key word protocol 2000, and UART-based protocols.

20. The circuit board according to claim 16, wherein the at least one transceiver card includes a transceiver circuit which expands the number of said plurality of protocols used for communication between said field programmable gate array and said vehicle network, and between said vehicle network and said host computer.

21. The circuit board according to claim 16, wherein said at least one transceiver circuit is one selected from the group consisting of J1850, UBP, CCD, SCI, CAN, J1587, J1939, J2284, J2411, ISO 11992, ISO 9141-2 and KWP2000 molecules.

\* \* \* \* \*

UNITED STATES PATENT AND TRADEMARK OFFICE
CERTIFICATE OF CORRECTION

PATENT NO.         : 8,554,896 B2                                Page 1 of 1
APPLICATION NO.    : 12/925310
DATED              : October 8, 2013
INVENTOR(S)        : Sodergren et al.

It is certified that error appears in the above-identified patent and that said Letters Patent is hereby corrected as shown below:

Title page,
Item [75], line 1, Inventor(s), "Jason Sodergren, Detroit, MI (US)" should be -- Jason Sodergren, Homer, AK (US) --.

In the Specification,
Column 2,
Line 64, delete the ")" after -- ISA --.

Column 9,
Line 23, "an" should be -- on --.

Column 9,
Line 44, "a" should be -- as --.

Column 10,
Line 45, insert -- of -- before -- the --. (Second occurrence)

Column 11,
Line 13, delete "is" after -- interrupt --.

In the Claims,
Column 11,
Line 51, insert -- according -- after -- board --.

Column 13,
Line 21, "molecules" should be -- modules --.

Signed and Sealed this
Eighth Day of July, 2014

Michelle K. Lee
*Deputy Director of the United States Patent and Trademark Office*